United States Patent
Ericsson et al.

(10) Patent No.: US 12,216,886 B2
(45) Date of Patent: *Feb. 4, 2025

(54) USER INTERFACE LOGICAL AND EXECUTION VIEW NAVIGATION AND SHIFTING

(71) Applicant: ROCKWELL AUTOMATION TECHNOLOGIES, INC., Mayfield Heights, OH (US)

(72) Inventors: Matthew R. Ericsson, Lyndhurst, OH (US); Andrew R. Stump, Mentor, OH (US); Anthony Carrara, Strongsville, OH (US); Eashwer Srinivasan, Fremont, CA (US); Christopher W. Como, Chagrin Falls, OH (US); Sharon M. Billi-Duran, Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,593

(22) Filed: Oct. 6, 2023

(65) Prior Publication Data

US 2024/0036708 A1    Feb. 1, 2024

Related U.S. Application Data

(63) Continuation of application No. 17/653,969, filed on Mar. 8, 2022, now Pat. No. 11,816,309, which is a
(Continued)

(51) Int. Cl.
*G06F 3/0483* (2013.01)
*G06F 3/04817* (2022.01)
(Continued)

(52) U.S. Cl.
CPC ........ *G06F 3/0483* (2013.01); *G06F 3/04817* (2013.01); *G06F 3/0482* (2013.01); *G06F 8/20* (2013.01)

(58) Field of Classification Search
CPC .. G06F 3/0483; G06F 3/0481; G06F 3/04817; G06F 3/0482; G06F 8/20
(Continued)

(56) References Cited

U.S. PATENT DOCUMENTS 7,925,994 B2 *   4/2011   Olsen ..................... G06Q 10/10
                                                          715/764
2004/0036698 A1   2/2004   Thurner et al.
(Continued)

FOREIGN PATENT DOCUMENTS

| CN | 101052948 A | 10/2007 |
| CN | 102227692 A | 10/2011 |
| CN | 107533453 A | 1/2018 |

OTHER PUBLICATIONS

Chinese Office Action for Application No. 202010237604.3, dated Oct. 19, 2023.
(Continued)

*Primary Examiner* — Hwei-Min Lu
(74) *Attorney, Agent, or Firm* — Foley & Lardner LLP

(57) ABSTRACT

An industrial integrated development environment (IDE) comprises a development interface that affords a user a great deal of control over the editing tools, workspace canvases, and project information rendered at a given time. The industrial IDE system automatically filters the tools, panels, and information available for selection based on a current project development task, such that a focused subset of editing tools relevant to a current development task or context are made available for selection while other tools are hidden. The development interface also allows the user to selectively render or hide selected tools or information from
(Continued)

among the relevant, filtered set of tools. This can reduce or eliminate unnecessary clutter and aid in quickly and easily locating and selecting a desired editing function. The IDE's development interface can also conform to a structured organization of workspace canvases and panels that facilitates intuitive workflow.

20 Claims, 56 Drawing Sheets

Related U.S. Application Data continuation of application No. 16/585,887, filed on Sep. 27, 2019, now abandoned.

(51) Int. Cl.
*G06F 3/0482* (2013.01)
*G06F 8/20* (2018.01)

(58) Field of Classification Search
USPC ....... 715/738, 762, 763, 764, 765, 767, 771, 715/777, 779, 810
See application file for complete search history.

(56) References Cited

U.S. PATENT DOCUMENTS

| | | | | |
|---|---|---|---|---|
| 2004/0139085 A1* | 7/2004 | Eryurek | ............. | G05B 23/0267 |
| 2006/0059461 A1* | 3/2006 | Baker | ............. | G06F 8/20 |
| | | | | 717/113 |
| 2007/0018980 A1* | 1/2007 | Berteig | ............. | G06T 15/80 |
| | | | | 345/426 |
| 2007/0055976 A1* | 3/2007 | Ward | ............. | H04L 41/0893 |
| | | | | 719/329 |
| 2007/0139441 A1* | 6/2007 | Lucas | ............. | G06Q 50/04 |
| | | | | 345/619 |
| 2007/0239351 A1 | 10/2007 | Sherrill et al. | | |
| 2007/0240052 A1* | 10/2007 | Sherrill | ............. | G06F 3/048 |
| | | | | 715/700 |
| 2008/0082185 A1* | 4/2008 | Hood | ............. | G05B 19/409 |
| | | | | 700/83 |
| 2008/0140230 A1* | 6/2008 | Bromley | ............. | G05B 19/056 |
| | | | | 700/86 |
| 2008/0209354 A1* | 8/2008 | Stanek | ............. | G06F 3/0482 |
| | | | | 715/767 |
| 2010/0222902 A1* | 9/2010 | Eldridge | ............. | G05B 19/41845 |
| | | | | 700/86 |
| 2012/0029661 A1* | 2/2012 | Jones | ............. | G05B 19/41865 |
| | | | | 700/17 |
| 2013/0007693 A1* | 1/2013 | Bliss | ............. | G06F 8/30 |
| | | | | 717/101 |
| 2013/0275908 A1* | 10/2013 | Reichard | ............. | G06F 3/0481 |
| | | | | 715/777 |
| 2014/0289700 A1 | 9/2014 | Srinivasaraghavan et al. | | |
| 2014/0343696 A1* | 11/2014 | Plache | ............. | G06F 3/04842 |
| | | | | 700/83 |
| 2017/0102693 A1* | 4/2017 | Kidd | ............. | G05B 19/41865 |
| 2018/0032518 A1* | 2/2018 | Kordasiewicz | ....... | G06F 16/338 |
| 2018/0113682 A1* | 4/2018 | Horvath | ............. | G05B 17/02 |
| 2019/0107828 A1* | 4/2019 | Reichle | ............. | G06F 3/04845 |

OTHER PUBLICATIONS

Microsoft, "Visual Studio Code User Interface," http://web.archive.org/web/20190917151141/https://code.visualstudio.com/docs/getstarted/userinterface/, Sep. 17, 2019.

* cited by examiner

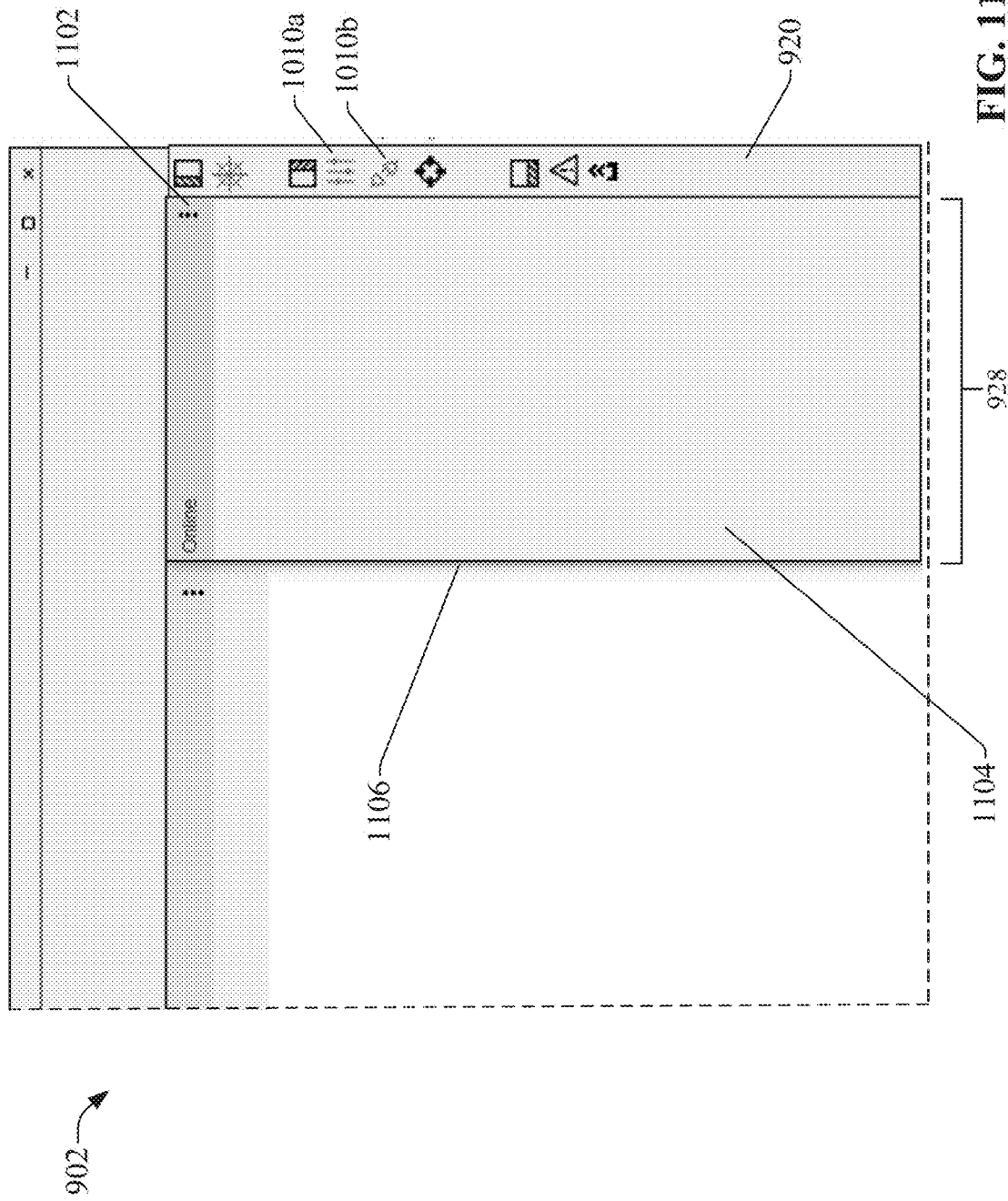

Tags

| Name | Default | Style | Data Type | | | History | Alarms | Description | |
|---|---|---|---|---|---|---|---|---|---|
| BNOT | 0 | Decimal | FBD_BOOLEAN | | | | | | |
| CTUD | 0 | Decimal | FBD_COUNTER | | | | | | |
| TONR | 0 | Decimal | FBD_TIMER | | | | | | import |
| TOT | 0 | Decimal | TOTALIZER | | | | | | |

Parameters

| Name | Default | Style | Usage | Data Type | History | Alarms | Description | |
|---|---|---|---|---|---|---|---|---|
| Out_Total | 0 | Decimal | Output | REAL | | | | |
| Alm_InFault | 0 | Decimal | Output | BOOL | | | | |
| Inp_PV | 0 | Decimal | Input | BOOL | | | | |
| Inp_ResetValve | 0.0 | Float | Input | REAL | | | | |
| Cfg_Target | 0.0 | Float | Input | REAL | | | | |
| Cfg_TargetDevt | 0.0 | Float | Input | REAL | | | | import |

FIG. 16b

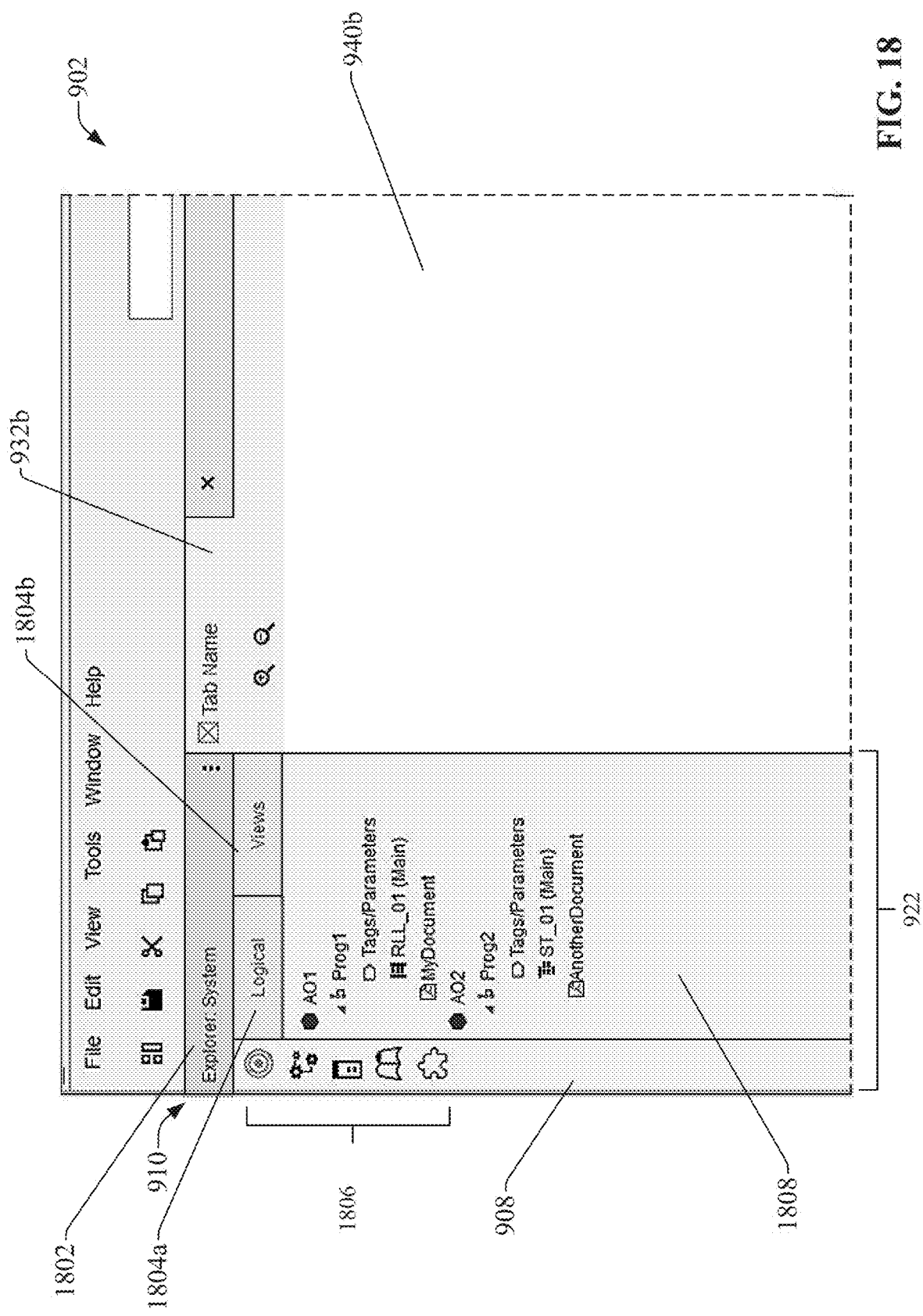

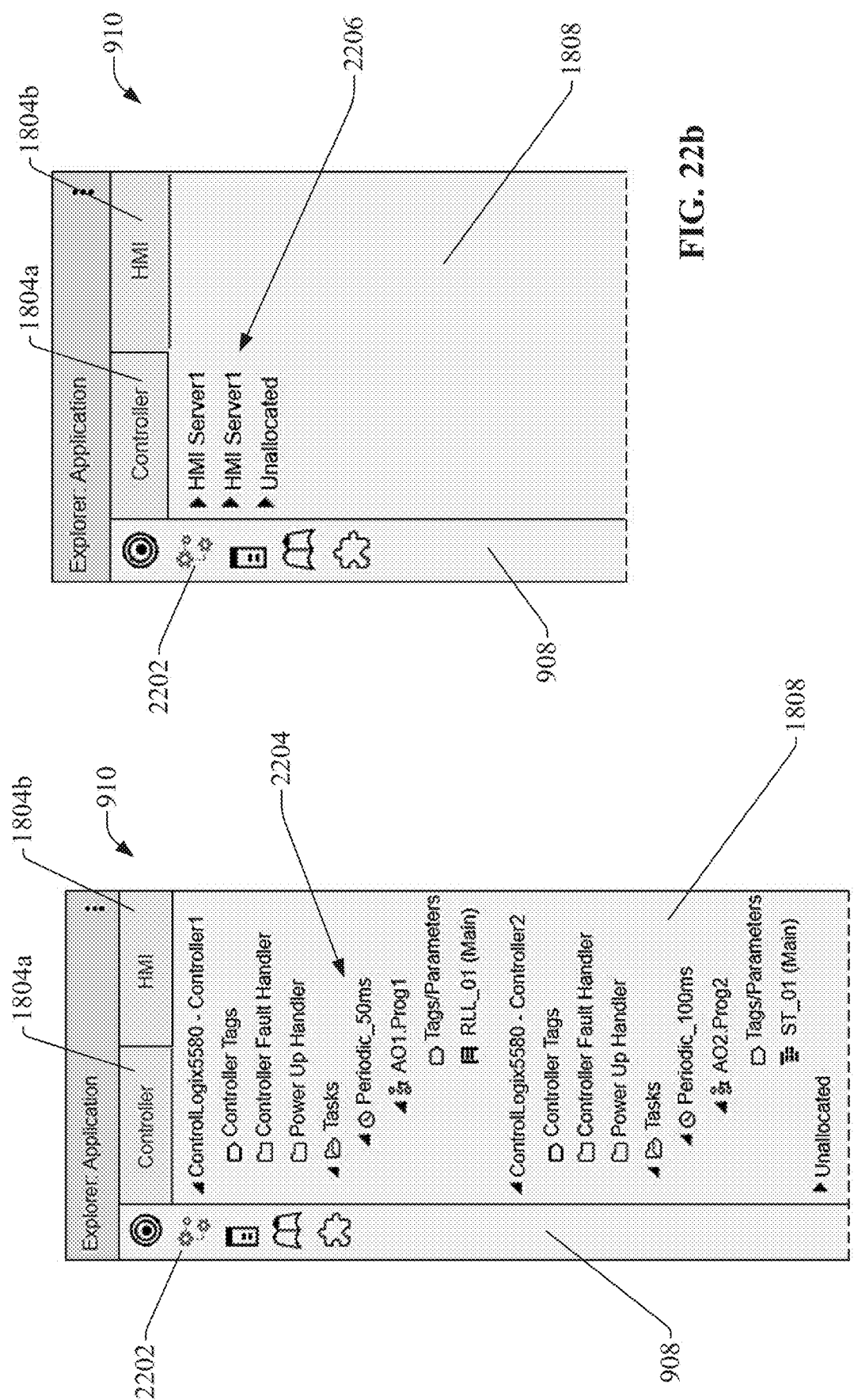

```json
{
    "type": "team",
    "test": {
        "testPage": "tools/testing/run-tests.htm",
        "enabled": true
    },
    "search": {
        "excludeFolders": [
            ".git",
            "node_modules",
            "tools/bin",
            "tools/counts",
            "tools/pollcheck",
            "tools/tfs_build_extensions",
            "tools/testing/jscoverage",
            "tools/testing/qunit",
            "tools/testing/chutzpah",
            "server.net"
        ]
    },
    "languages": {
        "vs.languages.typescript": {
            "validationSettings": [{
                "scope": ":/",
                "noImplicitAny": true,
                "noLib": false,
                "extraLibs": [],
                "semanticValidation": true,
                "syntaxValidation": true,
```

FIG. 23

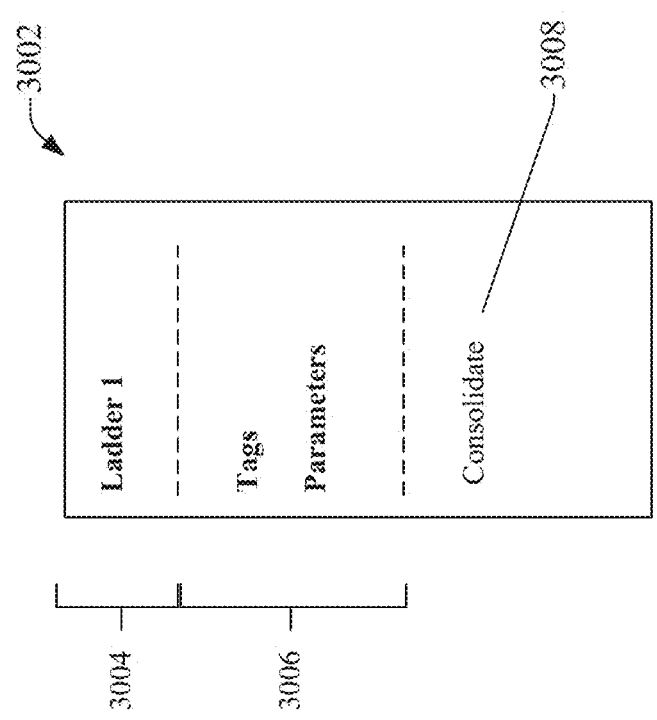

USER INTERFACE LOGICAL AND EXECUTION VIEW NAVIGATION AND SHIFTING

CROSS-REFERENCE TO RELATED APPLICATIONS

This application is a continuation of U.S. patent application Ser. No. 17/653,969 filed Mar. 8, 2022, which is a continuation of U.S. patent application Ser. No. 16/585,887 filed Sep. 27, 2019, both of which are incorporated by reference herein in their entireties.

BACKGROUND

The subject matter disclosed herein relates generally to industrial automation systems, and, for example, to industrial programming development platforms.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for developing industrial applications is provided, comprising a user interface component configured to render an industrial integrated development environment (IDE) development interface and to receive, via interaction with the development interface, industrial design input that defines aspects of an industrial automation project, wherein the development interface comprises: one or more workspace canvases configured to facilitate development of a selected aspect of the industrial automation project, and an explorer panel that facilitates browsing of elements of the industrial automation project; and a project generation component configured to generate system project data based on the industrial design input, wherein the explorer panel comprises explorer icons rendered on an explorer view control bar, the explorer icons representing respective different viewing categories supported by the explorer panel, and selection of an explorer icon, of the explorer icons, causes browsable project content associated with a viewing category of the explorer icon to be rendered in the explorer panel.

Also, one or more embodiments provide a method for browsing content of an industrial automation project, comprising displaying, by an industrial integrated development environment (IDE) system comprising a processor, a development interface on a client device, wherein the displaying comprises: displaying one or more workspace canvases on which respective development tasks are performed, and displaying an explorer panel that facilitates exploration of elements of the industrial automation project, wherein the displaying the explorer panel comprises rendering, on the explorer panel, an explorer view control bar comprising explorer icons representing respective different viewing categories supported by the explorer panel; receiving, by the industrial IDE system, selection of an explorer icon of the explorer icons; and in response to the receiving, displaying, by the industrial IDE system on the explorer panel, browsable project elements associated with a viewing category of the explorer icon.

Also, according to one or more embodiments, a non-transitory computer-readable medium is provided having stored thereon instructions that, in response to execution, cause an industrial integrated development environment (IDE) system to perform operations, the operations comprising rendering a development interface on a client device, wherein the rendering comprises: rendering one or more workspace canvases on which respective development tasks are performed, and rendering an explorer panel that facilitates browsing of components of the industrial automation project, wherein the rendering the explorer panel comprises rendering, on the explorer panel, an explorer view control bar comprising explorer icons representing respective different viewing categories supported by the explorer panel; receiving selection of an explorer icon of the explorer icons; and in response to the receiving, displaying on the explorer panel, browsable project components associated with a viewing category of the explorer icon.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 11b is a view of the top right corner of the development interface depicting selection of an Online panel as an overlaid panel in the right global panel area.

FIG. 16b is a view of two tabbed development interfaces in which one tab is selected, causing the corresponding tag database canvas to be rendered in the canvas area.

FIG. 18 is a view of an Explorer panel, which resides in a left global panel area of a development interface when invoked.

FIG. 22a is a view of the Explorer panel with the Application view and the Controller tab currently selected.

FIG. 22b is a view of the Explorer panel with the Application view and the HMI tab currently selected.

FIG. 23 is a view of an industrial IDE workspace canvas on which a portion of an example structure text program is rendered in response to selection of a structured text application node.

FIG. 30 is an example Available Tabs menu.

DETAILED DESCRIPTION

Figure 1:
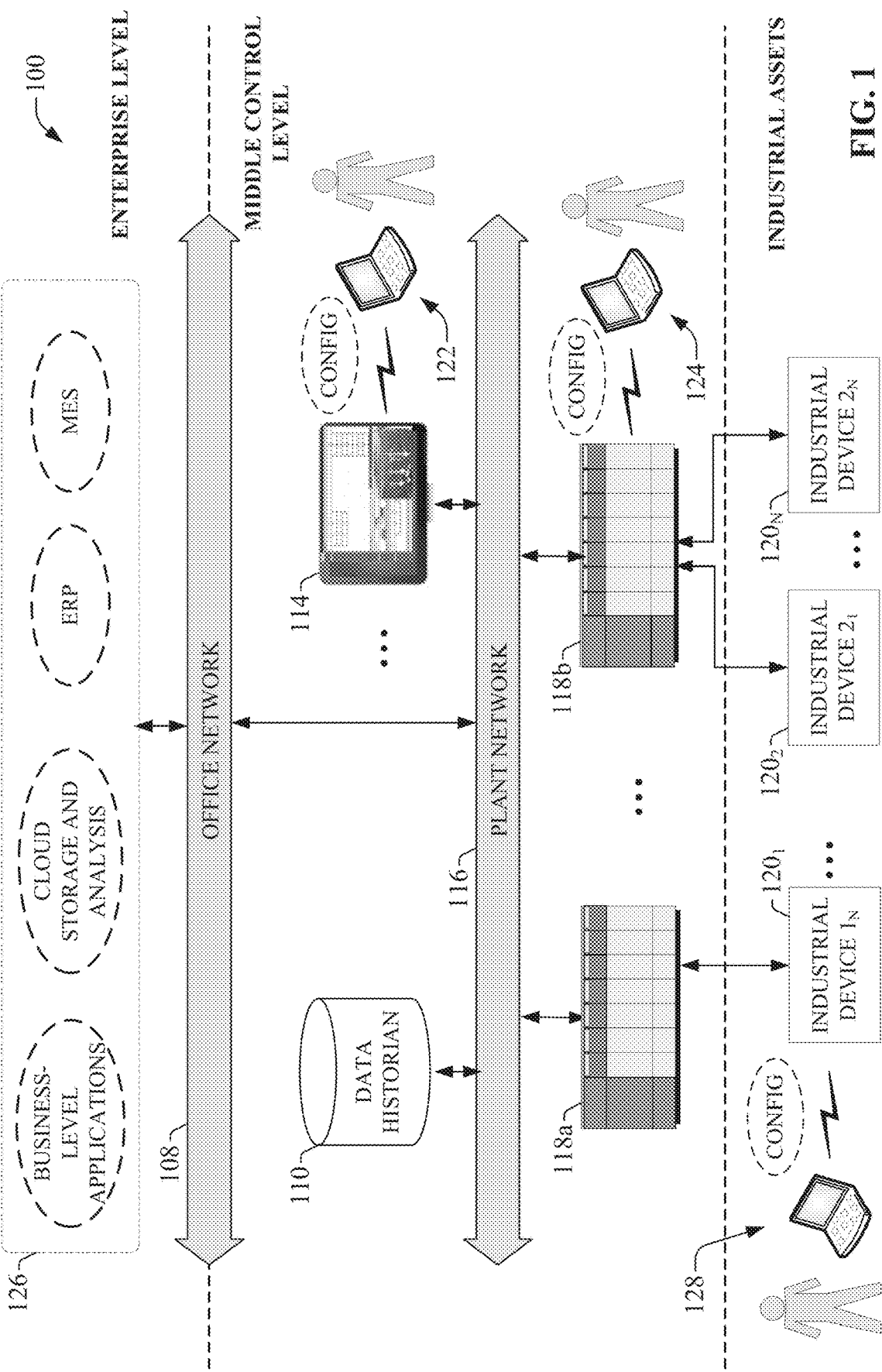
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to the HMI 114. Some industrial devices 120—such as motor drives, telemetry devices, safety input devices, etc.—may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc.—may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

Industrial development platforms are also limited in terms of the development interfaces offered to the user to facilitate programming and configuration. These interfaces typically offer a fixed user experience that requires the user to develop control code, visualizations, or other control system aspects using a relatively fixed set of development interfaces. In many development scenarios, the number of editing options—e.g., function buttons or other selectable editing controls, configuration fields, etc.—that are displayed on the development platform's interface exceed the number required by the developer for a current project development task, resulting in an unnecessarily cluttered development workspace and rendering it difficult to locate a desired editing option.

To address at least some of these or other issues, one or more embodiments described herein provide an integrated development environment (IDE) for designing, programming, and configuring multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In some embodiments, the development interface rendered by the IDE system can afford the user a great deal of control over the editing tools, workspace canvases, and project information rendered at a given time. The IDE system also automatically filters the tools, panels, and information available for selection based on a determination of the current project development task being carried out by the user, such that a focused subset of editing tools relevant to a current development task are made available for selection while other tools are hidden. The development interface also allows the user to selectively render or hide selected tools or information from among the relevant, filtered set of tools. This approach can reduce or eliminate unnecessary clutter and assist the developer in quickly and easily locating and selecting a desired editing function. The IDE's development interface can also conform to a structured organization of workspace canvases and panels that facilitates intuitive workflow.

Figure 2:
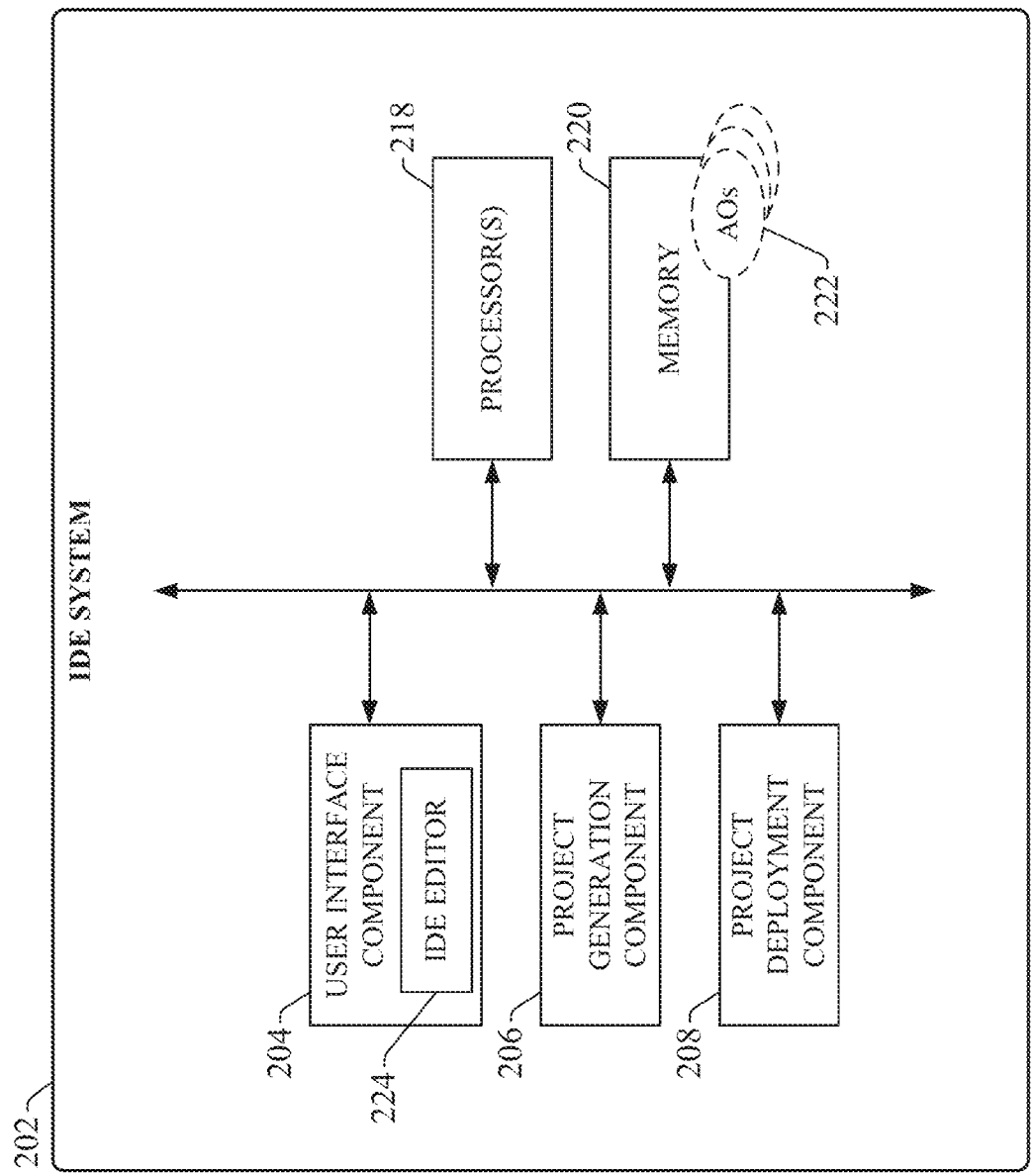
FIG. 2 is a block diagram of an example integrated development environment (IDE) system.

FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including an IDE editor 224, a project generation component 206, a project deployment component 208, one or more processors 218, and memory 220. In various embodiments, one or more of the user interface component 204, project generation component 206, project deployment component 208, the one or more processors 218, and memory 220 can be electrically and/or communicatively coupled to one another to perform one or more of the functions of the IDE system 202. In some embodiments, components 204, 206, and 208 can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 204 can be configured to generate and serve development interface screens to a client device (e.g., program development screens), and exchange data via these interface screens. As will be described in more detail herein, the development interfaces rendered by the user interface component 204 support a number of user experience features that simplify project development workflow, reduce stress associated with an overcluttered development workspace, and assist developers to locate desired editing functions more quickly and easily. Input data that can be received via various embodiments of user interface component 204 can include, but is not limited to, programming code, industrial design specifications or goals, engineering drawings, AR/VR input, DSL definitions, video or image data, or other such input. Output data rendered by various embodiments of user interface component 204 can include program code, programming feedback (e.g., error and highlighting, coding suggestions, etc.), programming and visualization development screens, etc.

Project generation component 206 can be configured to create a system project comprising one or more project files based on design input received via the user interface component 204, as well as industrial knowledge, predefined code modules and visualizations, and automation objects 222 maintained by the IDE system 202. Project deployment component 208 can be configured to commission the system project created by the project generation component 206 to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
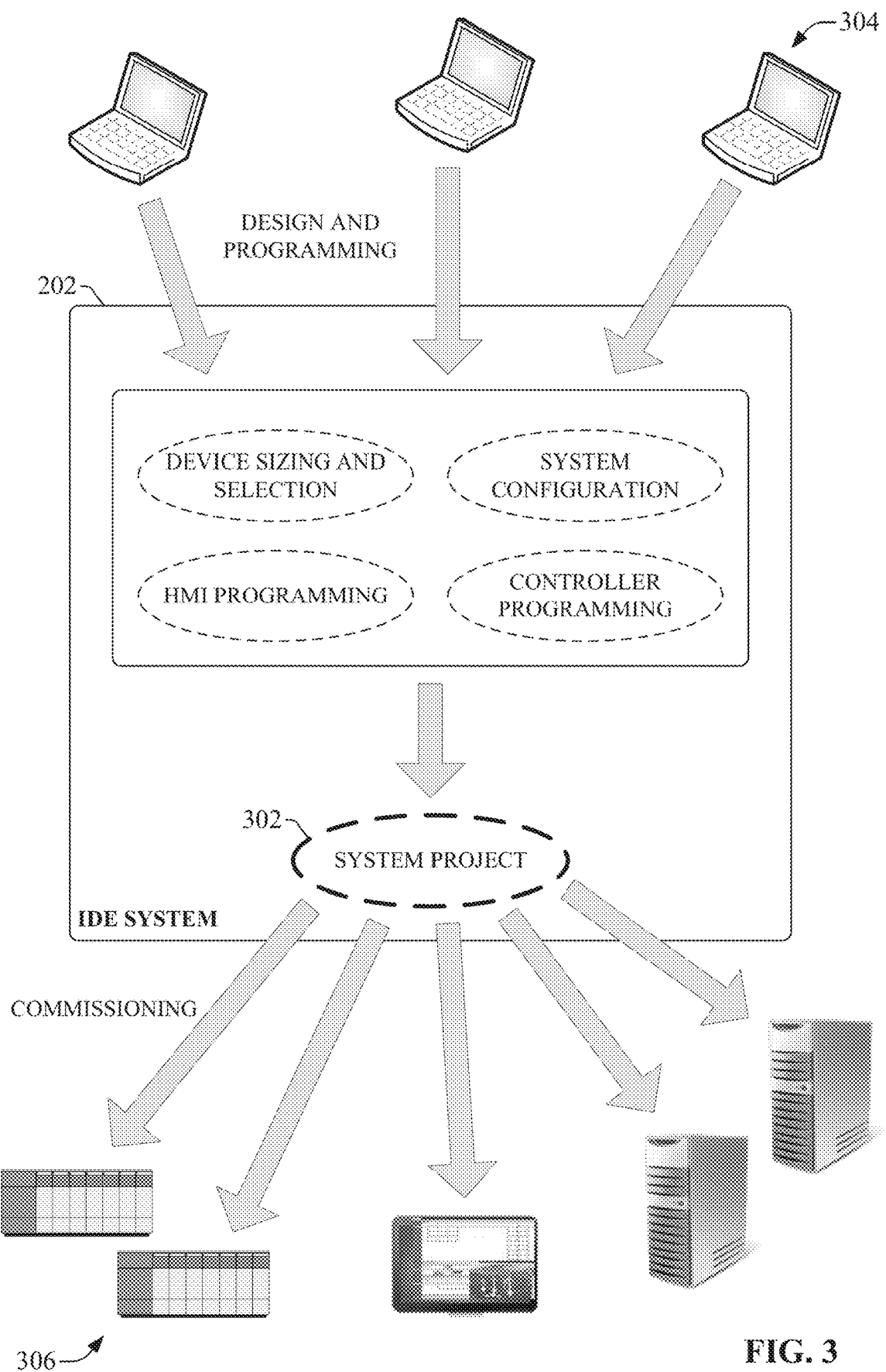
FIG. 3 is a diagram illustrating a generalized architecture of an industrial IDE system.

FIG. 3 is a diagram illustrating a generalized architecture of the industrial IDE system 202 according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
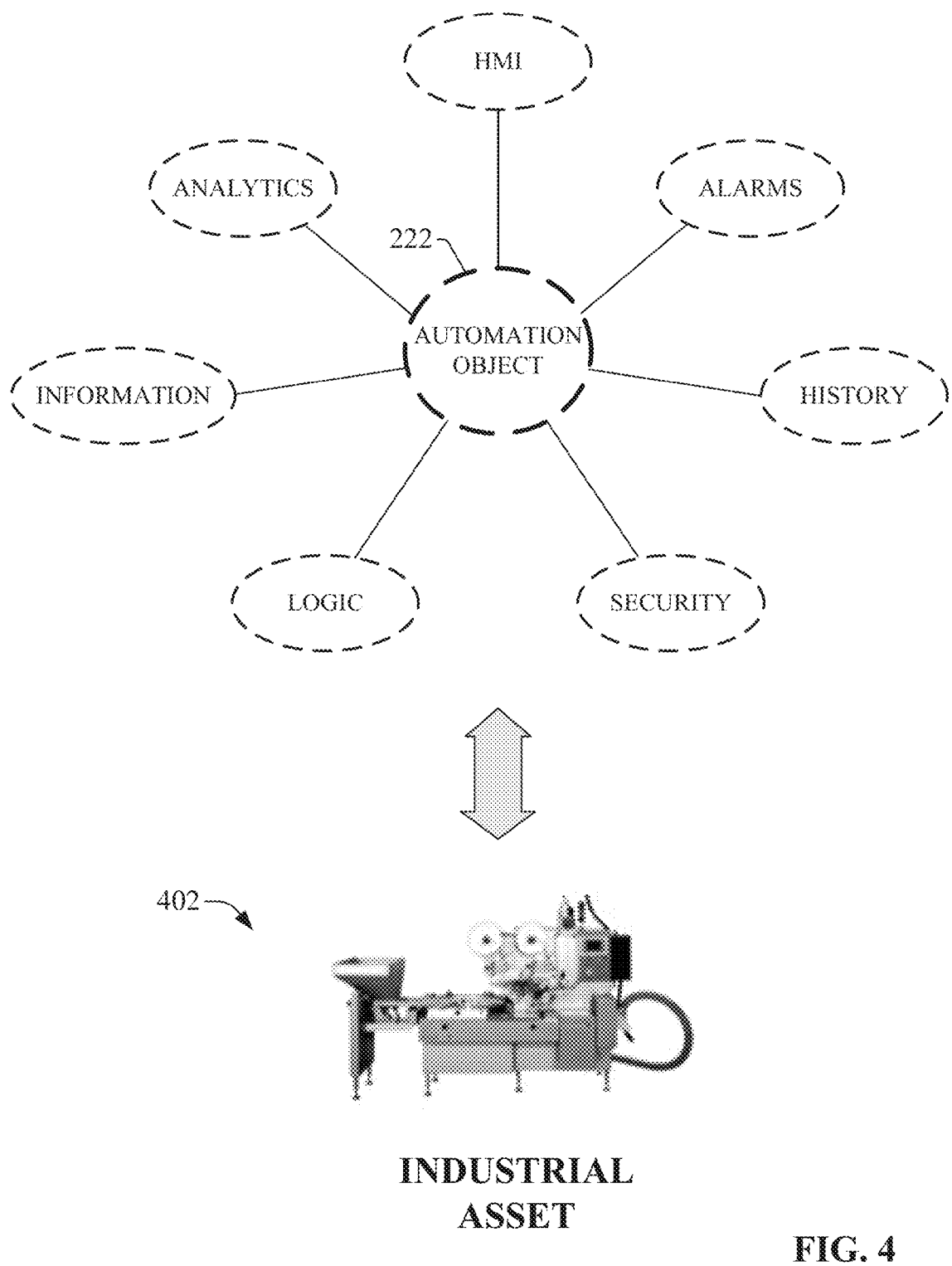
FIG. 4 is a diagram illustrating several example automation object properties that can be leveraged by the IDE system in connection with building, deploying, and executing a system project.

To support enhanced development capabilities, some embodiments of IDE system 202 can be built on an object-based data model rather than a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an automation object library 502 (e.g., part of memory 220) for reuse. The automation object library 502 can store predefined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols, validation reports, simulations, schematics, security protocols, and other such properties associated with the industrial asset 402 represented by the object 222. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402, and can be incorporated into a system project 302 as elements of control code, a 2D or 3D visualization, a knowledgebase or maintenance guidance system for the industrial assets, or other such aspects.

Figure 5:
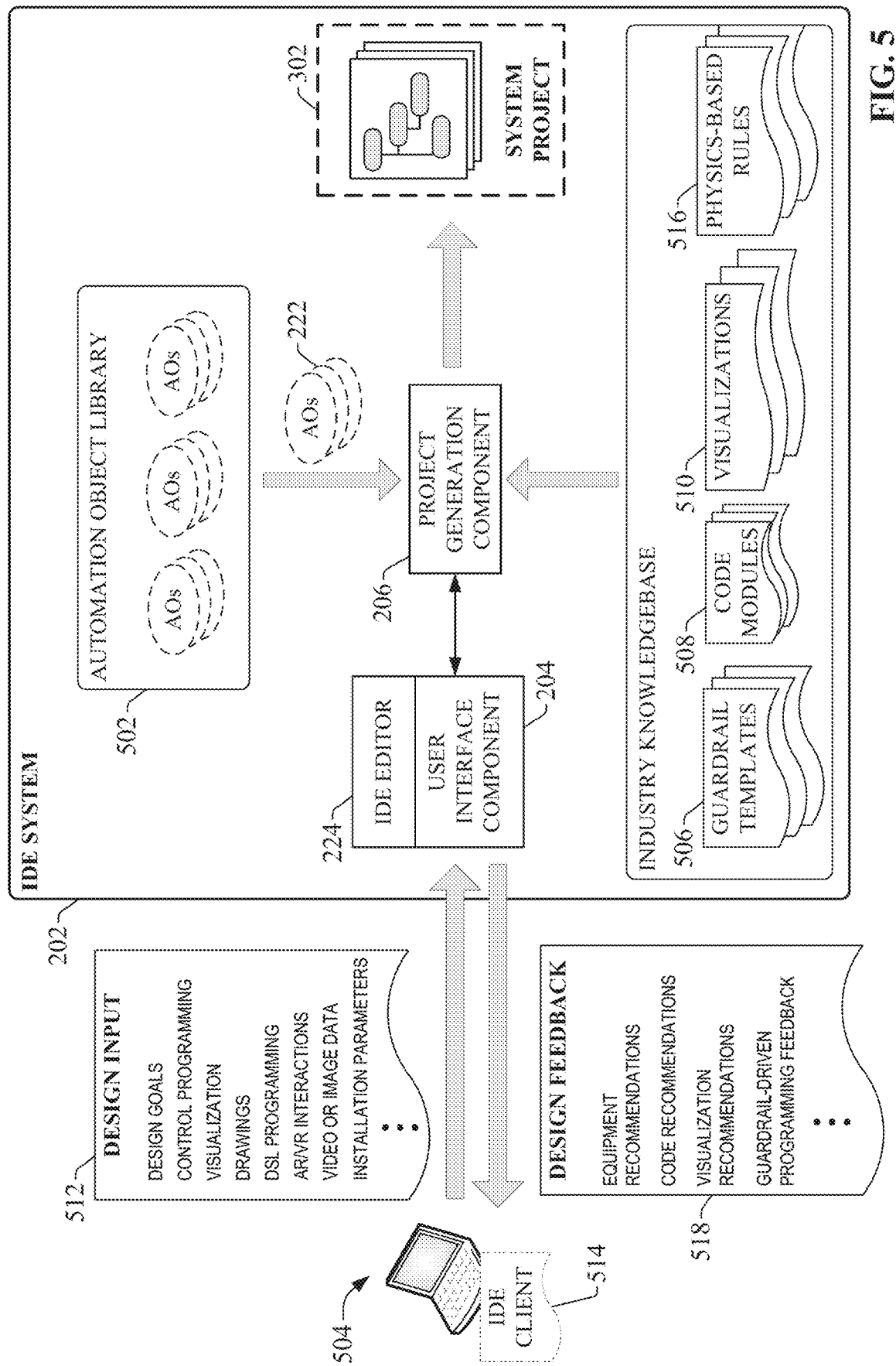
FIG. 5 is a diagram illustrating example data flows associated with creation of a system project for an automation system being designed using an industrial IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) executing an IDE client application 514 can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. Based on this design input 512 and information stored in an industry knowledgebase (predefined code modules 508 and visualizations 510, guardrail templates 506, physics-based rules 516, etc.), user interface component 204 renders design feedback 518 designed to assist the developer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P&ID drawings, mechanical drawings, flow diagrams, or other such documents. For example, a P&ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements across different drawings) and intelligently associate these elements with appropriate automation objects 222, code modules 508, and/or visualizations 510. The IDE system 202 can leverage physics-based rules 516 as well as pre-defined code modules 508 and visualizations 510 as necessary in connection with generating code or project data for system project 302.

The IDE system 202 can also determine whether pre-defined visualization content is available for any of the objects discovered in the drawings and generate appropriate HMI screens or AR/VR content for the discovered objects based on these pre-defined visualizations. To this end, the IDE system 202 can store industry-specific, asset-specific, and/or application-specific visualizations 510 that can be accessed by the project generation component 206 as needed. These visualizations 510 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 510 can comprise visualizations in a variety of formats, including but not limited to HMI screens or windows, mashups that aggregate data from multiple pre-specified sources, AR overlays, VR objects representing 3D virtualizations of the associated industrial asset, or other such visualization formats. IDE system 202 can select a suitable visualization for a given object based on a predefined association between the object type and the visualization content.

In another example, markings applied to an engineering drawing by a user can be understood by some embodiments of the project generation component 206 to convey a specific design intention or parameter. For example, a marking in red pen can be understood to indicate a safety zone, two circles connected by a dashed line can be interpreted as a gearing relationship, and a bold line may indicate a camming relationship. In this way, a designer can sketch out design goals on an existing drawing in a manner that can be understood and leveraged by the IDE system 202 to generate code and visualizations. In another example, the project generation component 206 can learn permissives and interlocks (e.g., valves and their associated states) that serve as necessary preconditions for starting a machine based on analysis of the user's CAD drawings. Project generation component 206 can generate any suitable code (ladder logic, function blocks, etc.), device configurations, and visualizations based on analysis of these drawings and markings for incorporation into system project 302. In some embodiments, user interface component 204 can include design tools for developing engineering drawings within the IDE platform itself, and the project generation component 206 can generate this code as a background process as the user is creating the drawings for a new project. In some embodiments, project generation component 206 can also translate state machine drawings to a corresponding programming sequence, yielding at least skeletal code that can be enhanced by the developer with additional programming details as needed.

Also, or in addition, some embodiments of IDE system 202 can support goal-based automated programming. For example, the user interface component 204 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 206 can also generate at least some of the project code for system project 302 based on knowledge of parts that have been ordered for the project being developed. This can involve accessing the customer's account information maintained by an equipment vendor to identify devices that have been purchased for the project. Based on this information the project generation component 206 can add appropriate automation objects 222 and associated code modules 508 corresponding to the purchased assets, thereby providing a starting point for project development.

Some embodiments of project generation component 206 can also monitor customer-specific design approaches for commonly programmed functions (e.g., pumping applications, batch processes, palletizing operations, etc.) and generate recommendations for design modules (e.g., code modules 508, visualizations 510, etc.) that the user may wish to incorporate into a current design project based on an inference of the designer's goals and learned approaches to achieving the goal. To this end, some embodiments of project generation component 206 can be configured to monitor design input 512 over time and, based on this monitoring, learn correlations between certain design actions (e.g., addition of certain code modules or snippets to design projects, selection of certain visualizations, etc.) and types of industrial assets, industrial sequences, or industrial processes being designed. Project generation component 206 can record these learned correlations and generate recommendations during subsequent project development sessions based on these correlations. For example, if project generation component 206 determines, based on analysis of design input 512, that a designer is currently developing a control project involving a type of industrial equipment that has been programmed and/or visualized in the past in a repeated, predictable manner, the project generation component 206 can instruct user interface component 204 to render recommended development steps or code modules 508 the designer may wish to incorporate into the system project 302 based on how this equipment was configured and/or programmed in the past.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback designed to guide the developer in a manner that ensures compliance of the system project 302 with internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, error and syntax highlighting, etc.—in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programing is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback (a subset of design feedback 518) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and project generation component 206 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions as part of design feedback 518, project generation component 206 can invoke selected code modules 508 stored in a code module database (e.g., on memory 220). These code modules 508 comprise standardized coding segments for controlling common industrial tasks or applications (e.g., palletizing, flow control, web tension control, pick-and-place applications, conveyor control, etc.). In some embodiments, code modules 508 can be categorized according to one or more of an industrial vertical (e.g., automotive, food and drug, oil and gas, textiles, marine, pharmaceutical, etc.), an industrial application, or a type of machine or device to which the code module 508 is applicable. In some embodiments, project generation component 206 can infer a programmer's current programming task or design goal based on programmatic input being provided by a the programmer (as a subset of design input 512), and determine, based on this task or goal, whether one of the pre-defined code modules 508 may be appropriately added to the control program being developed to achieve the inferred task or goal. For example, project generation component 206 may infer, based on analysis of design input 512, that the programmer is currently developing control code for transferring material from a first tank to another tank, and in response, recommend inclusion of a predefined code module 508 comprising standardized or frequently utilized code for controlling the valves, pumps, or other assets necessary to achieve the material transfer.

Customized guardrail templates 506 can also be defined to capture nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In some embodiments, project generation component 206 can also determine whether some or all existing equipment can be repurposed for the new control system being designed. For example, if a new bottling line is to be added to a production area, there may be an opportunity to leverage existing equipment since some bottling lines already exist. The decision as to which devices and equipment can be reused will affect the design of the new control system. Accordingly, some of the design input 512 provided to the IDE system 202 can include specifics of the customer's existing systems within or near the installation site. In some embodiments, project generation component 206 can apply artificial intelligence (AI) or traditional analytic approaches to this information to determine whether existing equipment specified in design in put 512 can be repurposed or leveraged. Based on results of this analysis, project generation component 206 can generate, as design feedback 518, a list of any new equipment that may need to be purchased based on these decisions.

In some embodiments, IDE system 202 can offer design recommendations based on an understanding of the physical environment within which the automation system being designed will be installed. To this end, information regarding the physical environment can be submitted to the IDE system 202 (as part of design input 512) in the form of 2D or 3D images or video of the plant environment. This environmental information can also be obtained from an existing digital twin of the plant, or by analysis of scanned environmental data obtained by a wearable AR appliance in some embodiments. Project generation component 206 can analyze this image, video, or digital twin data to identify physical elements within the installation area (e.g., walls, girders, safety fences, existing machines and devices, etc.) and physical relationships between these elements. This can include ascertaining distances between machines, lengths of piping runs, locations and distances of wiring harnesses or cable trays, etc. Based on results of this analysis, project generation component 206 can add context to schematics generated as part of system project 302, generate recommendations regarding optimal locations for devices or machines (e.g., recommending a minimum separation between power and data cables), or make other refinements to the system project 302. At least some of this design data can be generated based on physics-based rules 516, which can be referenced by project generation component 206 to determine such physical design specifications as minimum safe distances from hazardous equipment (which may also factor into determining suitable locations for installation of safety devices relative to this equipment, given expected human or vehicle reaction times defined by the physics-based rules 516), material selections capable of withstanding expected loads, piping configurations and tuning for a specified flow control application, wiring gauges suitable for an expected electrical load, minimum distances between signal wiring and electromagnetic field (EMF) sources to ensure negligible electrical interference on data signals, or other such design features that are dependent on physical rules.

In an example use case, relative locations of machines and devices specified by physical environment information submitted to the IDE system 202 can be used by the project generation component 206 to generate design data for an industrial safety system. For example, project generation component 206 can analyze distance measurements between safety equipment and hazardous machines and, based on these measurements, determine suitable placements and configurations of safety devices and associated safety controllers that ensure the machine will shut down within a sufficient safety reaction time to prevent injury (e.g., in the event that a person runs through a light curtain).

In some embodiments, project generation component 206 can also analyze photographic or video data of an existing machine to determine inline mechanical properties such as gearing or camming and factor this information into one or more guardrail templates 506 or design recommendations.

Figure 6:
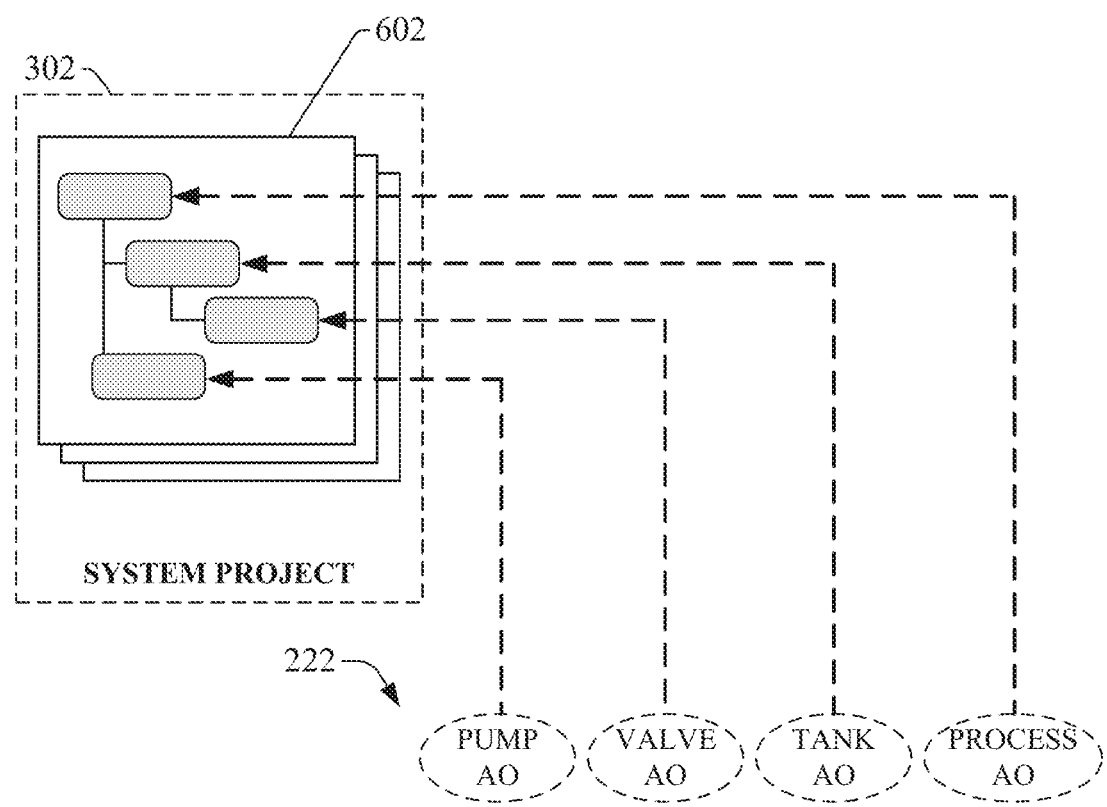
FIG. 6 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 6 is a diagram illustrating an example system project 302 that incorporates automation objects 222 into the project model. In this example, various automation objects 222 representing analogous industrial devices, systems, or assets of an automation system (e.g., a process, tanks, valves, pumps, etc.) have been incorporated into system project 302 as elements of a larger project data model 602. The project data model 602 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222 are default properties defined by the IDE system 202 based on encoded industry expertise pertaining to the asset represented by the objects. Other properties can be modified or added by the developer as needed (via design input 512) to customize the object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 7:
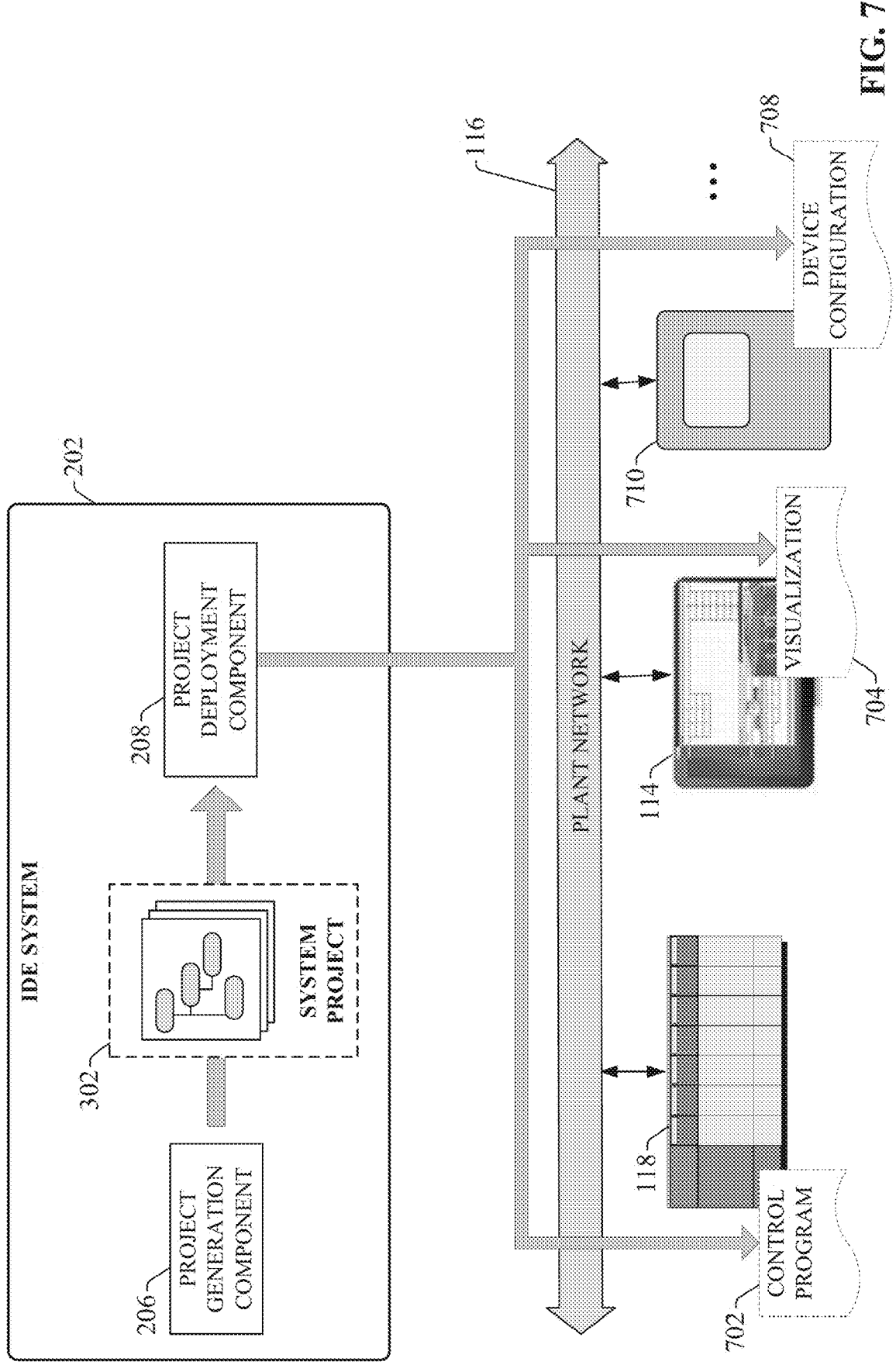
FIG. 7 is a diagram illustrating commissioning of a system project.

Once development on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include—among other project aspects—control code, visualization screen definitions, and motor drive parameter definitions. Upon completion of project development, a user can identify which target devices-including an industrial controller 118, an HMI terminal 114, and a motor drive 710—are to execute or receive these respective aspects of the system project 302. Project deployment component 208 can then translate the controller code defined by the system project 302 to a control program file 702 formatted for execution on the specified industrial controller 118 and send this control program file 702 to the controller 118 (e.g., via plant network 116). Similarly, project deployment component 208 can translate the visualization definitions and motor drive parameter definitions to a visualization application 704 and a device configuration file 708, respectively, and deploy these files to their respective target devices for execution and/or device configuration.

In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different sets of control equipment. That is, some embodiments of the IDE system 202 can allocate project code to different target devices as a function of the particular devices found on-site. IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., if different pump types are found at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 8:
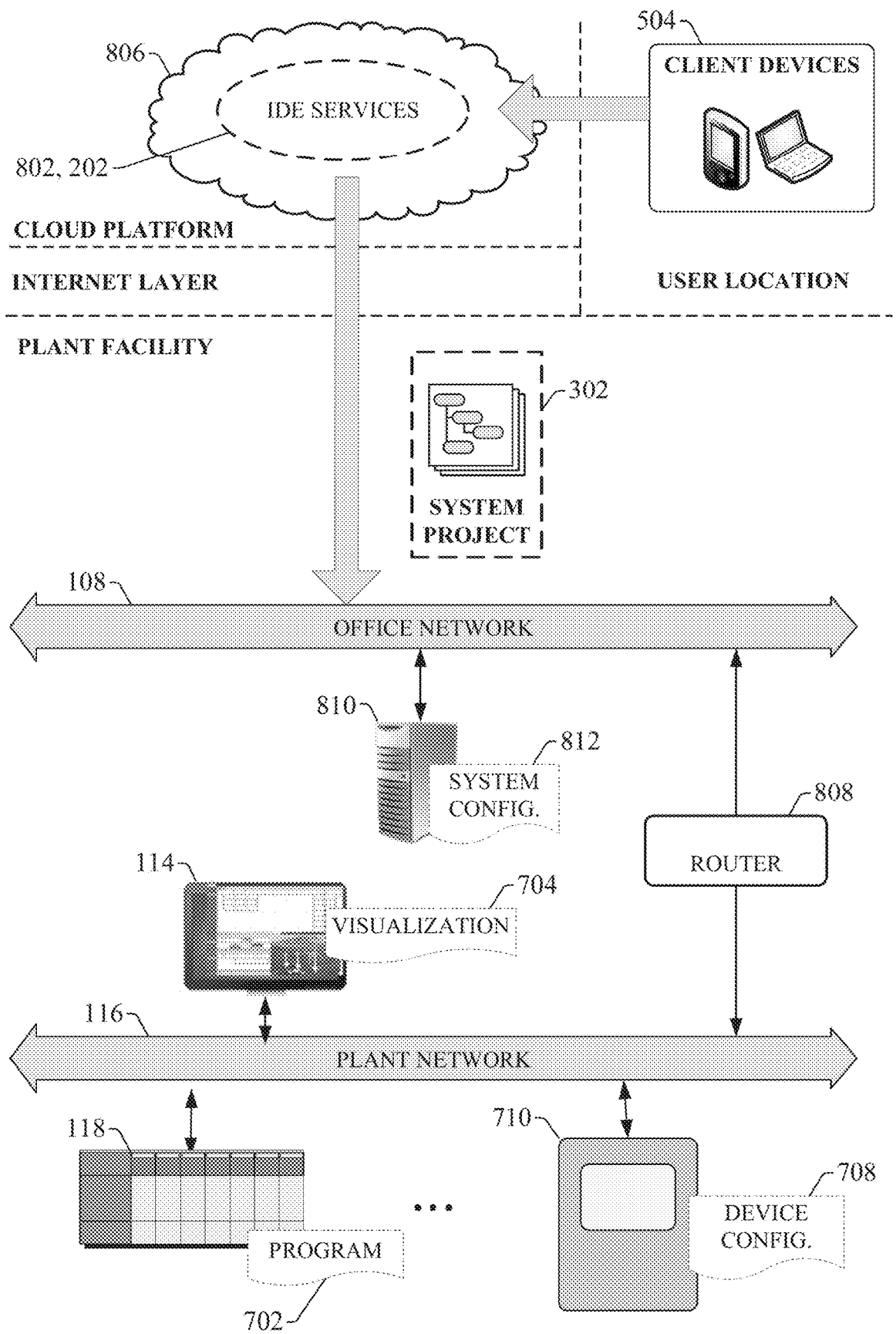
FIG. 8 is a diagram illustrating an example architecture in which cloud-based IDE services are used to develop and deploy industrial applications to a plant environment.

As noted above, some embodiments of IDE system 202 can be embodied on a cloud platform. FIG. 8 is a diagram illustrating an example architecture in which cloud-based IDE services 802 are used to develop and deploy industrial applications to a plant environment. In this example, the industrial environment includes one or more industrial controllers 118, HMI terminals 114, motor drives 710, servers 810 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 810 reside on a separate office network 108 that is connected to the plant network 116 (e.g., through a router 808 or other network infrastructure device).

In this example, IDE system 202 resides on a cloud platform 806 and executes as a set of cloud-based IDE service 802 that are accessible to authorized remote client devices 504. Cloud platform 806 can be any infrastructure that allows shared computing services (such as IDE services 802) to be accessed and utilized by cloud-capable devices. Cloud platform 806 can be a public cloud accessible via the Internet by devices 504 having Internet connectivity and appropriate authorizations to utilize the IDE services 802. In some scenarios, cloud platform 806 can be provided by a cloud provider as a platform-as-a-service (PaaS), and the IDE services 802 can reside and execute on the cloud platform 806 as a cloud-based service. In some such configurations, access to the cloud platform 806 and associated IDE services 802 can be provided to customers as a subscription service by an owner of the IDE services 802. Alternatively, cloud platform 806 can be a private cloud operated internally by the industrial enterprise (the owner of the plant facility). An example private cloud platform can comprise a set of servers hosting the IDE services 802 and residing on a corporate network protected by a firewall.

Cloud-based implementations of IDE system 202 can facilitate collaborative development by multiple remote developers who are authorized to access the IDE services 802. When a system project 302 is ready for deployment, the project 302 can be commissioned to the plant facility via a secure connection between the office network 108 or the plant network 116 and the cloud platform 806. As discussed above, the industrial IDE services 802 can translate system project 302 to one or more appropriate executable files— control program files 702, visualization applications 704, device configuration files 708, system configuration files 812—and deploy these files to the appropriate devices in the plant facility to facilitate implementation of the automation project.

Figure 9:
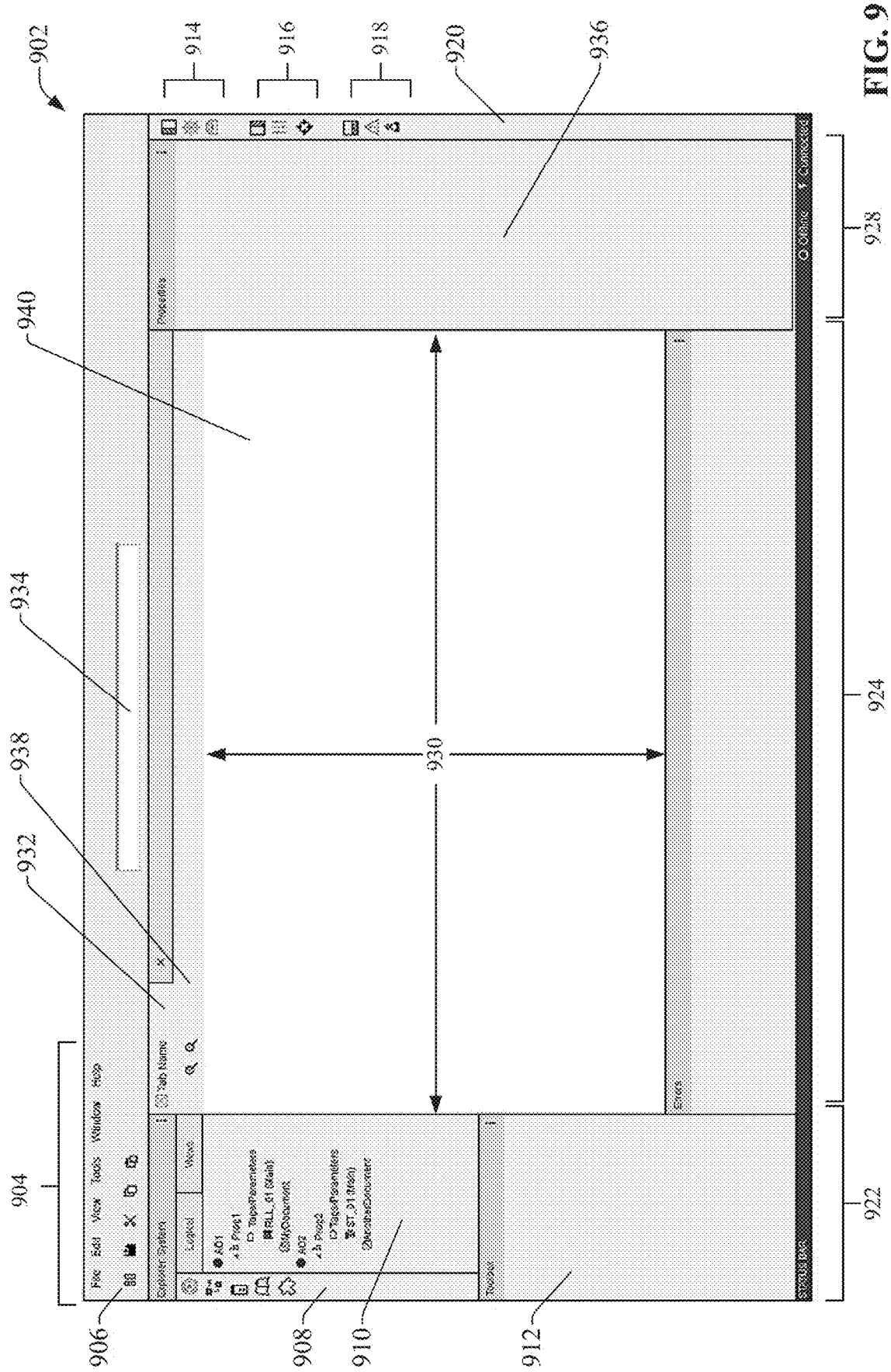
FIG. 9 is an example development interface that can be rendered by one or more embodiments of an industrial IDE system's user interface component.

FIG. 9 is an example development interface 902 that can be rendered by one or more embodiments of the industrial IDE system's user interface component 204. Development interface 902 is organized into panels and workspaces in a manner to be described in more detail herein, and supports automated and manual curation features that declutter the development space and bring a subset of project editing functions that are relevant to a current development task into focus. These features can improve the user's development workflow experience by filtering out selectable options that are not relevant to a current development task, allowing relevant editing tools and information to be located more easily.

The basic structure of development interface 902 comprises a canvas area 930 in which resides a workspace canvas 940 (having an associated tab 932), a global panel control bar 920 on the right-side edge of the interface 902 (to the right of the canvas area 930), a menu bar 904 along the top edge of the interface 902, and a tool bar 906 below the menu bar 904. Other panels can be selectively added or removed from the interface's workspace using visibility control icons on the global panel control bar 920 or via selectable options under the View option of the menu bar 904. These panels can be added to or removed from three main panel area—a left global panel area 922, a bottom global panel area 924, and a right global panel area 928. In the example scenario depicted in FIG. 9, a Properties panel 936 is visible in the right global panel area 928, and an Explorer panel 910 and a Toolbox panel 912 have been rendered in a vertically stacked arrangement in the left global panel area 922. Development interface 902 can also include a search bar 934 for searching the open project using text string searches. The search bar 934 can also be used for inserting text or initiating a shortcut in some embodiments.

Figure 10B:
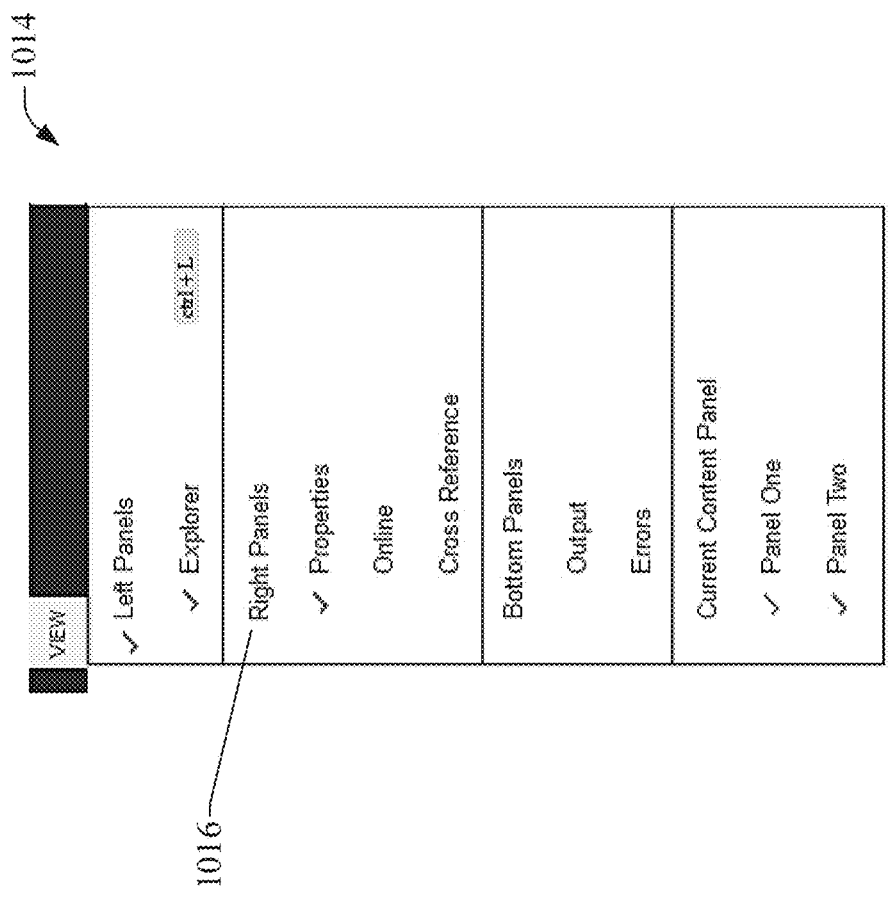
FIG. 10b is an example View menu that can be rendered as a drop-down menu in response to selection of a View option in a menu bar of an industrial IDE system.
Figure 10A:
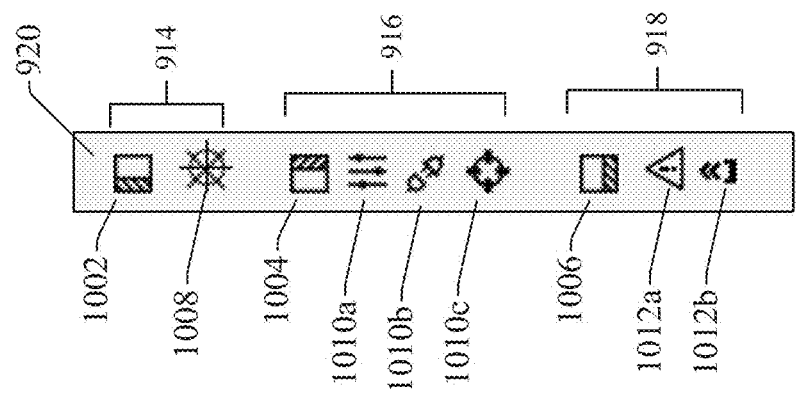
FIG. 10a is a close-up view of a global panel control bar illustrating an example organization of panel visibility icons.

FIG. 10*a* is a close-up view of the global panel control bar 920 illustrating an example organization of panel visibility icons. Visibility icons are organized vertically into three groups along the global panel control bar 920, the respective groups residing in a global left panel control area 914, a global right panel control area 916, and a global bottom panel control area 918 of the control bar 920. The three panel control areas are labeled with respective header icons 1002, 1004, and 1006 illustrating which global panel area (left, right, or bottom) are controlled by the associated icons. In the illustrated example, the left panel control area 914 comprises an Explorer visibility icon 1008 that, in response to selection, toggles the visibility of the Explorer panel 910 in the left global panel area 922. The right panel control area 916 comprises three visibility icons 1010*a*-1010*c*, which control visibility of a Properties panel (visibility icon 1010*a*), an Online panel (visibility icon 1010*b*), and a Cross Reference panel (visibility icon 1010*c*), respectively, in the right global panel area 928. The bottom panel control area 918 comprises two visibility icons 1012*a* and 1012*b*, which control visibility of an Errors panel (visibility icon 1012*a*) and an Output panel (visibility icon 1012*b*), respectively, in the bottom global panel area 924.

The visibility icons on global panel control bar 920 can act as toggle buttons that toggle the visibility of their corresponding panels, such that selecting the icon a first time causes the corresponding panel to be rendered in its designated area, and selecting the icon a second time removes its corresponding panel from its designated area. The visibility icons can be color animated such that the color of the icon indicates the visible or hidden state of the corresponding panel (e.g., black for hidden and blue for visible).

FIG. 10*b* is an example View menu 1014 that can be rendered as a drop-down menu in response to selection of the View option in the menu bar 904. View menu 1014 renders selectable visibility controls corresponding to, and having the same functionality as, the visibility icons rendered on the global panel control bar 920, allowing the user to selectively render and hide panels using either this menu 1014 or the global panel control bar 920. Similar to the global panel control bar 920, the selectable visibility controls are organized according to Left Panels, Right Panels, and Bottom Panels. Unlike the global panel control bar 920, the selectable controls of the View menu 1014 are rendered as selectable text rather than icons, with checkmarks indicating panels that are currently visible.

In some embodiments, any panels associated with a global panel area (left, right, or bottom) that have been set to be pinned (to be discussed below) can be rendered visible or invisible with a single selection by selecting either the header icon (icon 1002, 1004, or 1006) corresponding to that area in the global panel control bar 920 or the header text for that set of panels (e.g., the Right Panels header 1016) in the View menu 1014.

In some embodiments, the panels whose visibility is controlled from the global panel control bar 920 can be global panels that are relevant to all development tasks or contexts supported by the industrial IDE system 202 (content panels, which are relevant to specific development tasks or contexts, will be described below). In the example depicted in FIGS. 10*a* and 10*b*, the global panels include an Explorer panel through which a user can browse and select aspects or elements of the automation project, a Properties panel that renders property information for a selected element within canvas area 930, an Online panel that renders communication statistics for the industrial IDE system, a Cross Reference panel that renders cross reference information for a selected element within canvas area 930 (e.g., by listing all usages or instances of the selected element within the industrial automation system project), an Output panel that renders output states, and an Errors panel that lists active and/or historical development or runtime errors. However, any type of global panel can be supported by the development interface 902 without departing from the scope of one or more embodiments. For example, a Toolbox panel that renders a set of global editing tools—or links to a specific subset of editing tools of selected categories—may also be supported as a global panel.

In some embodiments, a panel's transition between visible and invisible states can be animated, such that invoking a panel causes the panel to slide from a designated edge of the development interface 902 (left, right or bottom), toward the middle of the interface 902 until the panel is fully extended and visible. Similarly, instructing a visible panel to switch to the hidden state causes the panel to retract toward the edge from which the panel initially extended.

Panels supported by the IDE system 202 can be generally classified into two types—global panels and content panels. Global panels are globally applicable to all development contexts, and can include, but are not limited to, the global panels discussed above. The visibility icons corresponding to global panels are always fixed on the panel control bar 920.

In contrast to global panels, content panels are not globally applicable, but rather are relevant or applicable only to a specific development task or context (e.g., ladder logic control programming, function block diagram control programming, sequential function chart control programming, structured text control programming, HMI screen development, device configuration, controller tag definition, etc.). Content panels can include, but are not limited to, a Layers panel that facilitates browsing through layers of graphical content (e.g., engineering drawings, HMI screens, etc.), an Alarms panel that renders configurable alarm definition data for selected alarm tags, a Logic Editor panel that renders selectable program elements that can be added to a ladder logic program (e.g., output coils, contacts, function blocks, etc.), an HMI screen development panel that renders selectable graphical elements that can be added to an HMI screen, or other such content panels. Visibility icons for content panels are located on the canvas toolbar 938 (see, e.g., FIG. 9) along the top edge of the canvas 940, and the set of content panel visibility icons available on the toolbar 938 is a function of the type of content (e.g., control programming, HMI development screens, etc.) rendered in the canvas 940. Thus, content panels will only be available for selection if the user is currently focused on the development task or context to which the content panel is relevant (based on which canvas 940 currently has focus within the development interface 902, and the type of project content rendered by the canvas 940). Example types of project content that can be associated with a dedicated set of content panels (and associated visibility icons) can include, but are not limited to, a ladder logic routine, a function block diagram routine, a structured text routine, a sequential function chart routine, a tag database, an HMI screen or application, a faceplate, various types of device views (e.g., controllers, drives, I/O modules, etc.), an engineering drawing, or other such content types.

Figure 11A:
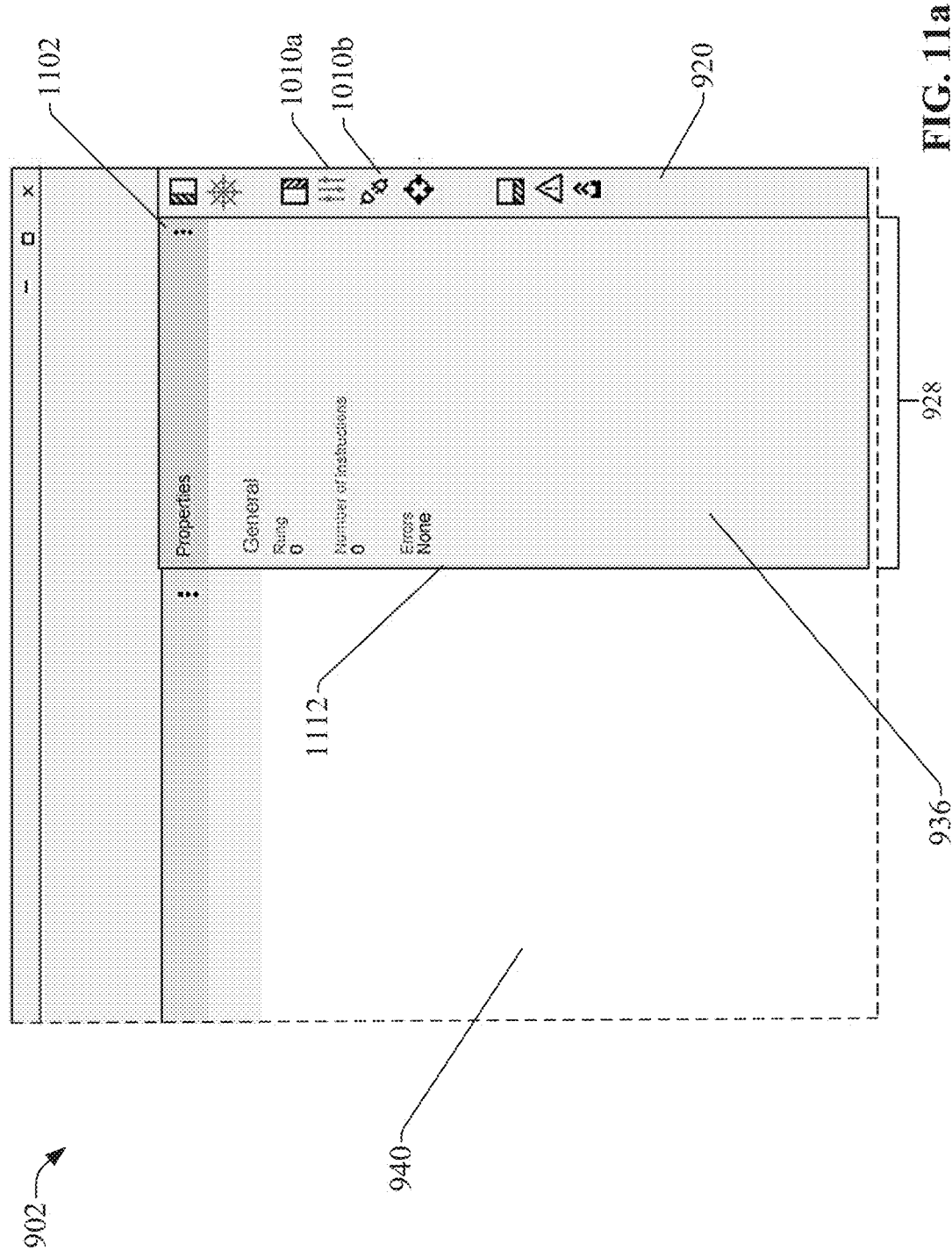
FIG. 11a is a view of a top right corner of a development interface depicting a Properties panel pinned in a right global panel area.

In general, any of the panels associated with the left global panel area 922, right global panel area 928, or bottom global panel area 924 can be selectively set to be a pinned panel or an overlay panel. FIG. 11a is a view of the top right corner of development interface 902 depicting a Properties panel 936 pinned in the right global panel area 928. Visibility icon 1010a—corresponding to the Properties panel 936—is highlighted to indicate that the Properties panel 936 is visible. Any of the panels can be selectively set to be pinned or unpinned (i.e. overlaid) by selecting a suitable control; e.g., a control selected from a drop-down panel setting menu that can be invoked by selecting the panel menu icon 1102 in the top right corner of the panel. In some embodiments, a panel can also be selectively rendered as a pinned panel or as an overlay panel by selecting an appropriate control from a right-click menu associated with the corresponding visibility icon in the global panel control bar 920. Setting a panel to be pinned simulates pinning the panel to the background while visible, while setting a panel to be an overlay (unpinned) causes the panel to be rendered as an overlay over any pinned panels, or other interface content (e.g., canvas content), that may already be invoked in that part of the display.

When a pinned panel is invoked, user interface component 204 reduces the width of the canvas area 930 (or reduces the canvas area's height in the case of pinned panels in the bottom global panel area 924) to accommodate the pinned panel. This also causes one or more canvases 940 within the canvas area 930 to be similarly reduced in size. This can be seen in FIG. 11a, where the right edge 1112 of the canvas area 930 has shifted toward the middle of the interface 902 to accommodate the width of the pinned panel 936, such that the right edge 1112 of the canvas area 930 is abutted against the left edge of the panel 936. When an overlay panel is invoked, the size of the canvas area 930 is not adjusted, and instead the panel is rendered as an overlay over a portion of the canvas, obscuring a portion of the canvas content behind the panel.

FIG. 11b is a view of the top right corner of the development interface 902 depicting selection of an Online panel 1104 as an overlaid panel in the right global panel area 928. As shown in this figure, selection of the Online panel visibility icon 1010b while the pinned Properties panel 936 is visible causes the Online panel 1104—which is currently set to be an overlay panel—to be displayed over the Properties panel. A panel set to be an overlay can be rendered with a shadow effect 1106 to convey that the panel is an overlay rather than a pinned panel (which is not rendered with a shadow effect). The width of the overlaid panel (e.g., Online panel 1104 in FIG. 11b) can be resized by clicking on or otherwise selecting the outer edge of the panel and sliding the edge inward or outward. Reducing the width of the overlay panel causes portions of any pinned panels underneath the overlay panel to be revealed. Although pinned and overlay panel effects are illustrated in FIGS. 11a and 11b with reference to the right global panel area 928, these effects are also applicable to the left global panel area 922 and bottom global panel area 924.

Figure 11C:
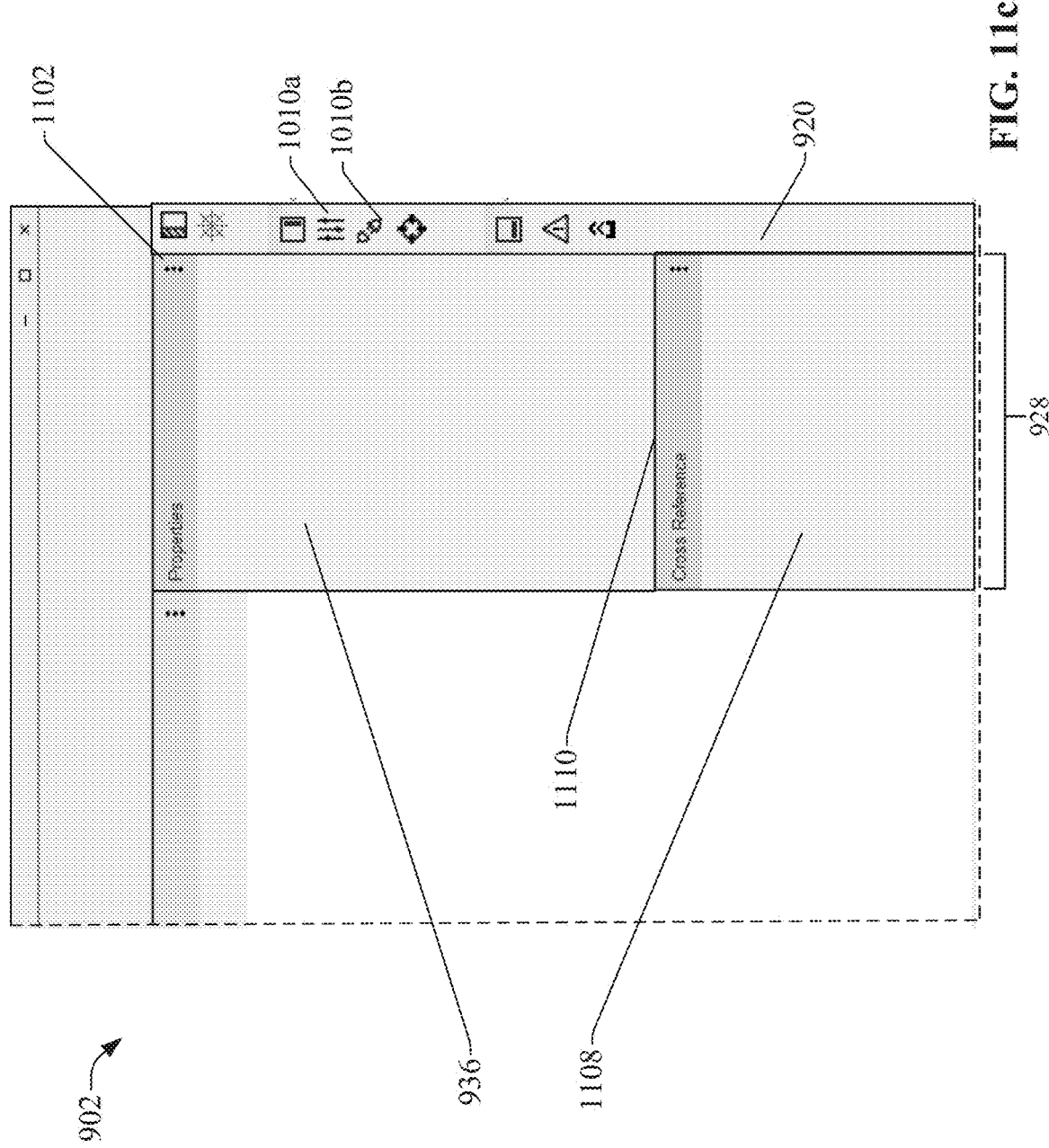
FIG. 11c is a view of the top right corner of the development interface depicting two pinned panels that are visible simultaneously.

FIG. 11c is a view of the top right corner of development interface 902 depicting two pinned panels—Properties panel 936 and Cross Reference Panel 1108—that are visible simultaneously. In this example, the Properties panel visibility icon 1010a and the Cross Reference panel visibility icon 1010c have been toggled on. Since both of these panels are currently set to be pinned panels, both panels 936 and 1108 are visible, stacked vertically in the right global panel area. In an example embodiment, if only one pinned panel is selected to be visible in a given area, that panel can be sized vertically to encompass the entire height of the panel area (e.g., right global panel area 928). If a second pinned panel is invoked, the two panels will be sized vertically such that both panels will fit within the panel area in a vertically stacked arrangement. The vertical sizes of the stacked pinned panels can be changed by clicking and dragging the horizontal interface 1110 between the two panels upward or downward (where an upward drag decreases the size of the upper panel and increases the size of the lower panel, while a downward drag performs the reverse resizing).

Figure 11E:
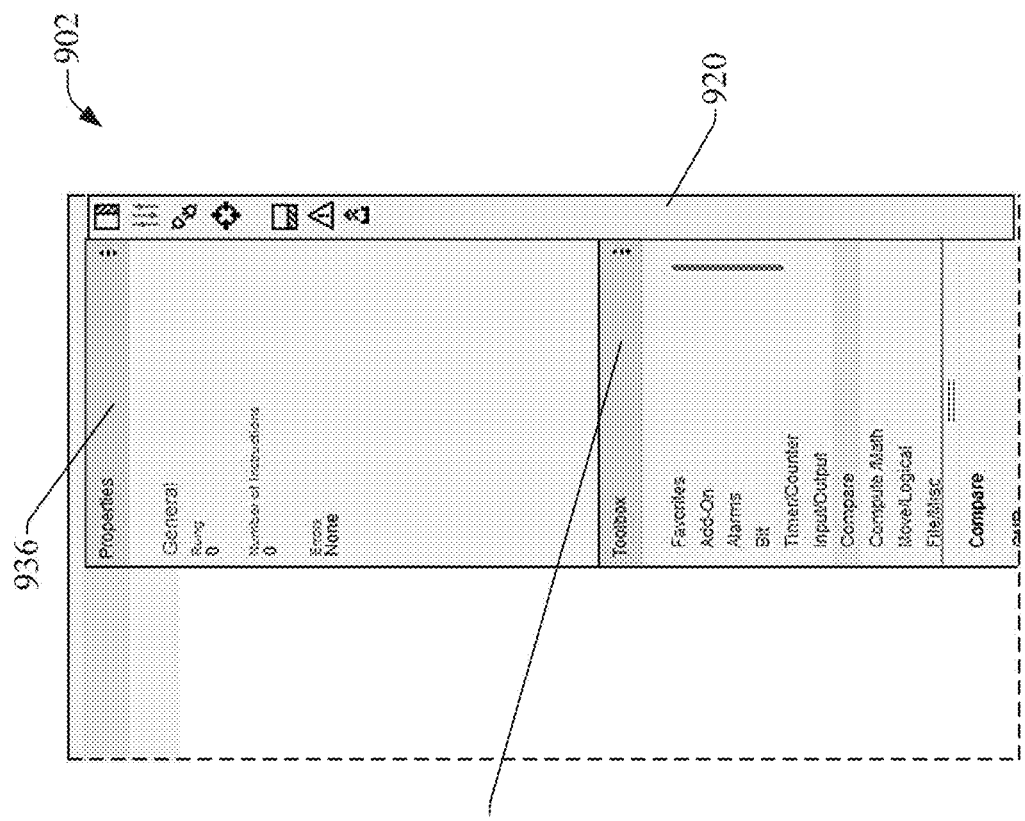
FIG. 11e is a view of the top right corner of the development interface in which a Toolbox panel is switched to be a pinned panel.
Figure 11D:
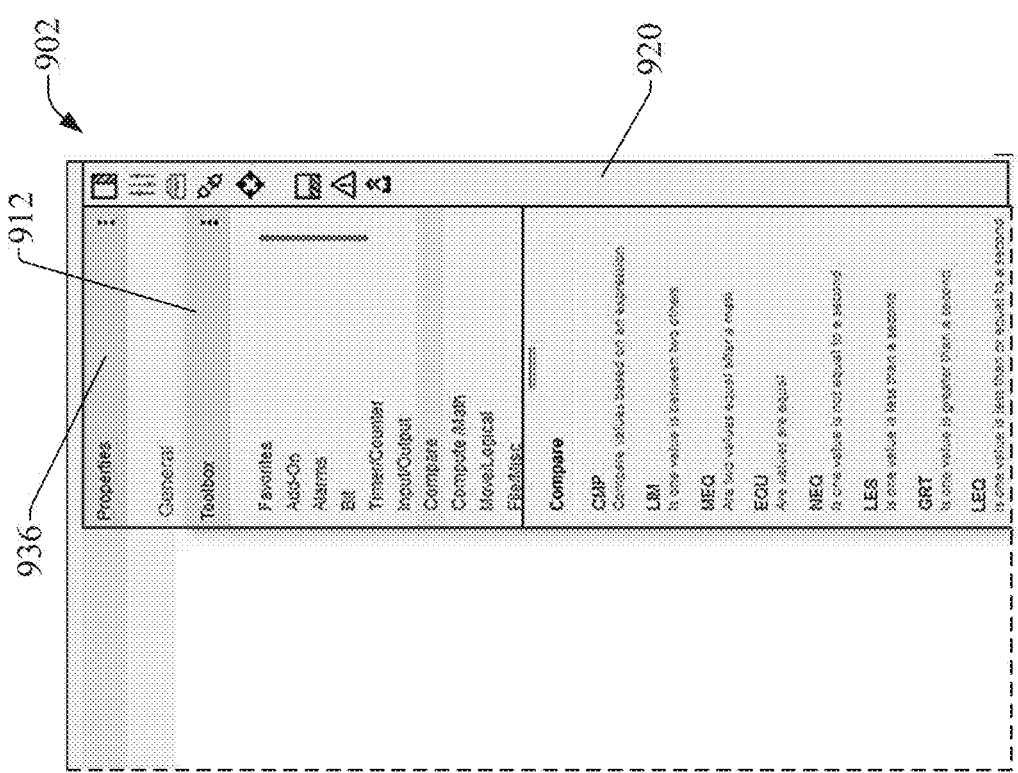
FIG. 11d is a view of the top right corner of the development interface in which a Toolbox panel is rendered as an overlay above a Properties panel.

In some scenarios, an overlaid panel may be sized or oriented to allow a portion of a pinned panel behind the overlaid panel to remain visible. FIG. 11d is a view of the top right corner of development interface 902 in which a Toolbox panel 912 is rendered as an overlay above Properties panel 936. However, the top of Toolbox panel 912 is below the top of Properties panel 936, allowing a portion of the Properties panel 936 to remain visible. FIG. 11e depicts a scenario in which the Toolbox panel 912 of FIG. 11d is switched to be a pinned panel, thereby causing panels 936 and 912 to be stacked vertically.

Figure 12:
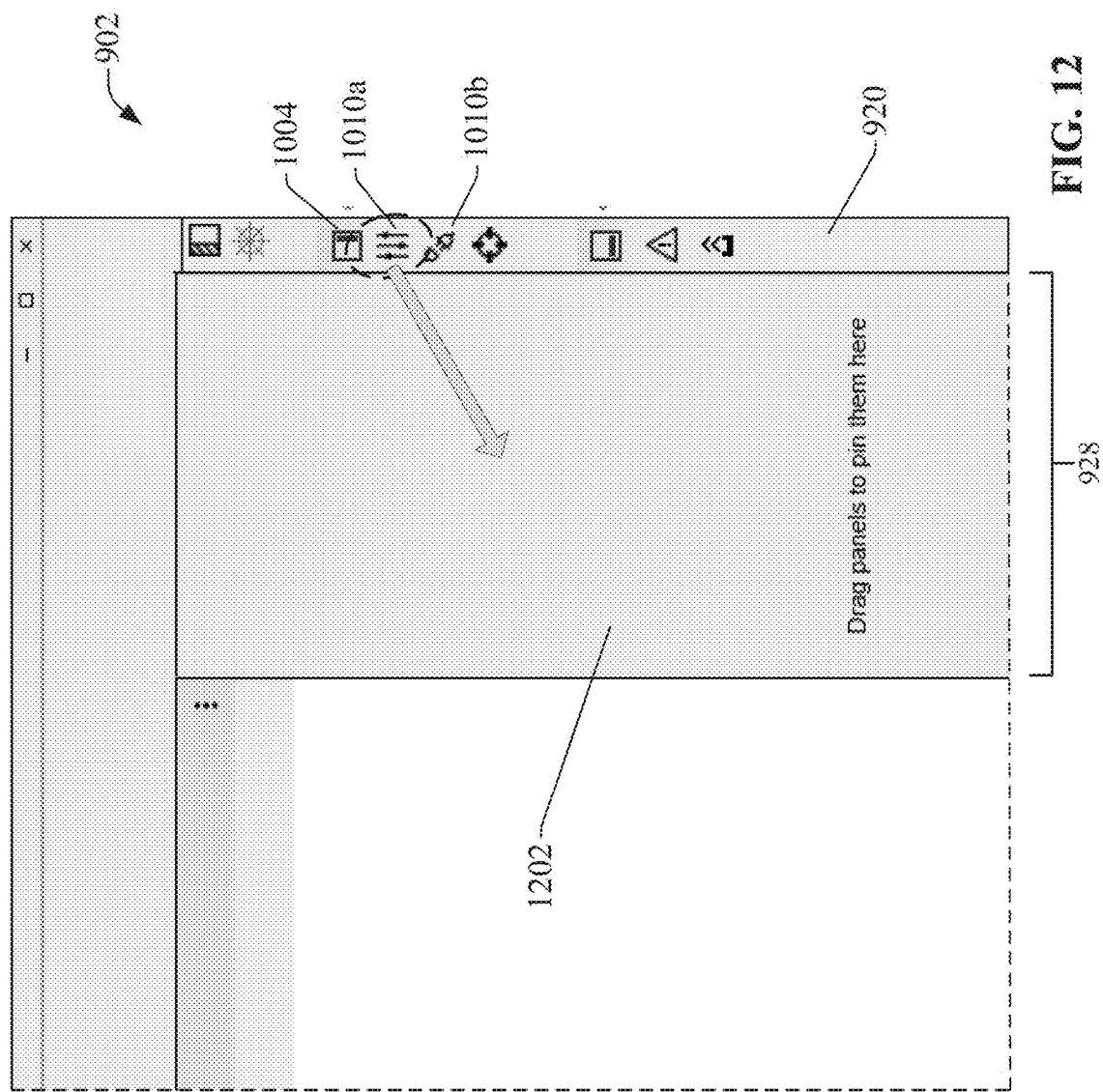
FIG. 12 is a view of the top right corner of the development interface depicting a panel drop area for a right global panel area.

As noted above, a panel can be set to be pinned by selecting a control associated with the panel. In some embodiments, a panel can also be pinned to a global panel area using a drag-and-drop action. FIG. 12 is a view of the top right corner of development interface 902 depicting a panel drop area 1202 for the right global panel area 928 according to such embodiments. According to an example embodiment, if no panels associated with the right global panel area 928 are set to be pinned (that is, the three available panels for the right global panel area 928 are currently set to be overlays, such that invoking the panel causes the panel to be rendered in the right global panel area 928 as an overlay), selecting the header icon 1004 for the right global panel area 928 causes an empty panel drop area 1202 to be rendered in the right global panel area 928. Any of the three panels available for the right global panel area 928 can be set to be pinned panels by dragging the corresponding visibility icon 1010 for the panel to the panel drop area 1202, as indicated by the arrow in FIG. 12. Pinned panels can also be unpinned (that is, set to be overlay panels) by dragging the panels from the drop area 1202 back to the global panel control bar 920. This drag-and-drop approach can be used to pin panels to any of the three global panel areas (left, right, and bottom).

Figure 13A:
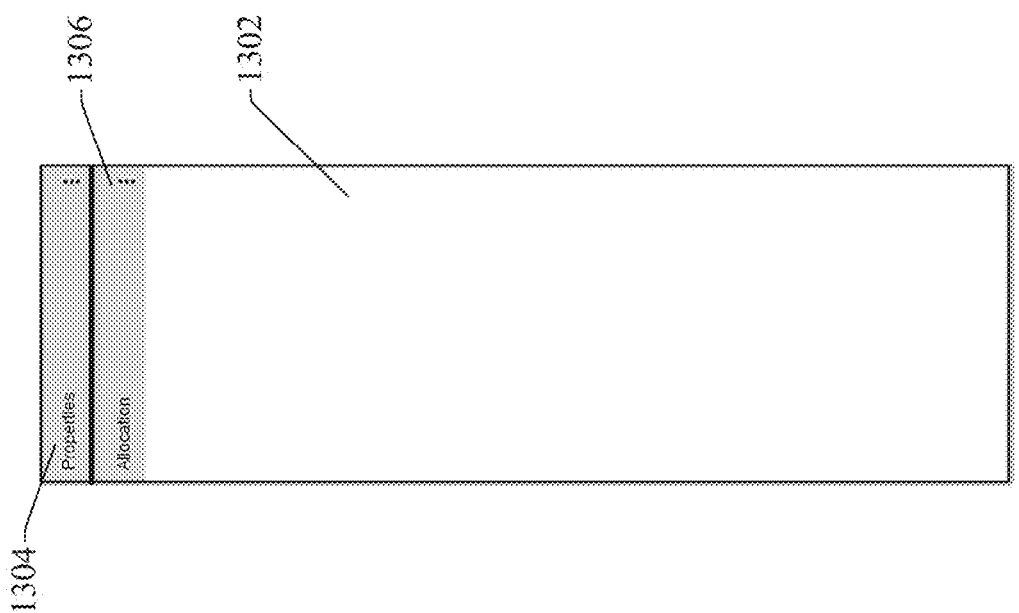
FIG. 13a is a view of two horizontally stacked pinned panels in a default non-collapsed state.
Figure 13B:
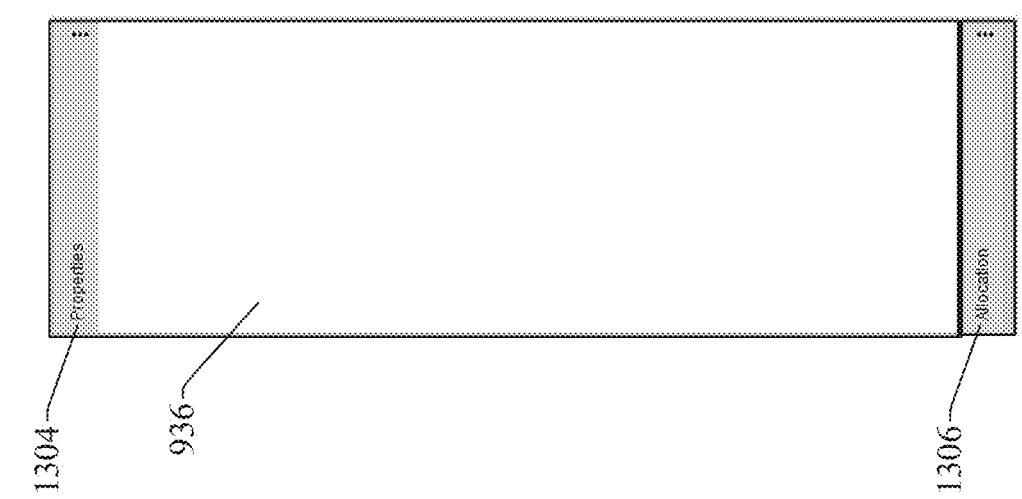
FIG. 13b is a view of the two horizontally stacked pinned panels in which the lower panel is in a collapsed state.
Figure 13C:
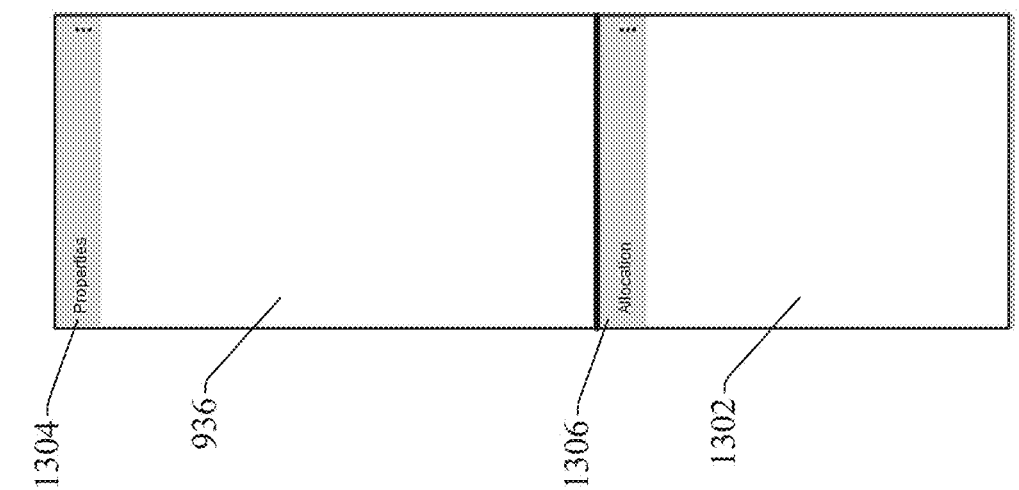
FIG. 13c is a view of the two horizontally stacked pinned panels in which the upper panel is in a collapsed state.

In some embodiments, pinned visible panels can also be selectively collapsed or expanded. FIG. 13a depicts two vertically stacked pinned panels (a Properties panel 936 and an Allocation panel 1302) in a default non-collapsed state. In this state, the content windows of both panels are visible below the respective header bars 1304 and 1306. A panel can be collapsed by selecting the header bar 1304 or 1306 corresponding to that panel. FIG. 13b depicts the Allocation panel 1302 in the collapsed state as a result of clicking on or otherwise selecting the header bar 1306 for that panel. When the lower panel—the Allocation panel 1302 in this case—is collapsed, the content window for that panel is rendered invisible and the header bar 1306 moves to the bottom of the panel area, while the content window for the upper panel (the Properties panel 936 in this case) is lengthened to fill the remaining panel area space, exposing more of that window's content. FIG. 13c depicts the Properties panel 936 collapsed as a result of clicking on or otherwise selecting the header bar 1304 for that panel. When the upper panel is collapsed, the content window for that panel is rendered invisible, and the header bar 1306 for the lower panel moves upward to a location just below the header bar 1304 of the upper panel. The content window of the lower panel fills the remaining panel area space, revealing more of the content of that panel.

Returning briefly to FIG. 9, the canvas area 930 is the primary work area for the IDE system's development interface 902, and is bounded by the left global panel area 922, the right global panel area 928, the bottom global panel area 924, and the menu bar 904. In general, the canvas area 930 contains the one or more workspace canvases 940 on which the user interface component 204 renders components of the system project, such as ladder logic or other types of control code, program routines, controller tag definitions, development views of visualization screens, device configurations, engineering drawings, or other project components. The canvas area 930 is also the space with which the user interacts with these components—leveraging editing tools and information provided by the global and content panels—to perform such development functions as developing controller code (e.g., ladder logic, function block diagrams, structured text, etc.), developing visualizations for the automation system (e.g., HMI screens, AR/VR presentations, mashups, etc.), configuring device parameter settings, defining controller tags, developing engineering drawings, or other such project development functions.

Figure 14:
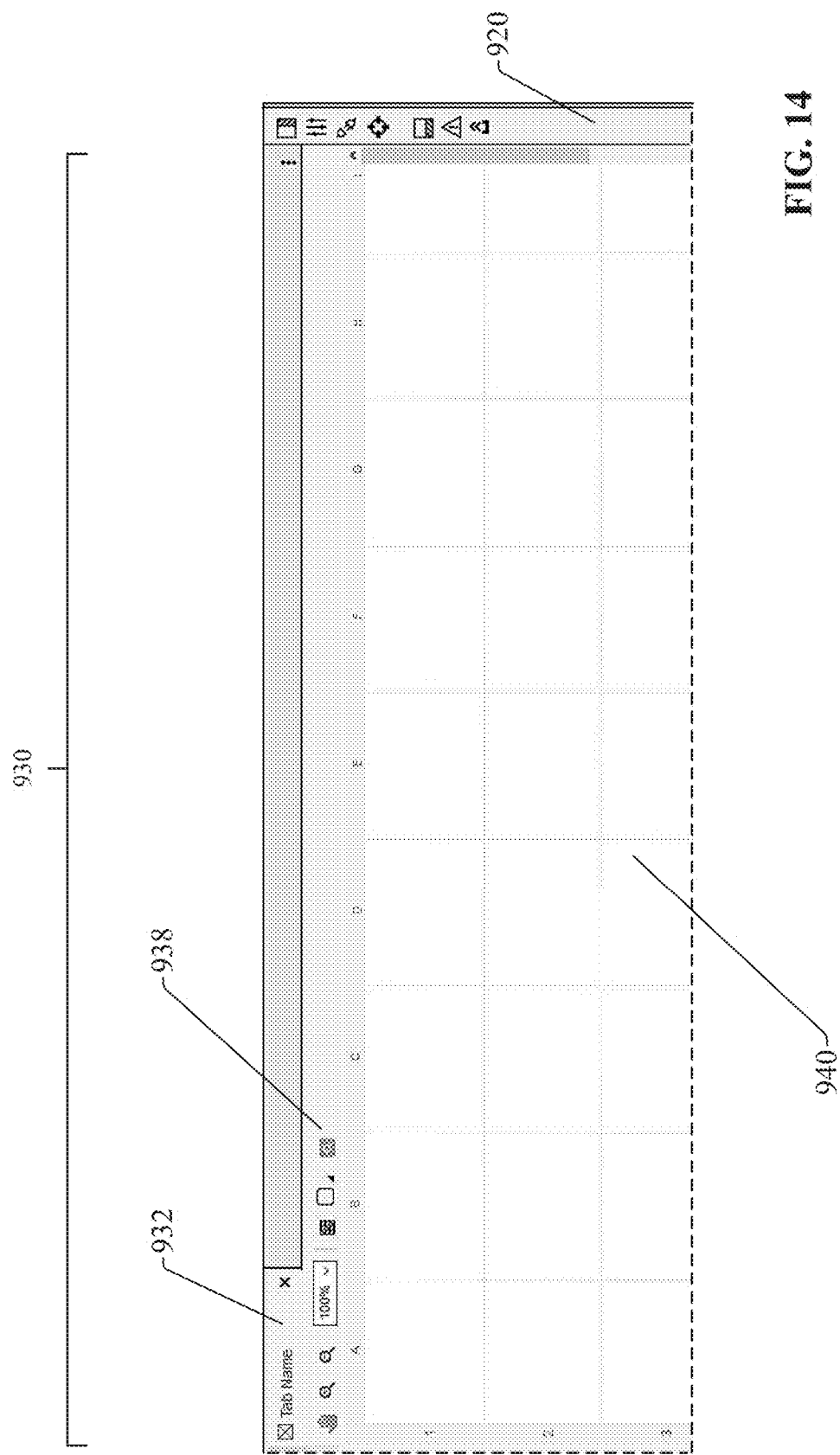
FIG. 14 is a view of an example canvas within a canvas area of an industrial IDE development interface.

FIG. 14 is a closer view of an example canvas 940 within the canvas area 930. Each canvas 940 within the canvas area 930 can be associated with at tab 932, selection of which brings the corresponding canvas 940 into focus. Canvas 940 can also have an associated toolbar 938 comprising selectable icons and/or fields that allows the user to set properties for the associated canvas 940, such as zoom levels, view formats, grid line visibility, or other such properties. In the example depicted in FIG. 14, the canvas's toolbar 938 is located below tab 932.

In some embodiments, the canvas's toolbar 938 can also contain visibility icons for any content panels associated with the type of content (e.g., ladder logic, function block diagram, structured text, HMI screens in development, device parameters, engineering drawings, etc.) currently being rendered in the canvas 940. Similar to the global panel visibility icons located on the global panel control bar 920, selection of a content panel visibility icon from a canvas's toolbar 938 toggles the visibility of the panel associated with the selected icon. In some embodiments, when a content panel is made visible, the content panel can be rendered at a predefined designated location either in one of the global panel areas or adjacent to one of the global panel areas. Content panels may also be moved to a selected location within the interface workspace in some embodiments. Similar to global panels, content panels can be selectively set to be either pinned or overlaid.

Although the illustrated example depicts panel visibility icons as being rendered in the canvas's toolbar 938, panel visibility icons can also be rendered elsewhere on the development interface 902 in some embodiments; e.g., on the main tool bar 906 below the menu bar 904. In such embodiments, the list of panel visibility icons rendered in this space at a given time will be a function of the type of project content that currently has focus (e.g., the content of the particular canvas 940 that currently has focus). In other embodiments, user interface component 204 may add available content panel visibility icons to the global panel control bar 920 in their own designated grouping, based on the type of project content or development task currently being performed.

Figure 15:
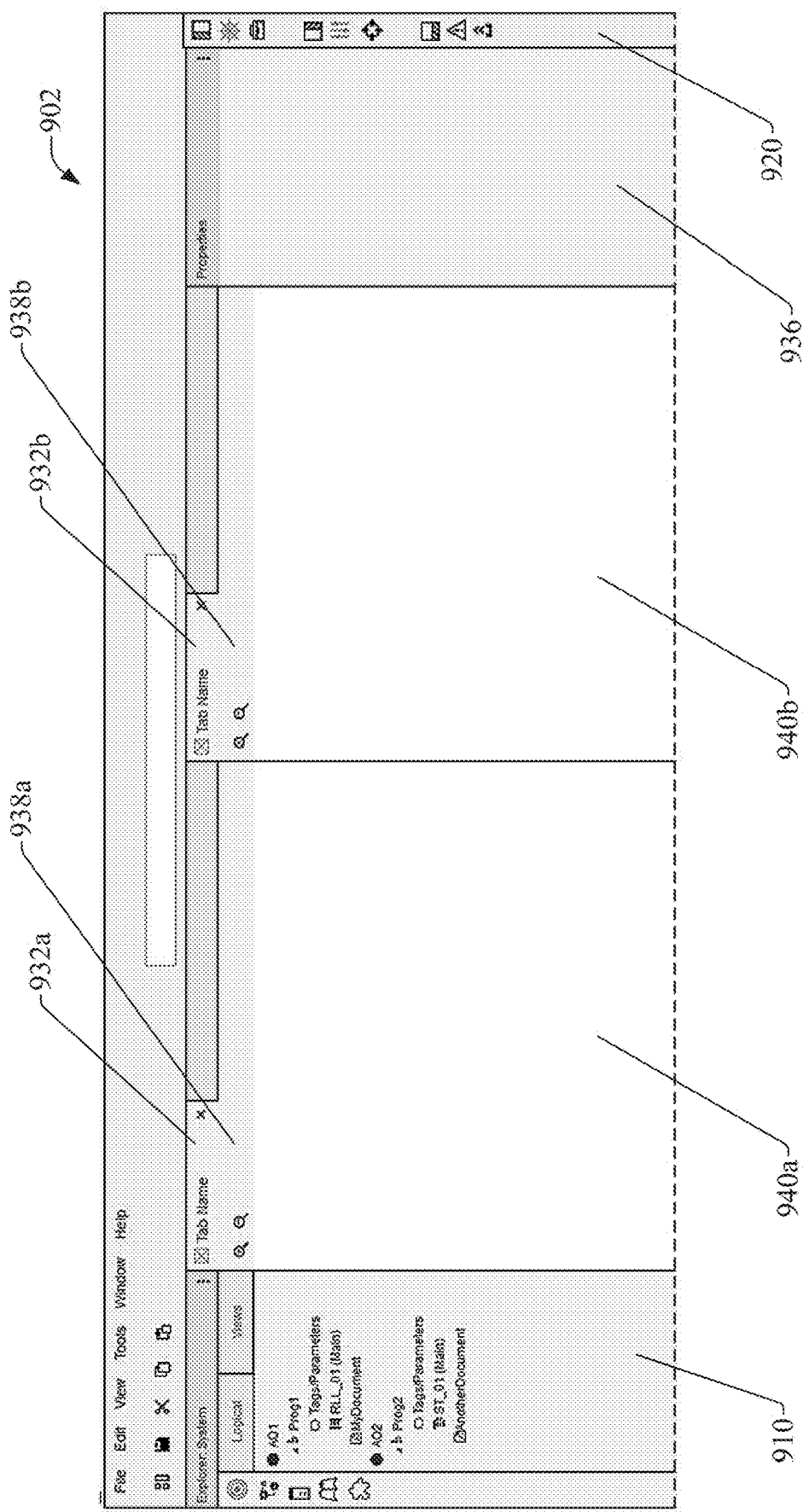
FIG. 15 is a view of an industrial development interface in which two canvases have been stacked horizontally.

Canvas area 930 can comprise one or more tabbed canvases 940, with each canvas 940 associated with a tab 932. User interface component 204 allows the user to establish as many tabbed canvases 940 within the canvas area 930 as desired, with each tab 932 rendering a different aspect of the automation system project. Multiple tabbed canvases 940 can be stacked in the canvas area 930 either horizontally or vertically. FIG. 15 is a view of development interface 902 in which two canvases 940a and 940b have been stacked horizontally. Stacking tabs in this manner—either horizontally or vertically—allows content of both canvases 940a and 940b to be rendered simultaneously.

Figure 16A:
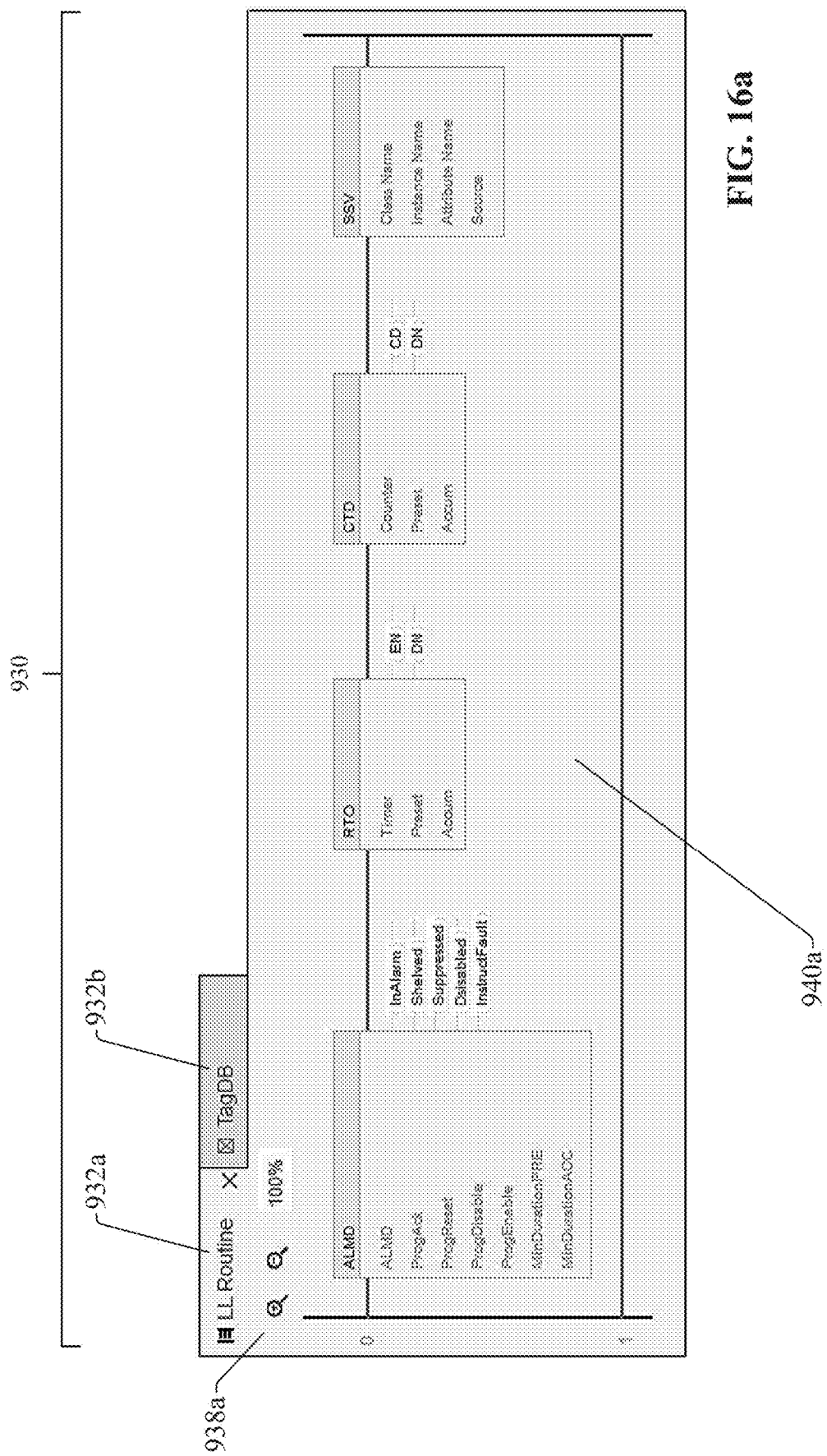
FIG. 16a is a view of two tabbed development interfaces in which one tab is selected, causing the corresponding ladder logic canvas to be rendered in the canvas area.

Users may also select to render multiple canvases 940 as overlays on top of one another. FIGS. 16a and 16b are views of two overlaid canvases 940a and 940b. In this example scenario, the first canvas 940a is rendering a ladder logic routine being developed for an industrial controller, and the second canvas 940b is rendering a tag database for the controller. FIG. 16a depicts a scenario in which tab 932a is selected, causing the corresponding ladder logic canvas 940a to be rendered in the canvas area 930. FIG. 16b depicts a scenario in which tab 932b is selected, causing the corresponding tag database canvas 940b to be rendered in the canvas area 930.

In the aggregate, the basic layout of the development interface 902 together with the panel control and tab manipulation functionalities described above can offer the user a fluid development workspace that affords a great deal of control over the balance between usable workspace and editing function availability. Moreover, since the user interface component 204 dynamically filters the available editing tools according to the user's current development task or focus—by making only a subset of content panels that are relevant to the current task available for selection—the development interface 902 substantially declutters the development workspace by removing panels and editing functions that are not relevant the task at hand.

Figure 17A:
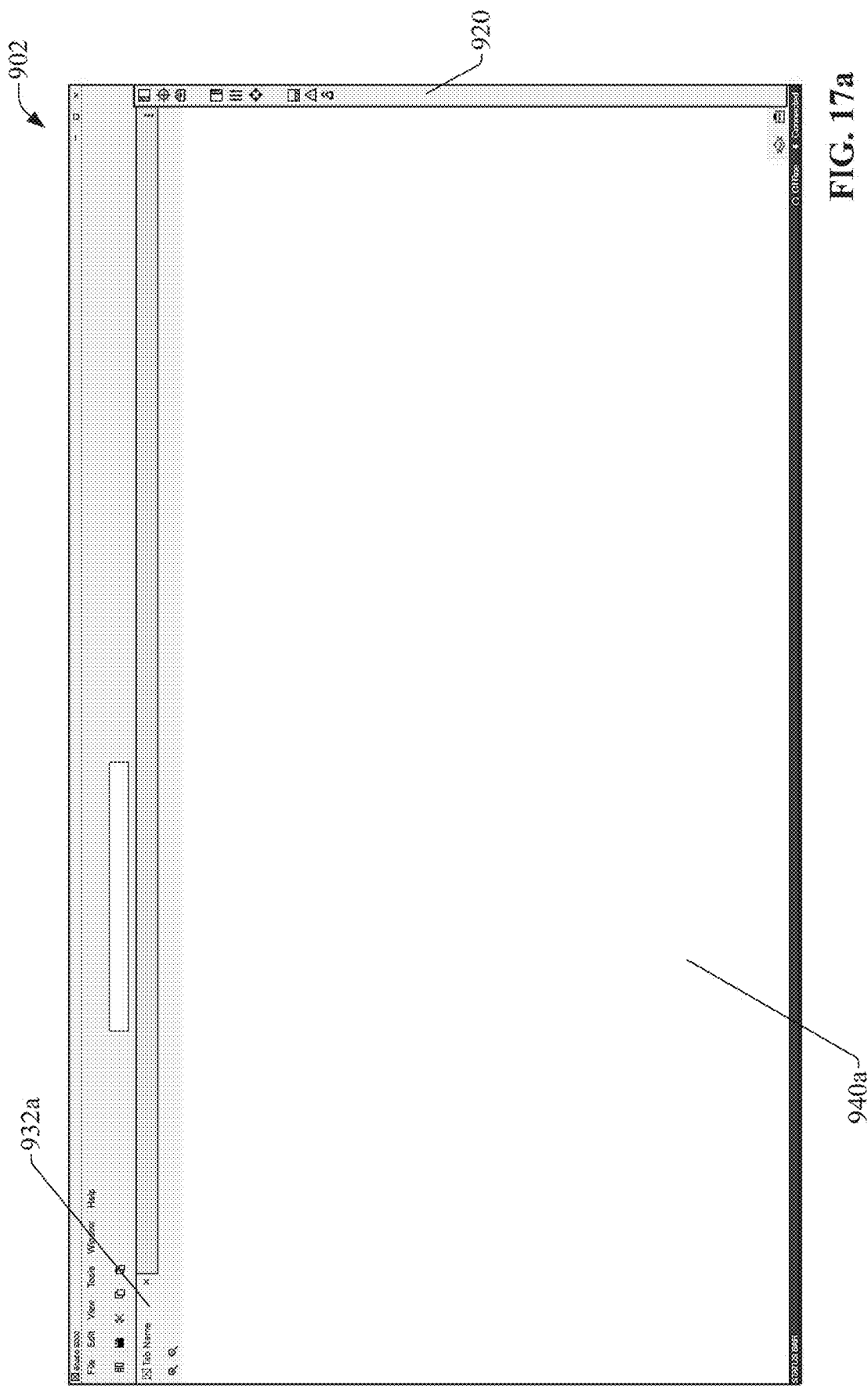
FIG. 17a is a view of a development interface in which a single canvas is open and no left, right, or bottom panels are invoked.

FIGS. 17a-17e are views of various example layouts of the IDE system's development interface 902, illustrating increasing degrees of IDE content density that can be supported by the interface 902. FIG. 17a is a view of interface 902 in which a single canvas 940a is open and no left, right, or bottom panels are invoked. This substantially maximizes the size of the canvas 940 since no development workspace is being consumed by global or content panels, thereby displaying a substantially maximized amount of canvas content (e.g., control programming, tag database information, etc.). The panel control bar 920 remains pinned to the right-side edge of the development interface 902 to allow the user to invoke panels as needed. As noted above, in addition to the global panel visibility icons, the panel control bar 920 will render a relevant subset of visibility icons corresponding to content panels that are relevant to the task being performed in the active canvas 940a (e.g., ladder logic programming, FBD programming, structured text programming, HMI screen development, device configuration, network configuration, etc.).

Figure 17B:
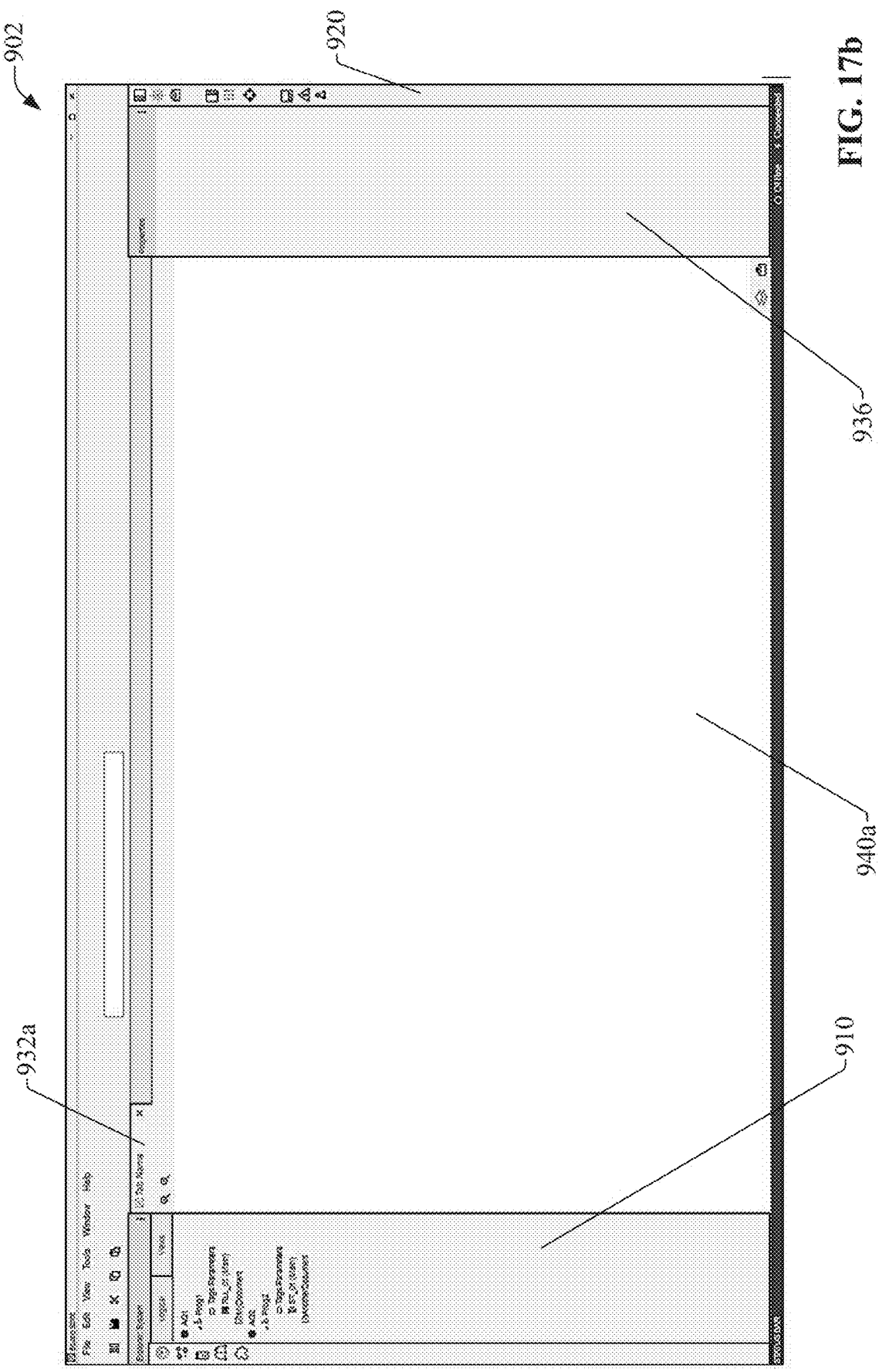
FIG. 17b is a view of the development interface in which an Explorer panel has been rendered visible in a left global panel area and a Properties panel has been rendered in a right global panel area.

FIG. 17b is a view of interface 902 in which an Explorer panel 910 has been rendered visible in the left global panel area 922 and a Properties panel 936 has been rendered in the right global panel area 928. These panels can be rendered visible using any of the techniques described above (e.g., selection from the panel control bar 920 or from the View menu option). Both panels 910 and 936 are set to be pinned, and so the canvas 940a has been reduced in width to accommodate the panels 910 and 922 so that none of the canvas content 940a is obscured by the panels.

Figure 17C:
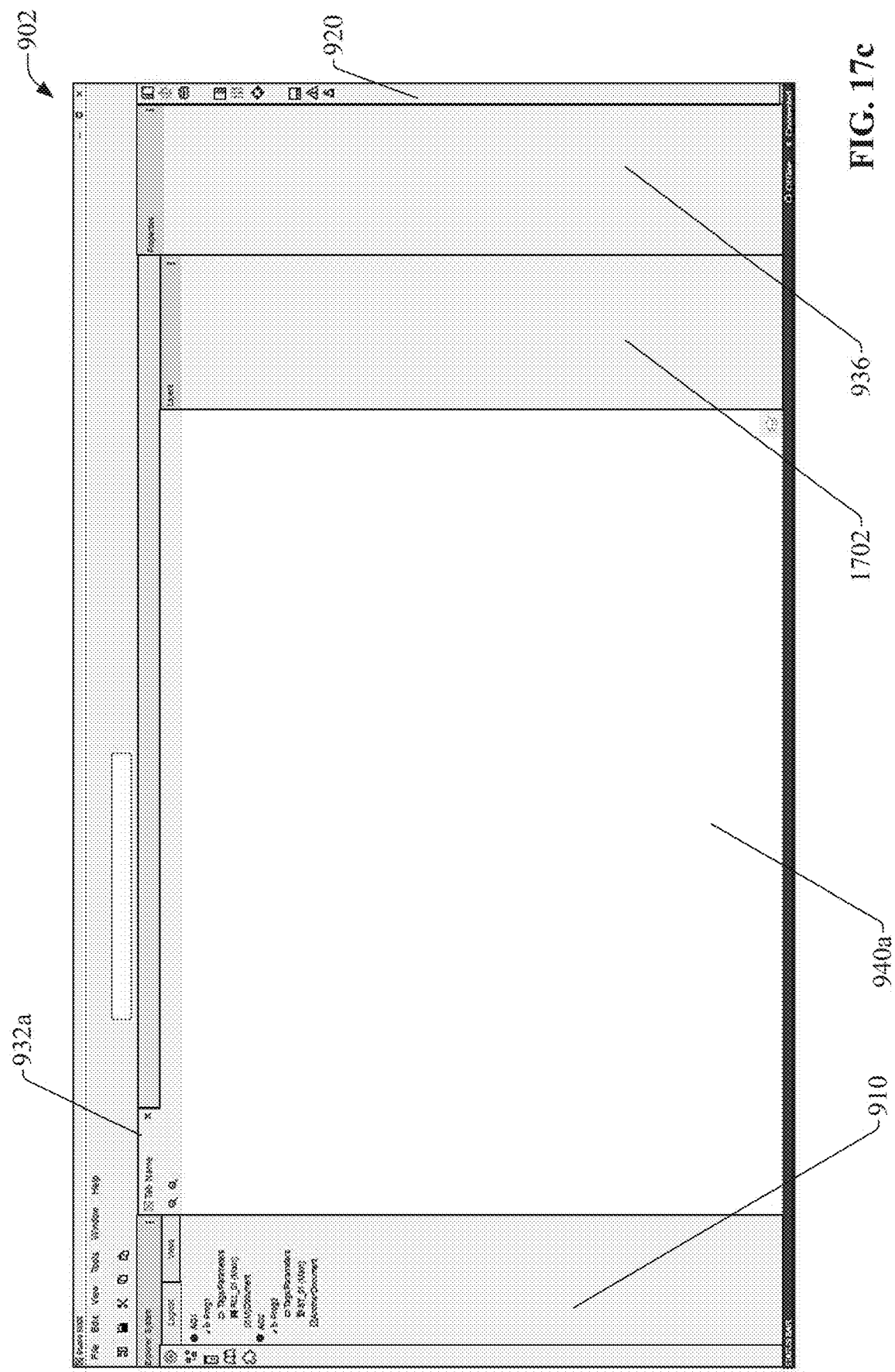
FIG. 17c is a view of the development interface in which a Layers panel has been added to the previous view.
Figure 17D:
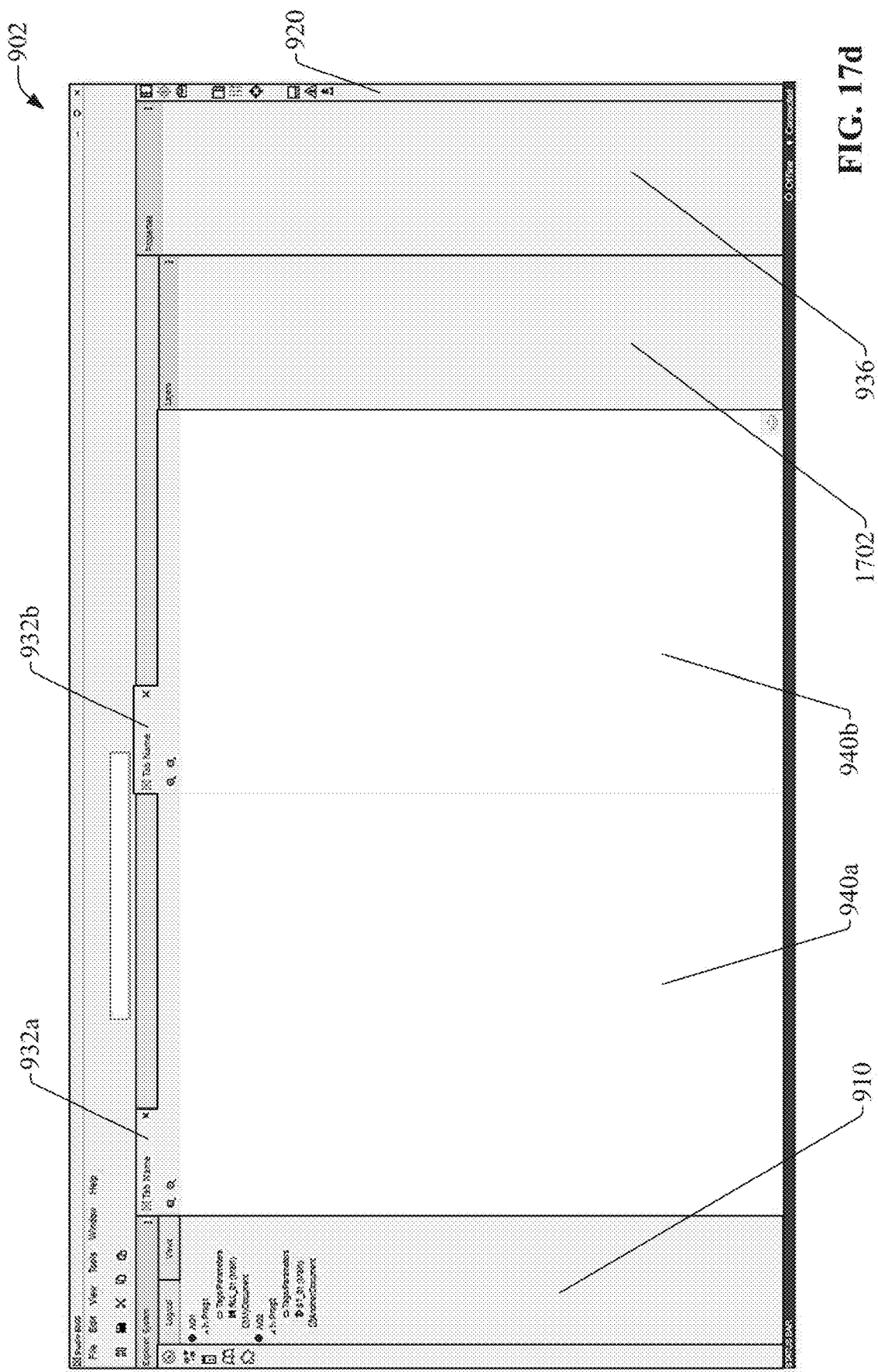
FIG. 17d a view of the development interface in which adds a second canvas stacked horizontally with a pre-existing canvas.

FIG. 17c is a view of development interface 902 in which a Layers panel 1702 (a content panel specific to the particular task being performed in the canvas 940*a*) has been added to the previous view. The Layers panel 1702 has been added as an overlay panel to the left of the Properties panel 936, and so will obscure a portion of the canvas content corresponding to that space. FIG. 17*d* adds further content to the previous view by adding a second canvas 940*b*, which is stacked horizontally with the original canvas 940*a*. The user can select which canvas 940 has the current focus by selecting the tab 932*a* or 932*b* corresponding to the desired canvas 940. This configuration allows the user to view content of both canvases 940 simultaneously (e.g., a control program and a tag database, a control program and a device view, etc.) while also affording the user access to the editing tools, information, and navigation structures associated with the Explorer panel 910, Properties panel 936, and Layers panel 1702.

Figure 17E:
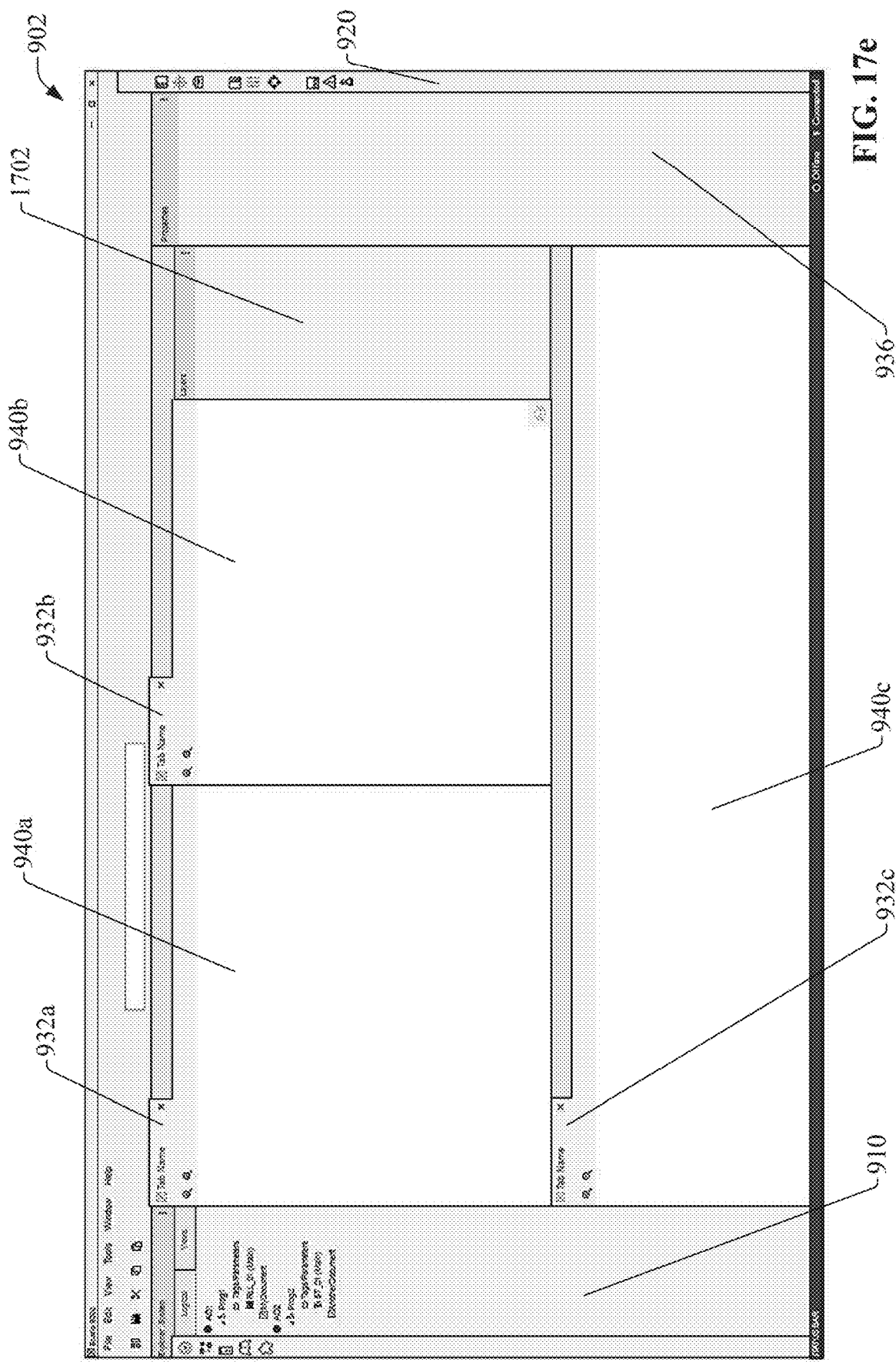
FIG. 17e is a view of the development interface which adds a third canvas stacked vertically with two pre-existing canvases.

FIG. 17*e* is a view of development interface in which a third canvas 940*c* is added to the previous view, stacked vertically with the two previous canvases 940*a* and 940*b*. As illustrated in this figure, canvases 940 can be selectively stacked either horizontally or vertically, or both horizontally and vertically, within the canvas area 930.

As illustrated by the examples depicted in FIGS. 17*a*-17*e*, the development interface's layout and customization features grant the user considerable flexibility with regard to customizing or curating canvas layouts and behaviors, as well as selective rendering of project data and editing tools. Moreover, editing tools and views available to the user at a given time are intelligently curated by the user interface component 204 as a function of the user's current development task or context, which may be determined based on the identity of the canvas 940 that currently has focus and the content of that canvas 940. For example, if the user selects a canvas 940 in which a structured text program is being developed, only a subset of the interface's total library of content panels that are relevant to structured text program development will be made available to the user (e.g., by adding visibility icons corresponding to those panels to the panel control bar 920).

Some of the global and content panels supported by some embodiments of the development interface will now be discussed. FIG. 18 is a view of the Explorer panel 910, which resides in the left global panel 922 area when invoked. Explorer panel 910 serves as a means for navigating and viewing content of a system project, and supports numerous ways for performing this navigation. The Explorer panel 910 itself supports a number of different viewing categories, which are represented by selectable explorer icons 1806 rendered on an explorer view control bar 908 pinned to the left-side edge of the Explorer panel 910. Selection of an explorer icon 1806 determines one or both of the type of project content to be browsed via the Explorer panel 910 or a format in which the browsable project content is rendered on the Explorer panel 910.

Explorer panel 910 also comprises a panel header 1802, the text of which identifies the set of explorer tools that are currently visible (e.g., "System" in FIG. 18). For explorer views that offer a choice of alternative presentation formats of the content represented by the explorer icon 1806, horizontally stacked tabs 1804*a* and 1804*b* are located below the panel header 1802 for selecting from among the available views. Below the tabs 1802*a* and 1804*b* (or below the header 1802 if the current Explorer tool set has only one view) is the Explorer panel content area 1808 in which the currently selected explorer tools are rendered. As will be discussed and illustrated below, the content rendered in the content area 1808 is a function of the explorer icon 1806 currently selected as well as the tab 1804 that currently has focus. For example, the selected explorer icon 1806 can determine the browsable project content to be rendered in the Explorer panel 910, and the selected tab 1804 determines a presentation format or organization of this browsable project content. For some views supported by Explorer panel 910, selection of an explorer icon 1806 may set a category of content to be rendered in the content area 1808, while selection of a tab can set the particular sub-category of rendered content within the main category.

Figure 19A:
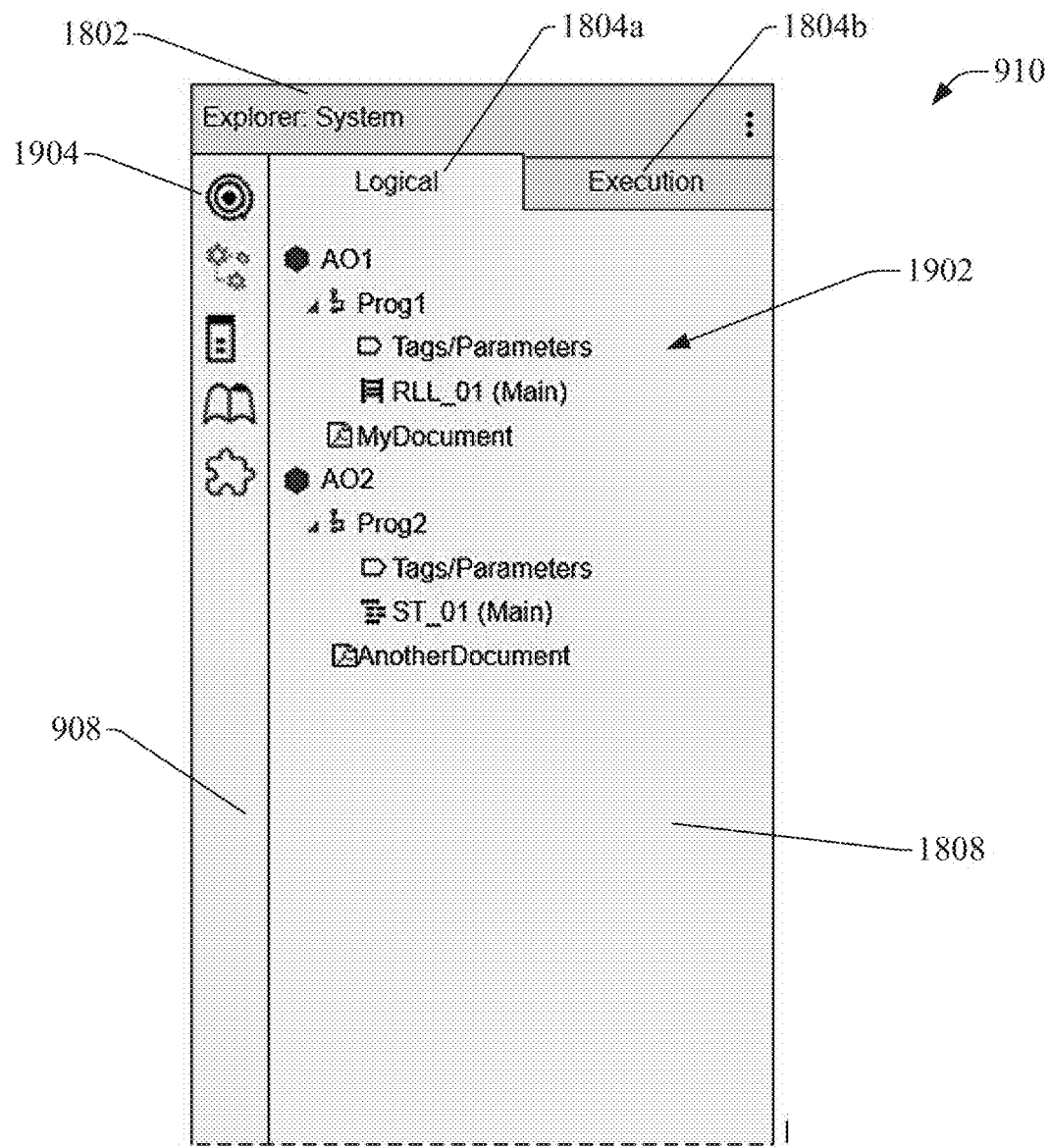
FIG. 19a is a view of the Explorer panel with the Logical System view currently selected.
Figure 19B:
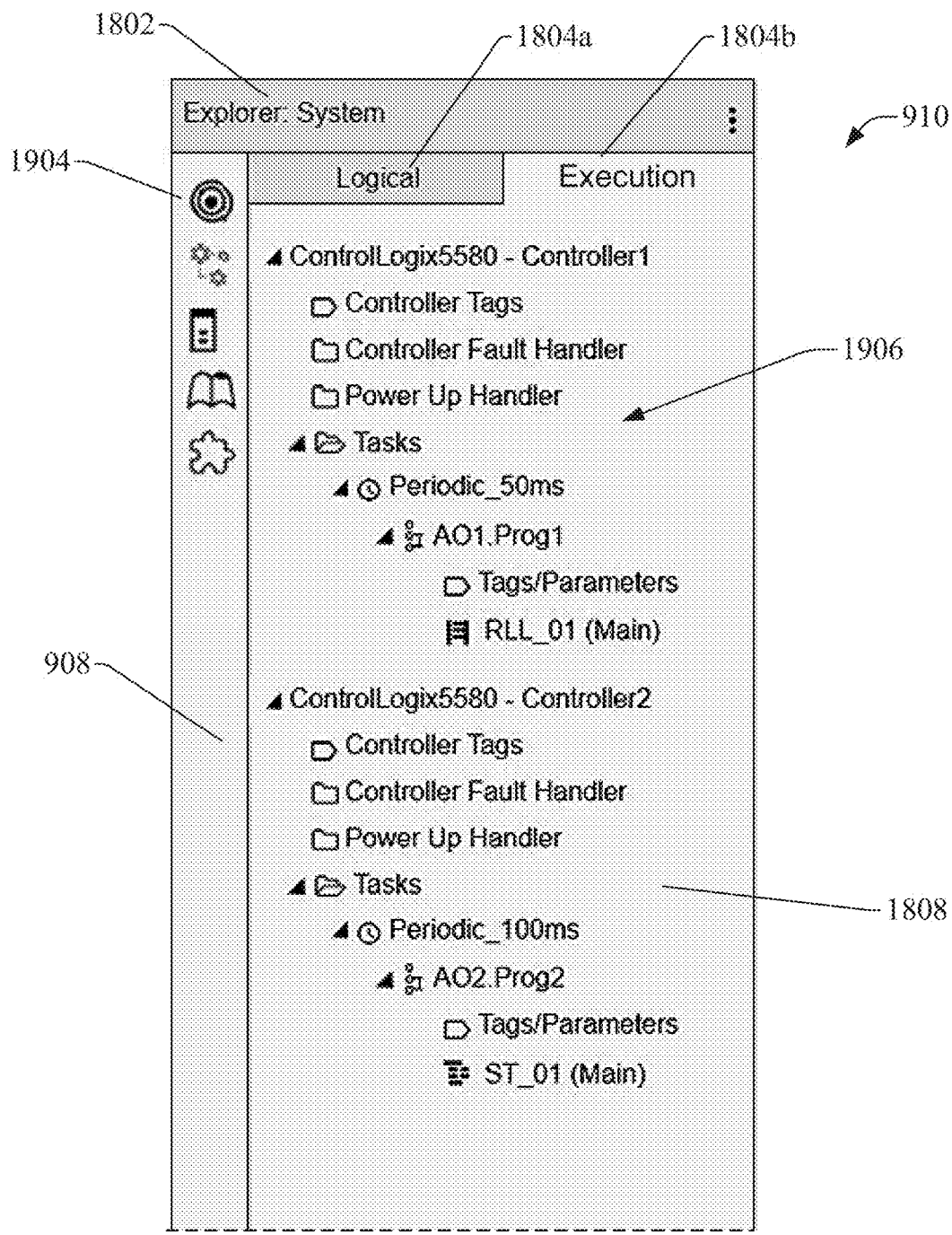
FIG. 19b is a view of the Explorer panel with the Execution System view currently selected.

FIGS. 19*a*-19*b* are view of the Explorer panel 910 in isolation, with the System view currently selected. The Explorer panel's System view can be invoked by selecting the System icon 1904 in the explorer view control bar 908. The System view offers two tabbed views—Logical (tab 1804*a*) and Execution (tab 1804*b*). FIG. 19*a* depicts the Logical System view rendered in response to selection of the Logical tab 1804*a*. The Logical System view renders a Logical System navigation tree 1902 in the content area 1808 comprising selectable nodes organized hierarchically. Selection of one of the nodes of the navigation tree 1902 associated with viewable project content causes content corresponding to the selected node to be rendered in the canvas 940 that currently has focus, or causes an appropriate panel to be rendered on the development interface 902 for display of the content (depending on the node selected and the corresponding content).

Project aspects that can be selected via the Logical System navigation tree 1902 can include, but are not limited to, control programs or routines (e.g., the RLL_01 and ST_01 nodes, which are listed in FIG. 19*a* under the Prog1 and Prog2 parent nodes, respectively, in FIG. 19), tags and/or parameters associated with a program (e.g., Tags/Params nodes in FIG. 19*a*, which are also listed under the parent nodes of their corresponding control programs), visualizations, alarm configurations, device configurations or parameter settings, trends, security settings, test results, or other such project aspects. In general, the nodes rendered in the Logical System navigation tree 1902 reflect elements that exist for the present automation system project.

Figure 20:
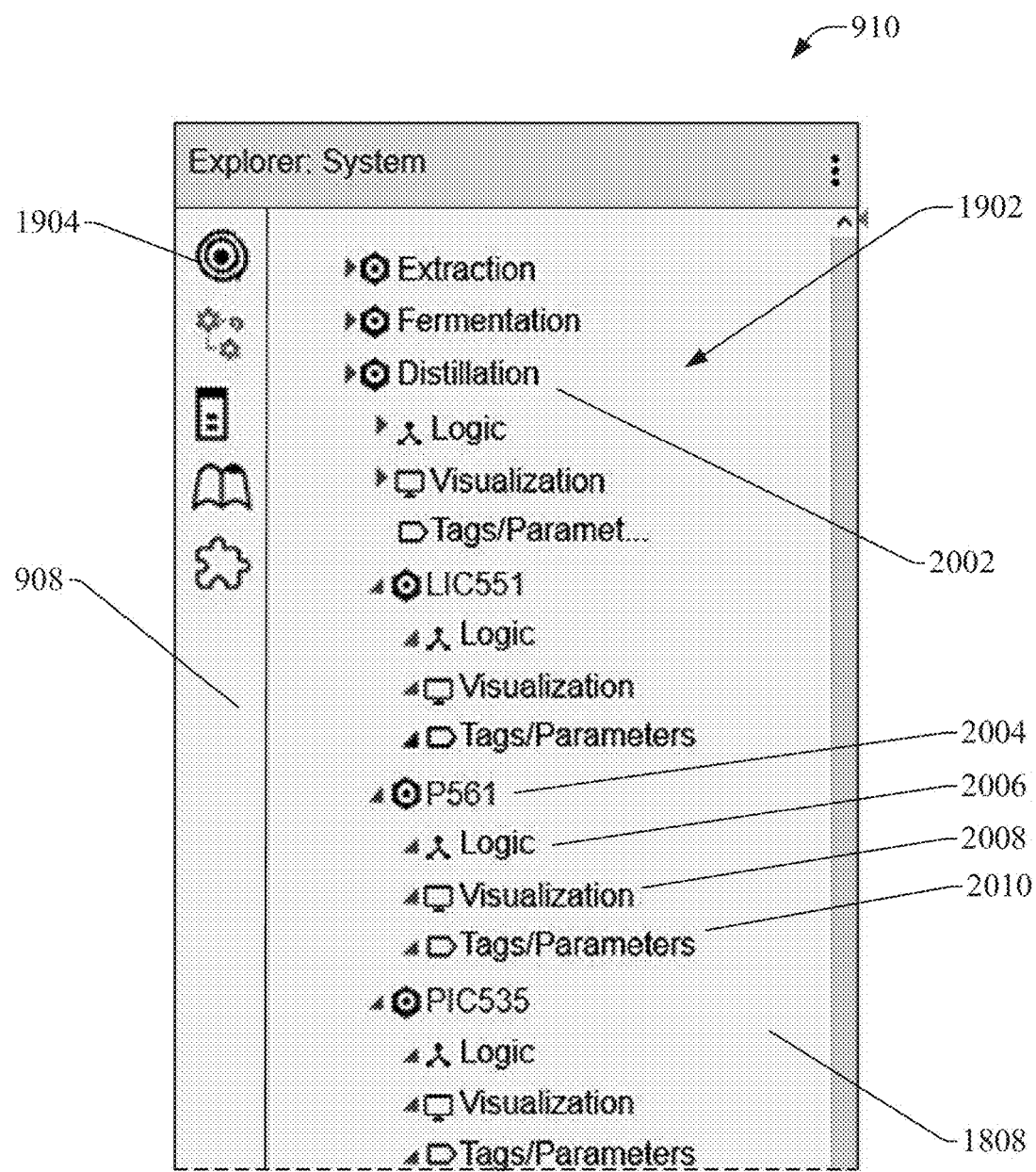
FIG. 20 is an example Explorer panel depicting a System navigation tree for an example automation system project

In general, the Logical System view organizes system elements according to processes, production areas, or plant facilities within an industrial enterprise. FIG. 20 is an example Explorer panel 910 depicting a Logical System navigation tree 1902 for an example automation system project. As shown in this example, the Logical System navigation tree 1902 can organize aspects of the project hierarchically. The user can define parent nodes 2002 representing different processes, production areas, or plant facilities within the industrial enterprise (e.g., Extraction, Fermentation, Distillation, etc.). Sub-nodes 2004 can also be defined as child nodes of the parent nodes 2002 if the process, production area, or plant facility is to be further broken down into sections (e.g., LIC551, P561, PIC535, etc.).

Below one or more of these user-defined nodes are selectable nodes representing aspects of the parent node that can be viewed and configured by the user. These can include logic nodes 2006 representing control programming associated with the parent node, visualization nodes 2008 representing HMI applications or other types of visualization applications associated with the parent node, tags and parameter nodes 2010 representing tags and device parameters defined or configured for the parent node, device nodes (not shown in FIG. 20) representing devices associated with the parent node (e.g., industrial controllers, motor drives, etc.) or other such system project components. In general, the path through tree 1902 to a node represents a logical path to the corresponding project aspect, defined in terms of the user's plant layout or process layout.

FIG. 19*b* is a view of the Explorer panel 910, in which the Execution System view rendered in response to selection of the Execution tab 1804*b*. This view renders similar content to that of the Logical System view described above in connection with FIGS. 19*a* and 20, but organized in a hierarchical Execution System navigation tree 1906 according to the execution devices (e.g., industrial controllers) on which the various aspects of the automation system reside and execute. This differs from the plant-based organization offered by Logical system navigation tree 1902. The path through tree 1906 to a node represents an execution path to the corresponding project aspect.

Figure 21A:
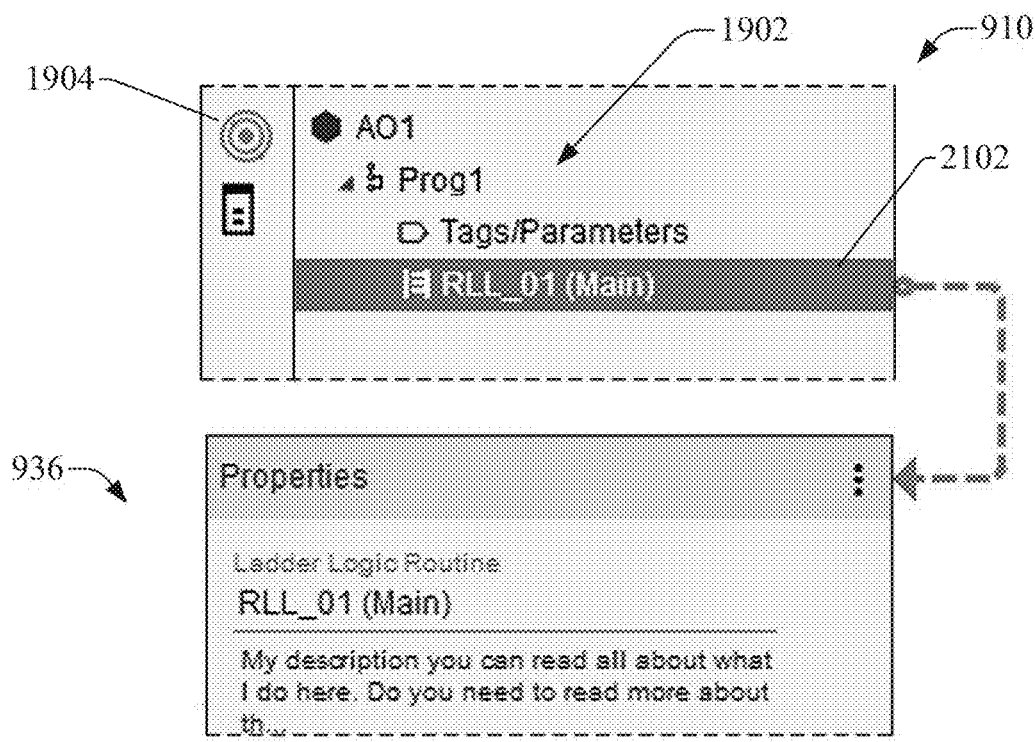
FIG. 21a illustrates an example response of an industrial IDE development interface when a user selects, but does not launch, a ladder logic node representing a ladder logic program of the system project.

In some embodiments, the manner in which a user interacts with a node of the System navigation tree will determine how the content associated with the selected node is presented. FIG. 21*a* illustrates an example response of the user interface component 204 when a user selects, but does not launch, a ladder logic node 2102 representing a ladder logic program of the system project (RLL_01). The node 2102 can be selected, for example, by performing a single mouse click on the node 2102 such that the node is highlighted. When the node 2102 is selected in this manner, information about the selected ladder logic program will be rendered in the Properties panel 936 (if the Properties panel 936 is currently visible).

Figure 21B:
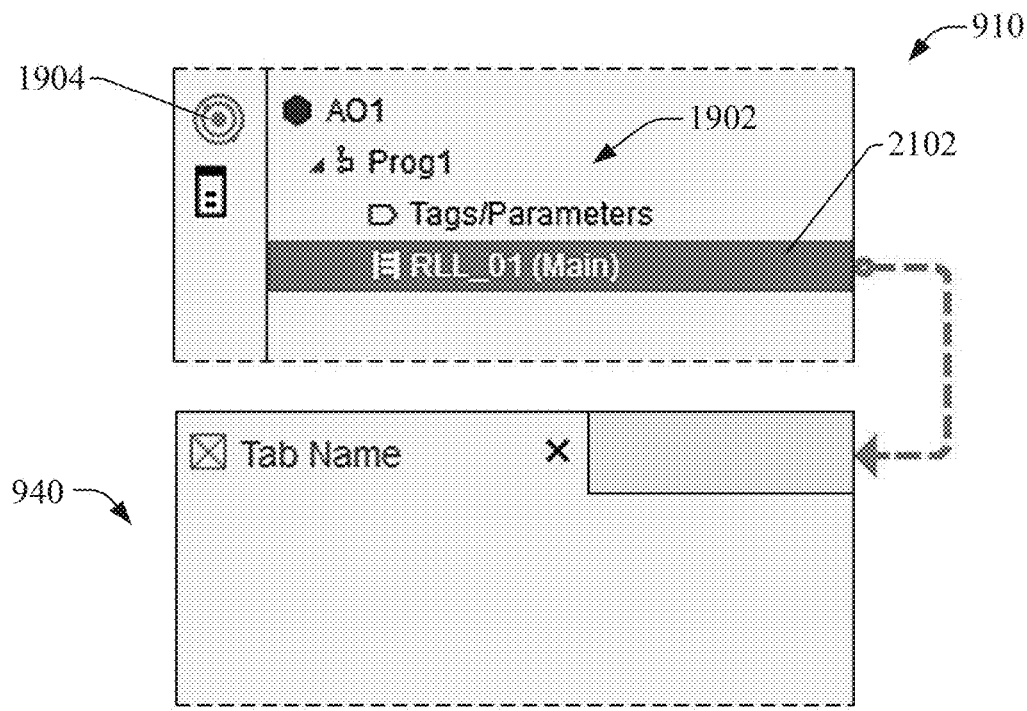
FIG. 21b illustrates an example response of the industrial IDE development interface when a user launches the ladder logic node 2002.

FIG. 21*b* illustrates an example response of the user interface component 204 when a user launches the ladder logic node 2102; e.g., by double-clicking on the node 2102. When a node in the System navigation tree 1902 or 1906 is double-clicked or otherwise instructed to launch, content or workspace associated with the node 2102 is rendered on a tabbed canvas 940. Double-clicking on the node 2102 can cause a new canvas 940 to be opened in the canvas area 930, or may cause a canvas 940 that currently has focus to render the content associated with the node 2102.

Figure 21C:
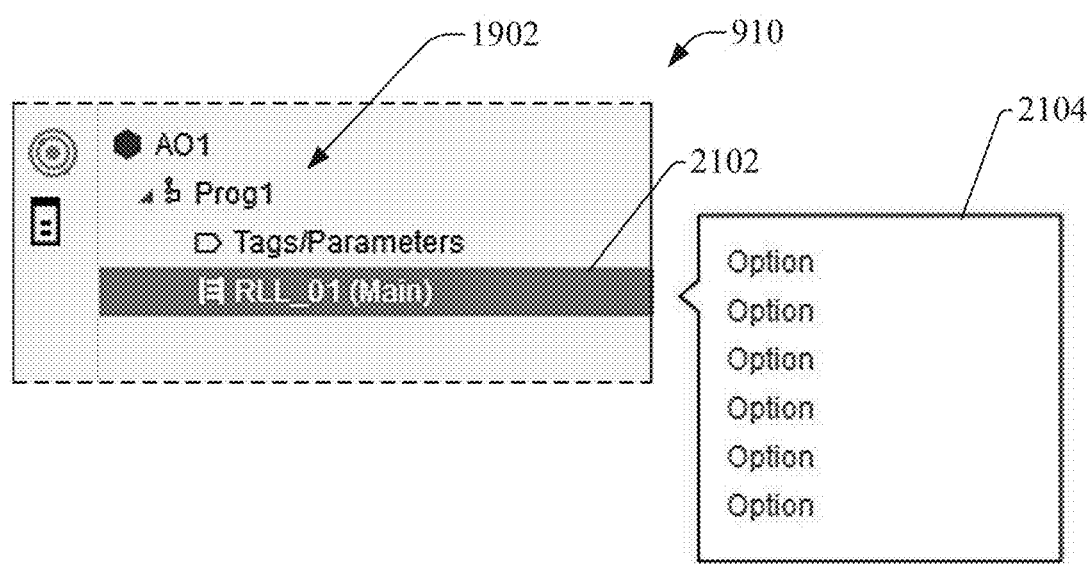
FIG. 21c illustrates an example response of the industrial IDE development interface when a user right-clicks on the ladder logic node.

FIG. 21*c* illustrates an example response of the user interface component 204 when a user right-clicks on the node 2102. Right-clicking on a node of the System navigation tree 1902 can cause a context menu 2104 to be rendered near the node 2102. Context menu 2104 renders a list of selectable options that are specific to the type of node selected. For example, if the selected node represents an industrial controller, context menu 2104 may list options to add an I/O module to the controller, to add a device to the controller (e.g., a drive), or options for other controller-specific configuration actions. The context menu 2104 may also include options for configuring the System navigation tree 1902 itself, such as copying, pasting, and deleting nodes.

FIGS. 22*a* and 22*b* are views of the Explorer panel 910 with the Application view currently selected. The Application view is invoked by selecting the Application icon 2202 in the explorer view control bar 908. The Application view lists applications (e.g., controller programs, HMI applications) that make up the automation system project in a browsable format. In this example, the Application view allows users to view controller application information by selecting the Controller tab 1804*a*, and to view HMI application information by selecting an HMI tab 1804*b*.

Figure 24:
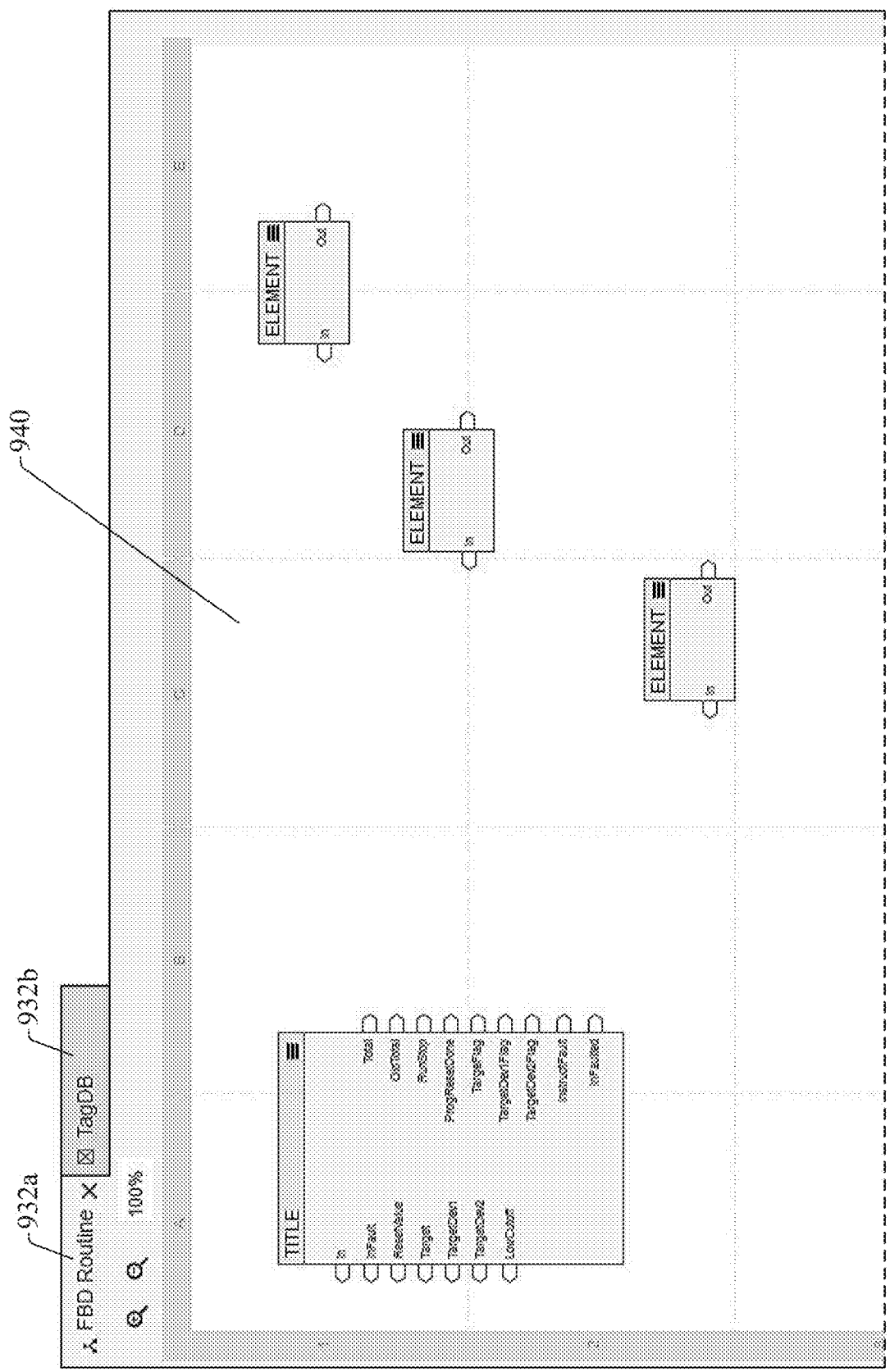
FIG. 24 is a view of an industrial IDE workspace canvas on which a portion of an example function block diagram program is rendered in response to selection of a function block diagram application node.

Selecting the Controller tab 1804*a* renders a Controller navigation tree 2204 in the Explorer panel content area 1808. The Controller navigation tree 2204 comprises nodes representing controller tags, controller parameters, control programming (e.g., ladder logic, structured text, function block diagram, etc.), handler routines (e.g., fault handlers, power-up handlers, etc.), and other such aspects of industrial controllers that make up the automation system project. These nodes are organized in the Controller navigation tree 2204 according to the controller with which the nodes are associated. Selection of a controller application node can render property information for the selected controller application in the Properties panel 936 (e.g. via single-click interaction) or can render the code for the selected application in a canvas 940 (e.g., via double-click interaction). FIG. 23 is a view of a canvas 940 on which a portion of an example structure text program is rendered in response to selection of a structured text application node from the Controller navigation tree 2204 or the System navigation tree 1902. FIG. 24 is a view of a canvas 940 on which a portion of an example function block diagram program is rendered in response to selection of a function block diagram application node from the Controller navigation tree 2204 or the System navigation tree 1902.

Similarly, selecting the HMI tab 1804*b* renders an HMI navigation tree 2206 in the Explorer panel content area 1808. This tree 2206 lists any HMI projects (or other types of visualization projects) associated with the automation system project, organized according to HMI server. Selection of an HMI application node can cause properties for the selected application to be rendered in the Properties panel 936, or can render the HMI application in a canvas 940.

Figure 25:
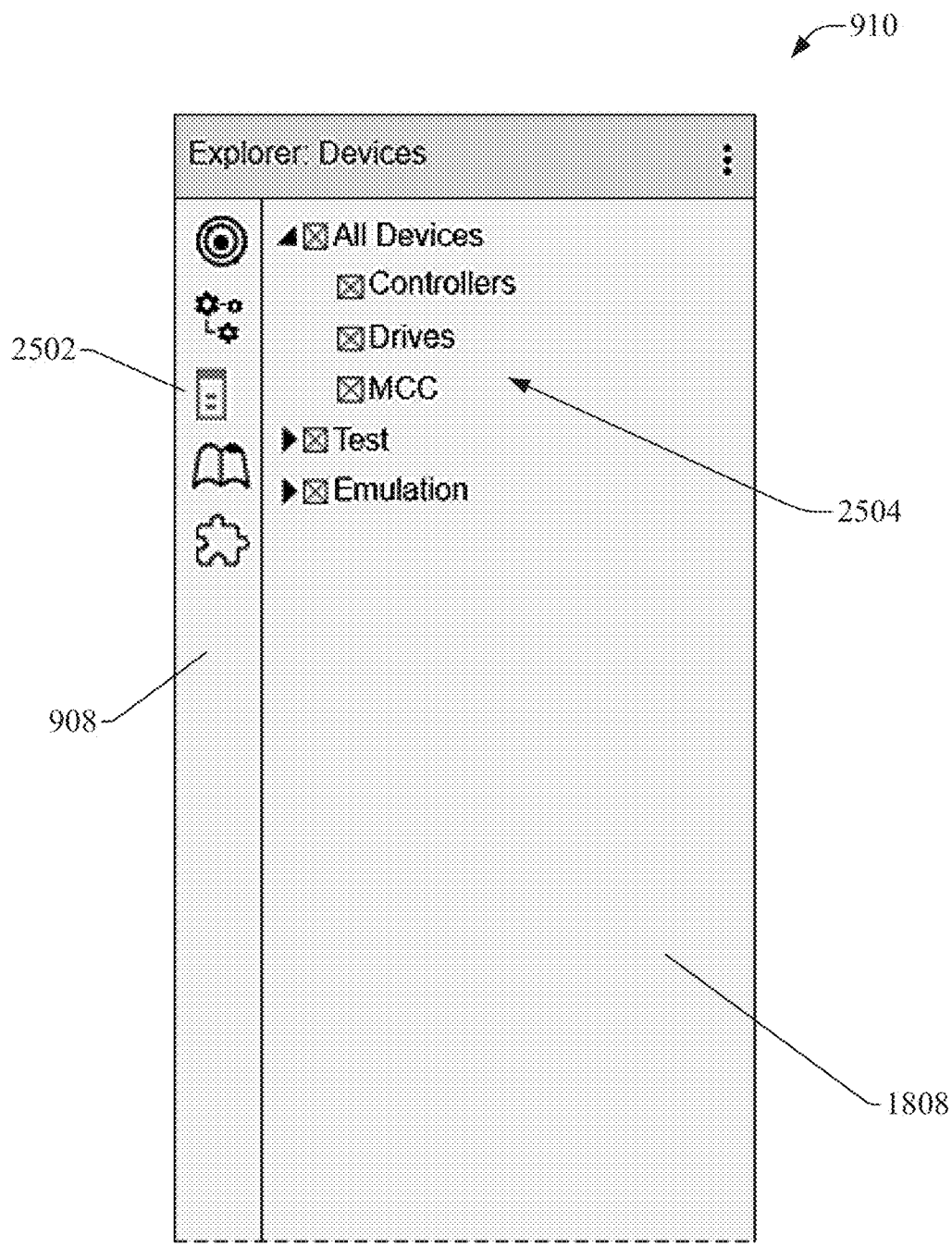
FIG. 25 is a view of an Explorer panel with the Devices view currently selected.
Figure 26:
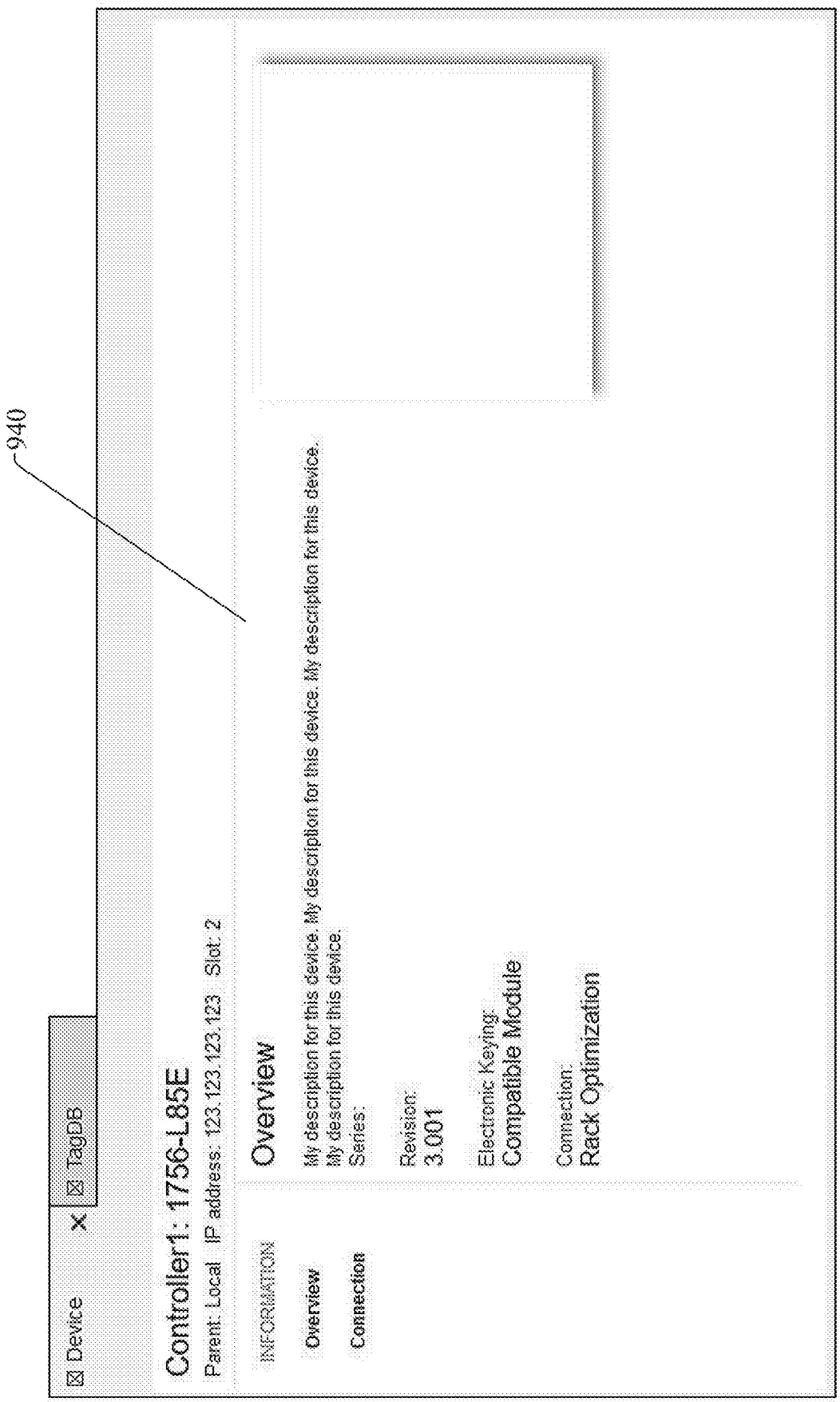
FIG. 26 is a view of an industrial IDE workspace canvas on which information for an example controller is rendered in response to selection of a controller node.

FIG. 25 is a view of the Explorer panel 910 with the Devices view currently selected. The Device view is invoked by selecting the Devices icon 2502 in the explorer view control bar 908. The Devices view renders a Device navigation tree 2504 in the Explorer panel content area 1808. This tree 2504 comprises nodes representing devices (e.g., controllers, drives, motor control centers, etc.) that make up the control system project. Similar to the other Explorer views, information for a selected device can be rendered in the Properties panel 936 or on a canvas 940 by appropriate interaction with the device's node. FIG. 26 is a view of a canvas 940 on which information for an example controller is rendered in response to selection of a controller node from the Device navigation tree 2504. As shown in this example, information that can be rendered for a selected device can include, but is not limited to, a name and model of the device, a network address of the device, an overview description of the device, a firmware version currently installed on the device, a type of electronic keying, a connection type, or other such device information.

Figure 27:
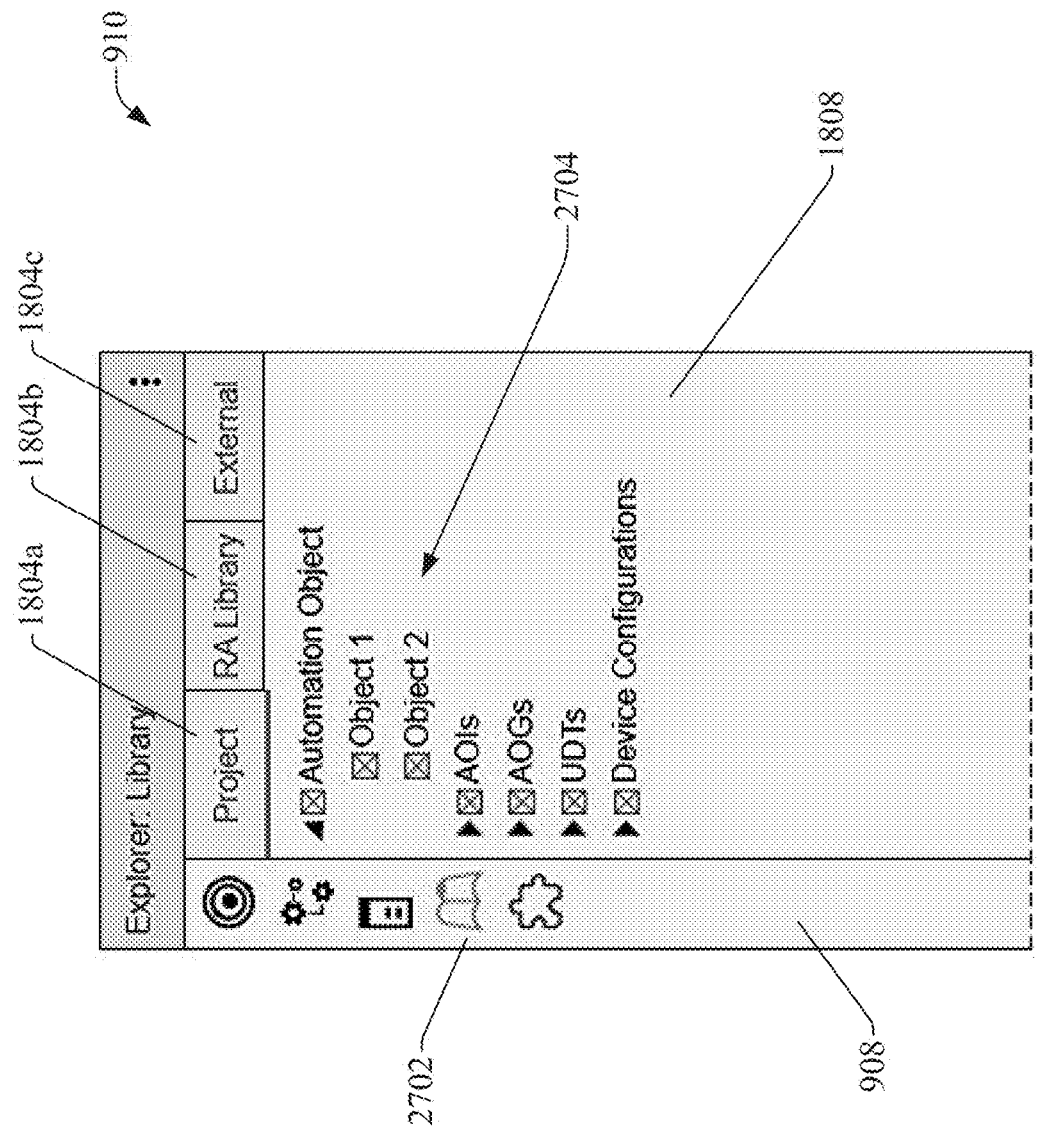
FIG. 27 is a view of an Explorer panel with the Library view currently selected.

FIG. 27 is a view of the Explorer panel 910 with the Library view currently selected. The Library view is invoked by selecting the Library icon 2702 in the explorer view control bar 908. The Library view renders a Library navigation tree 2704 in the Explorer panel content area 1808. Library navigation tree 2704 comprises nodes representing software objects such as automation objects, add-on instructions, user-defined data types, device configurations, or other such objects. The Library view can include two or more tabs 1804 that allow the user to select sources of software objects to be viewed. In the illustrated example, tab 1804*a* renders objects associated with the current automation system project, tab 1804*b* renders objects available in a vendor library, and tab 1804*c* renders objects from an external source. Similar to the other Explorer views, information regarding a selected object can be rendered in the Properties panel 936 or on a canvas 940 by appropriate interaction with the object's node.

Figure 28:
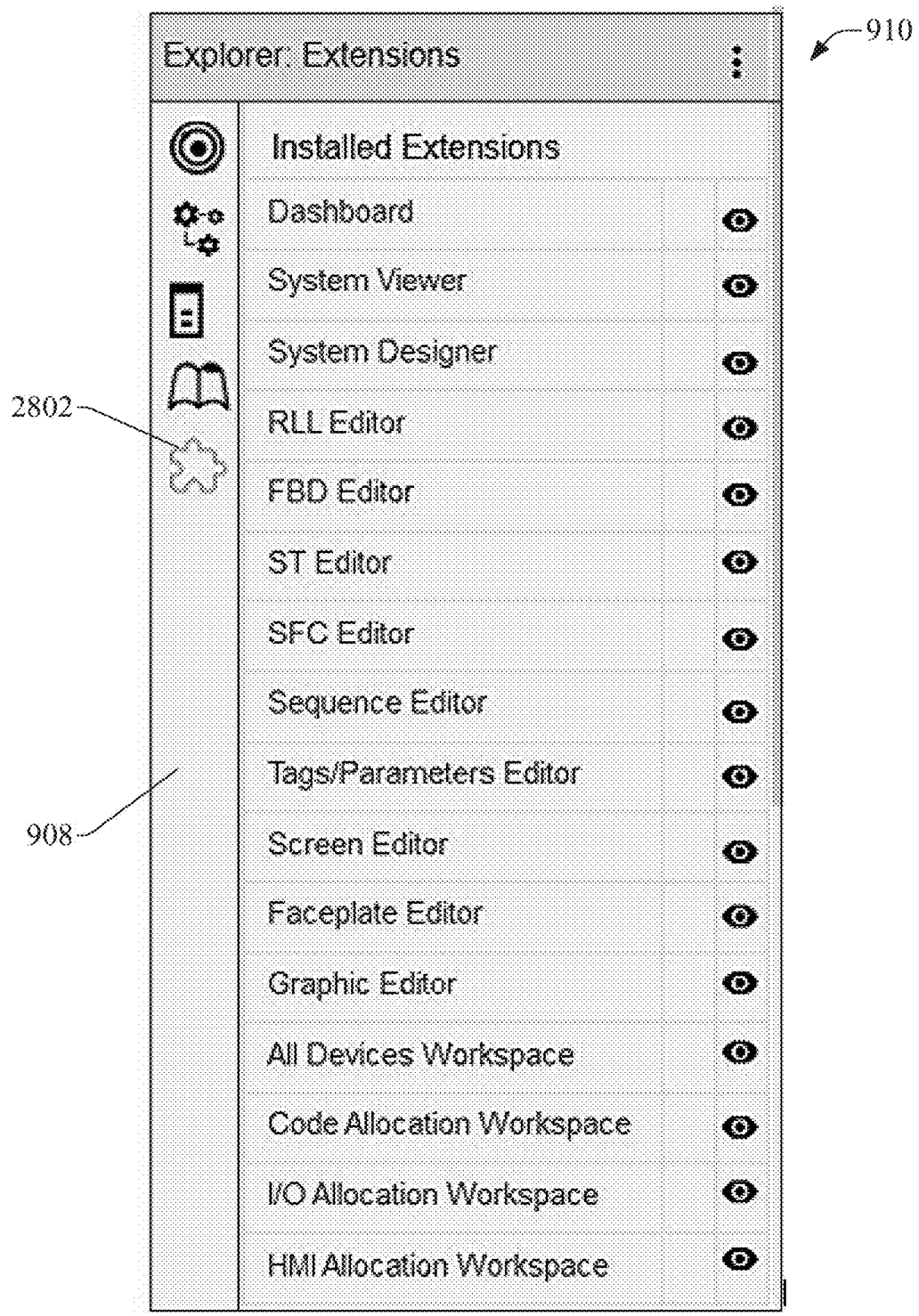
FIG. 28 is a view of an Explorer panel with the Extensions view currently selected.

FIG. 28 is a view of the Explorer panel 910 with the Extensions view currently selected. The Extensions view is invoked by selecting the Extensions icon 2802 in the explorer view control bar 908. The Extensions view renders a list of software extensions currently installed on the IDE system 202, which may include, but are not limited to, dashboards, system viewers and designers, ladder logic editors, function block diagram editors, structured text editors, HMI screen editors, or other such extensions.

Some embodiments of IDE system's user interface component 204 can also support multi-instance states of the project development environment, such that the development environment can be distributed across multiple display devices. Such embodiments can support multi-instance workflows that help to orient the user within the development environment and that allow the user to easily locate relevant editors within the expanded and distributed workspace, and to work fluidly across the multiple instances of the development interface 902.

Figure 29A:
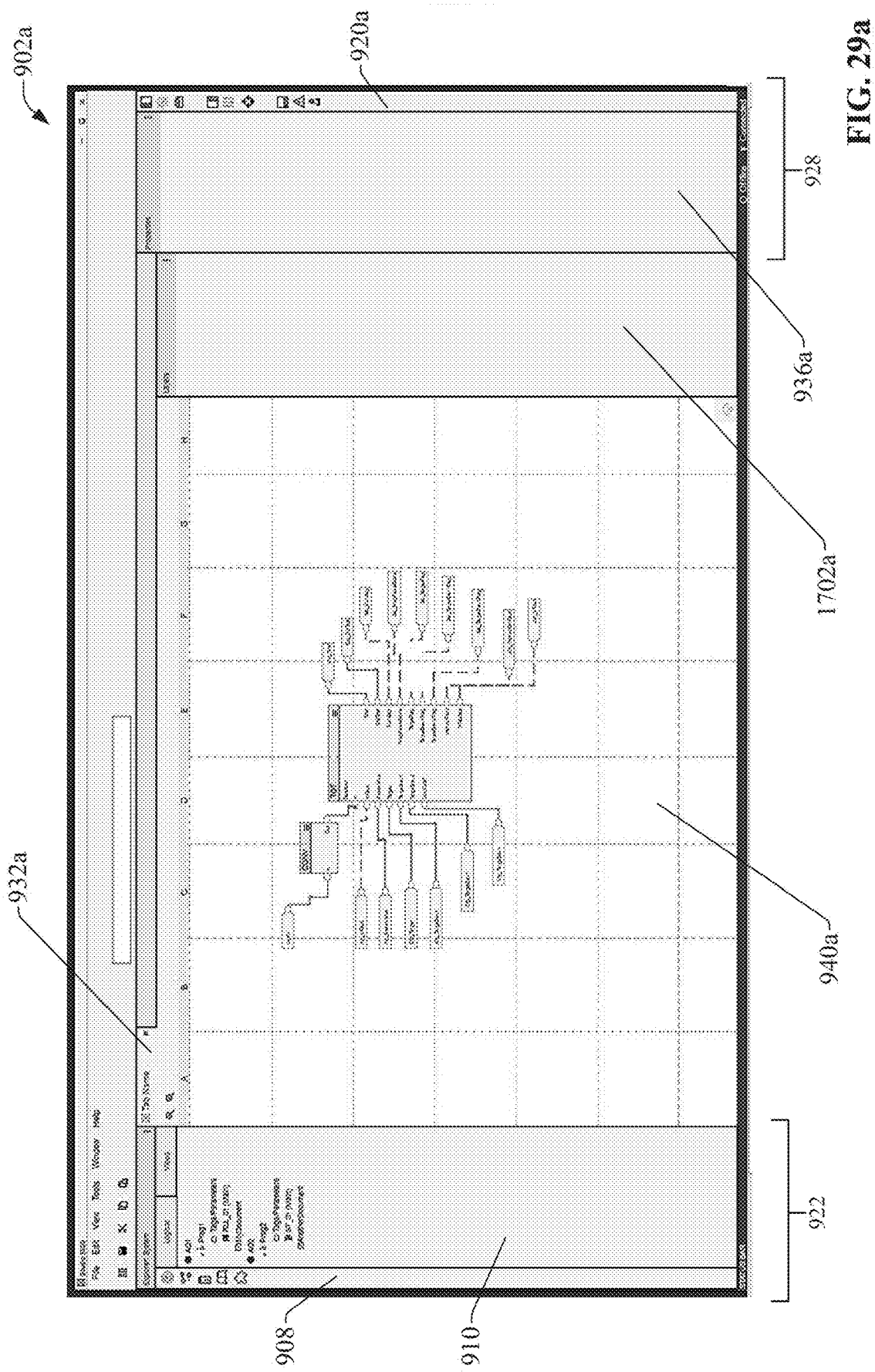
FIG. 29a is a left-side instance of an industrial IDE development interface that is distributed across two display devices.
Figure 29B:
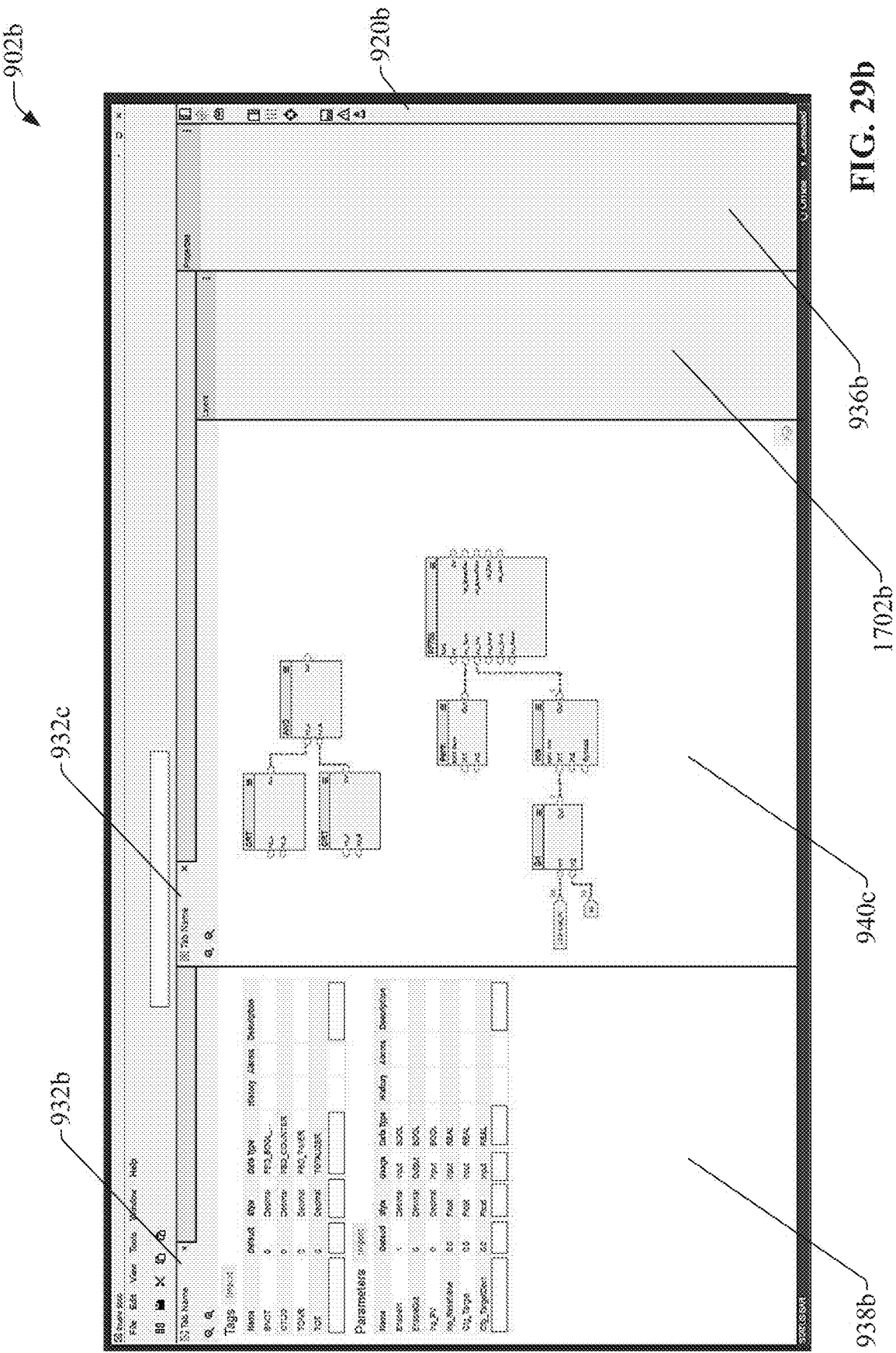
FIG. 29b is a right-side instance of the industrial IDE development interface that is distributed across two display devices.

FIGS. 29*a* and 29*b* depict an example distributed, multi-instance implementation of development interface 902. In this example, the development environment for an automation project currently being developed has been distributed across two monitors or other display devices, effectively expanding the development interface 902 across two separate but linked instances-development interface 902*a* (FIG. 29*a*) rendered on a left-side monitor and development interface 902*b* (FIG. 29*b*) rendered on a right-side monitor. In the illustrated example, the left-side interface 902*a* renders a first canvas 940*a* (and associated tab 932*a*) on which is displayed a control routine currently being developed. Interface 902*a* also renders the Explorer panel 910 and its associated explorer view control bar 908 in the left global panel area 922, a first instance of the Properties panel 936*a* in the right global panel area 928, and a first instance of an overlaid Layers panel 1702*a* adjacent to the Properties panel 936*a*. A first instance of the panel control bar 920*a* is anchored on the right edge of the interface 902*a*.

The right-side interface 902*b* renders two horizontally stacked canvases 940*b* and 940*c* (and their associated tabs 932*a* and 932*b*) containing two other aspects of the system project—a tag database and a parameter view, respectively. Second instances of the Properties panel 936*b* and Layers panel 1702*b* are rendered on the right-side of the interface 902*b*, and a second instance of the panel control bar 920*b* is anchored on the right edge of the interface 902*b*. In this example scenario, the user has opted to omit the Explorer panel 910 from the right global panel area of the second interface 902*b*.

Although only two instances of interface 902 are depicted in the example illustrated in FIGS. 29*a*-29*b*, the user interface component 204 can support expansion of the development interface 902 across any number of instances (e.g., if more than two display devices are available). Moreover, although the illustrated example depicts three opened canvases 940*a*-940*c* distributed across the two instances, any number of tabbed canvases 940 can be rendered on each instance of the interface 902.

The two interfaces 902*a* and 902*b* are extensions of one another, such that moving the cursor beyond the right boundary of left-side interface 902*a* causes the cursor to enter the right-side interface 902*b* via the left boundary of the right-side interface 902*b*, and vice versa. Thus, the user can fluidly traverse across the three canvases 940*a*-940*c*. In general, the user can configure panel visibility and layouts independently for each extended interface 902*a* and 902*b*. For example, the user may opt to render copies of the same global panel on both interface instances, or may choose to render a given panel visible on one interface while omitting the panel from the other interface.

To assist the user to easily navigate between the interface instances, particularly in scenarios in which several tabbed canvases 940 are open, some embodiments of interface 902 can render an Available Tabs menu in response to selection of a suitable control (e.g., a control in the menu bar 904), which lists the tabs 932 that are currently open and available for selective focus. FIG. 30 is an example Available Tabs menu 3002 that can be invoked in such embodiments. Example menu 3002 lists the currently active canvases 940 according to name (e.g., Ladder 1, Tags, Parameters, etc.) and segregates the list according to the instance of interface 902 on which the respective canvases 940 currently reside. The list can be segregated vertically such that a first section 3004 lists the tabs 932 visible on the first instance of interface 902 and a second section 3006 lists the tabs 932 visible on the second instance. Selecting any of the tabs on the menu 3002 will cause the interface 902 to move the focus to the selected tab 936 (that is, bring the selected tab to the front of the workspace). By listing all active tabs in one menu 3002, a user can easily select a desired tab that may be located on an interface instance other than the one currently being viewed by the user, or that may be hidden under other overlaid canvases 940 or panels. This can mitigate the need to search through the distributed instances of interface 902 to locate a desired canvas 940.

Menu 3002 can also include other controls for manipulating the tabs 932. For example, a Consolidate menu option 3008 can cause all tab instances across the multiple interface instances to be moved to the interface instance currently being viewed (that is, the instance from which the Consolidate command was triggered). In some embodiments, performing this Consolidate function will also cause all extended instances of interface 902 to be closed, leaving only the currently viewed instance active.

A tab 932 and its associated canvas 940 can be moved from one instance of interface 902 to another by selecting and dragging the tab from its current instance of interface 902 to the target instance (e.g., a target instance on another display device). If a tab 932 is moved to an instance of interface 902 that already contains one or more visible canvases 940, the existing canvases will be resized to accommodate the addition of the canvas 940 associated with the relocated tab 932. In such cases, the canvases 940 can automatically determine a suitable configuration of horizontal and/or vertical stacking of the canvases 940 based on the current orientations of the preexisting tabs and the drop location of the relocated tab.

In some embodiments, layout and functionality of the development interface 902 can also be responsive to the size of the screen or display device on which the interface is rendered. The dimensions of the boundaries within which the interface 902 operates can be a function of the dimensions of the device's display screen, or may be set by the user by resizing the IDE system's development environment window. In either case, user interface component 204 can be configured to enable or disable certain functions of the development interface 902 based on the size or aspect ratio of the interface's boundaries, and to reorganize elements of the development interface 902 as needed to fill the available horizontal and vertical viewport space as a function of available space.

In an example embodiment, development interface 902 can support multiple layout modes corresponding to respective ranges of screen or window widths. FIGS. 31*a*-31*d* are example instances of development interface 902 that accord to respective different layout modes as a function of available screen width.

Figure 31A:
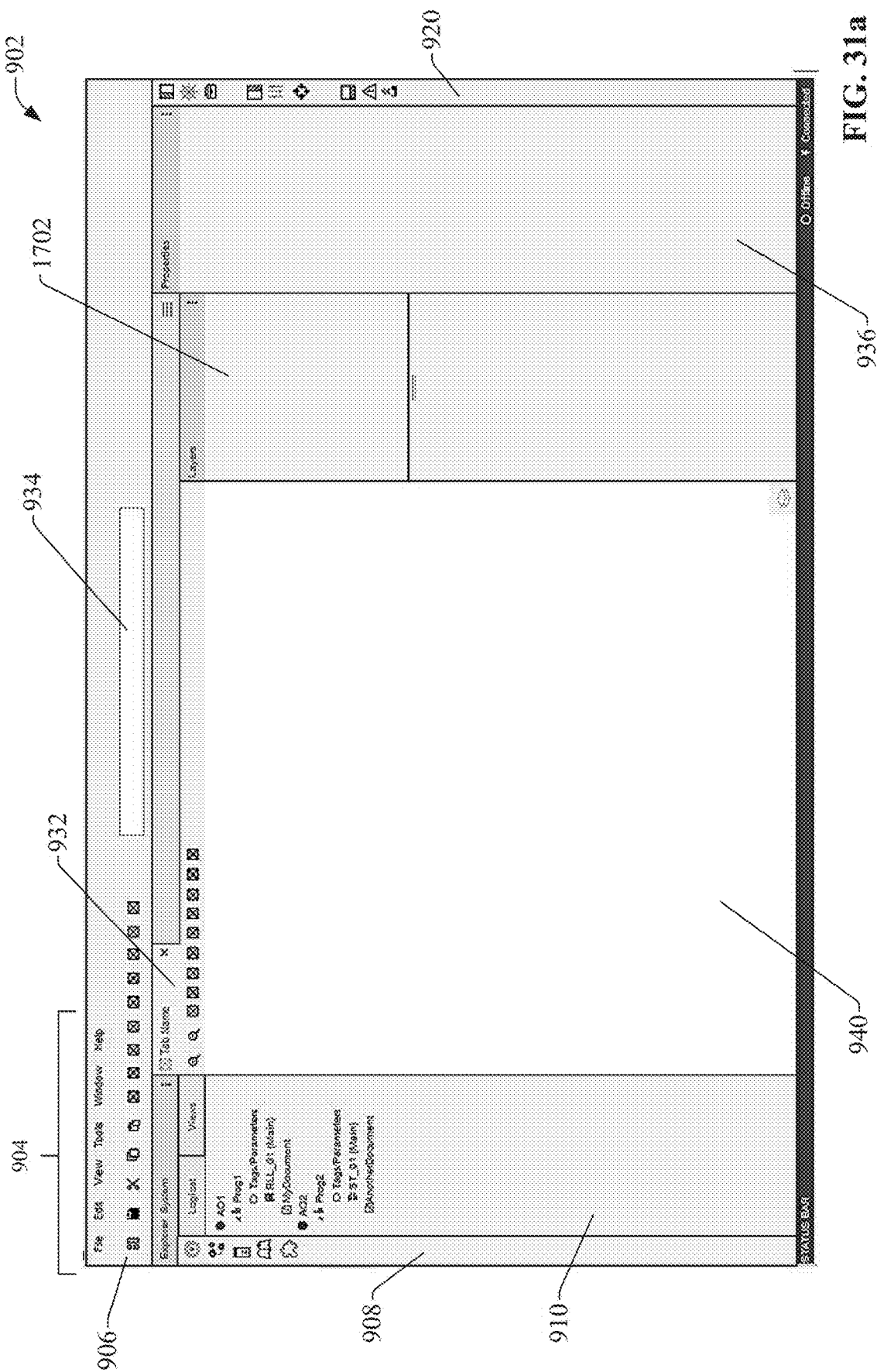
FIG. 31a is an industrial IDE development interface rendered in accordance with a first layout mode suitable for scenarios in which there are no width restrictions.

FIG. 31*a* depicts a first layout mode suitable for scenarios in which there are no width restrictions. This first layout mode offers full support for all primary interface elements, as described above.

Figure 31B:
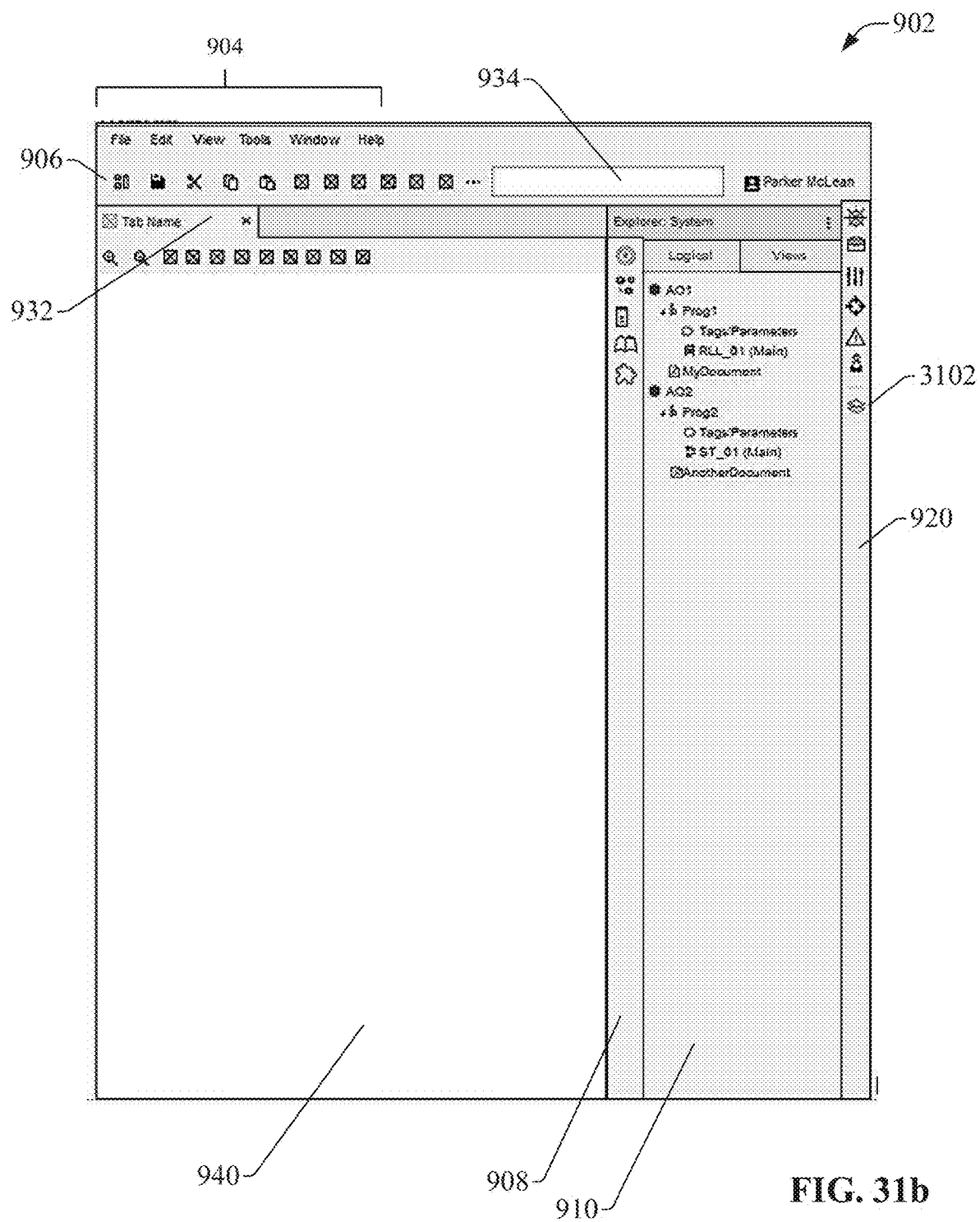
FIG. 31b is an industrial IDE development interface rendered in accordance with a second layout mode that is invoked when the available screen width is below a first threshold width.

FIG. 31*b* depicts a second layout mode that may be initiated by user interface component 204 when the available screen width is below a first threshold width. According to this second layout mode, global panel sections (e.g., Properties panel 936) are removed, and pinned panels are prohibited (that is, all panels are rendered as overlay panels). Left and bottom panel support is disabled, and only global right overlay panels are permitted to be rendered. Only one panel is permitted to be rendered at a given time. Content panel visibility icons, which are normally rendered on the canvas's tool bar, are moved to the global panel control bar 920 (e.g., Layers visibility icon 3102). Support for multiple stacked canvases is disabled. The Explorer panel 910, including its associated explorer view control bar 908, is moved from the left side to the right side of the interface 902 adjacent to the global panel control bar 920.

Figure 31C:
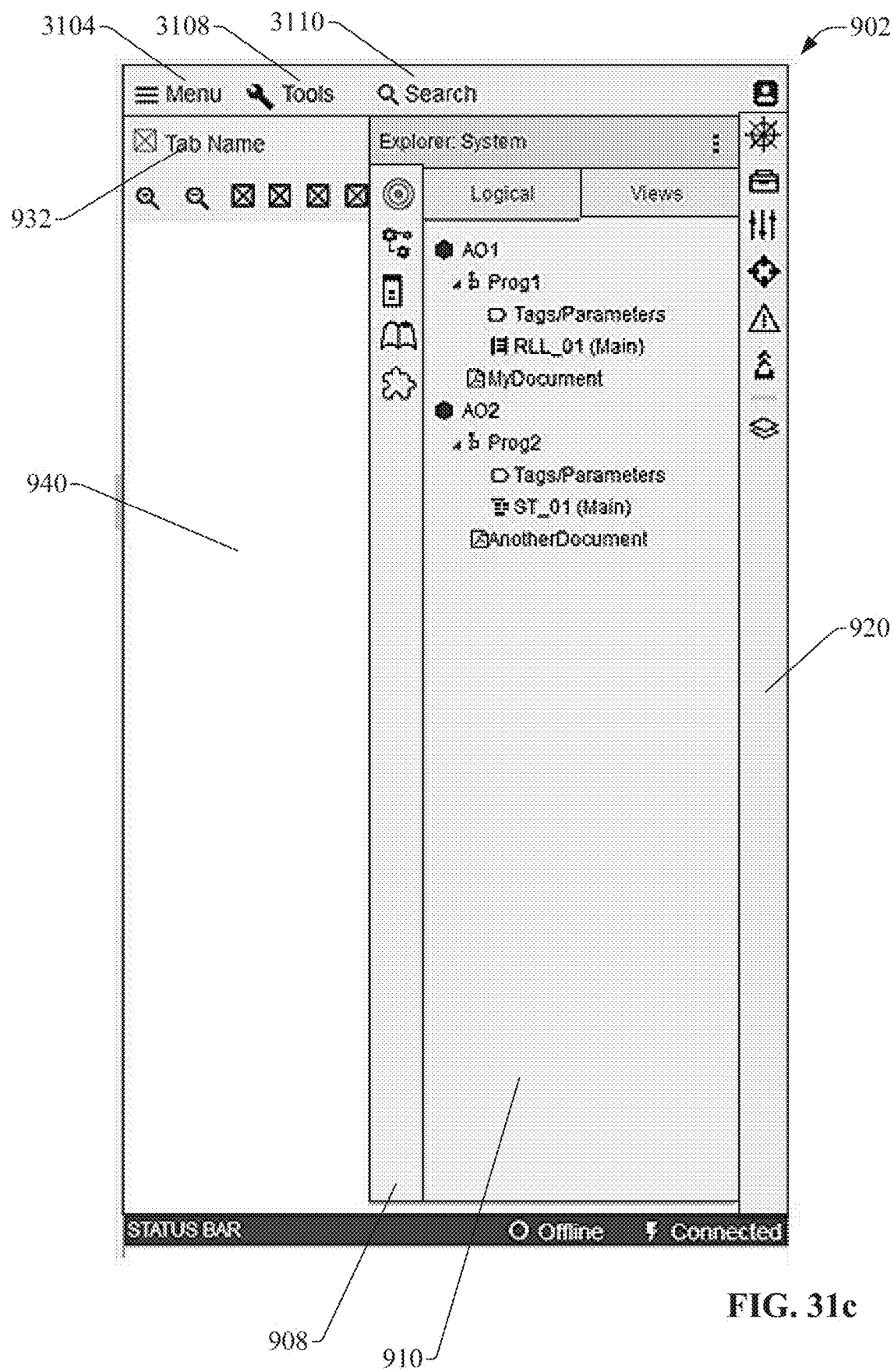
FIG. 31c is an industrial IDE development interface rendered in accordance with a third layout mode that may be initiated when the available screen width is below a second threshold width that is smaller than the first threshold width.

FIG. 31*c* depicts a third layout mode that may be initiated by user interface component 204 when the available screen width is below a second threshold width that is smaller than the first threshold width. This third layout mode maintains all limitations and restrictions of the second layout mode. In addition, header elements are collapsed to reduce the number of selections visible at the same time. This includes collapsing the visible selection on menu bar 904 into a single selectable menu icon 3104, which can be selected to render the menu bar options as a drop-down list. Similarly, the selections on the tool bar 908 are collapsed into a single Tools icon 3108, which can be selected to render the tool bar selections in another drop-down list. Search bar 934 is also reduced to a selectable Search icon 3110. As a result of these consolidations, the total number of visible selections is reduced, thereby decluttering the limited development space.

The industrial IDE development interface 902 described herein offers a highly adaptable workspace layout that intelligently filters information and editing tools available to the user at a given time as a function of the user's current development task or focus, which allows desired information and editing tools relevant to the current development context to be located easily. In addition, the interface 902 affords the user a great deal of control over customization of the workspace layout, while maintaining a clean and uncluttered development space that can be navigated easily. The IDE system 902 and its associated development interfaces 902 are suitable for developing multiple aspects of an industrial automation system—e.g., control programming, device configuration, alarm configuration, visualization screen development—within the same multi-content workspace, and can be used to develop projects ranging in scale from single controller systems to systems encompassing scores of controllers across different industrial facilities.

FIGS. 32*a*-35*b* illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 32A:
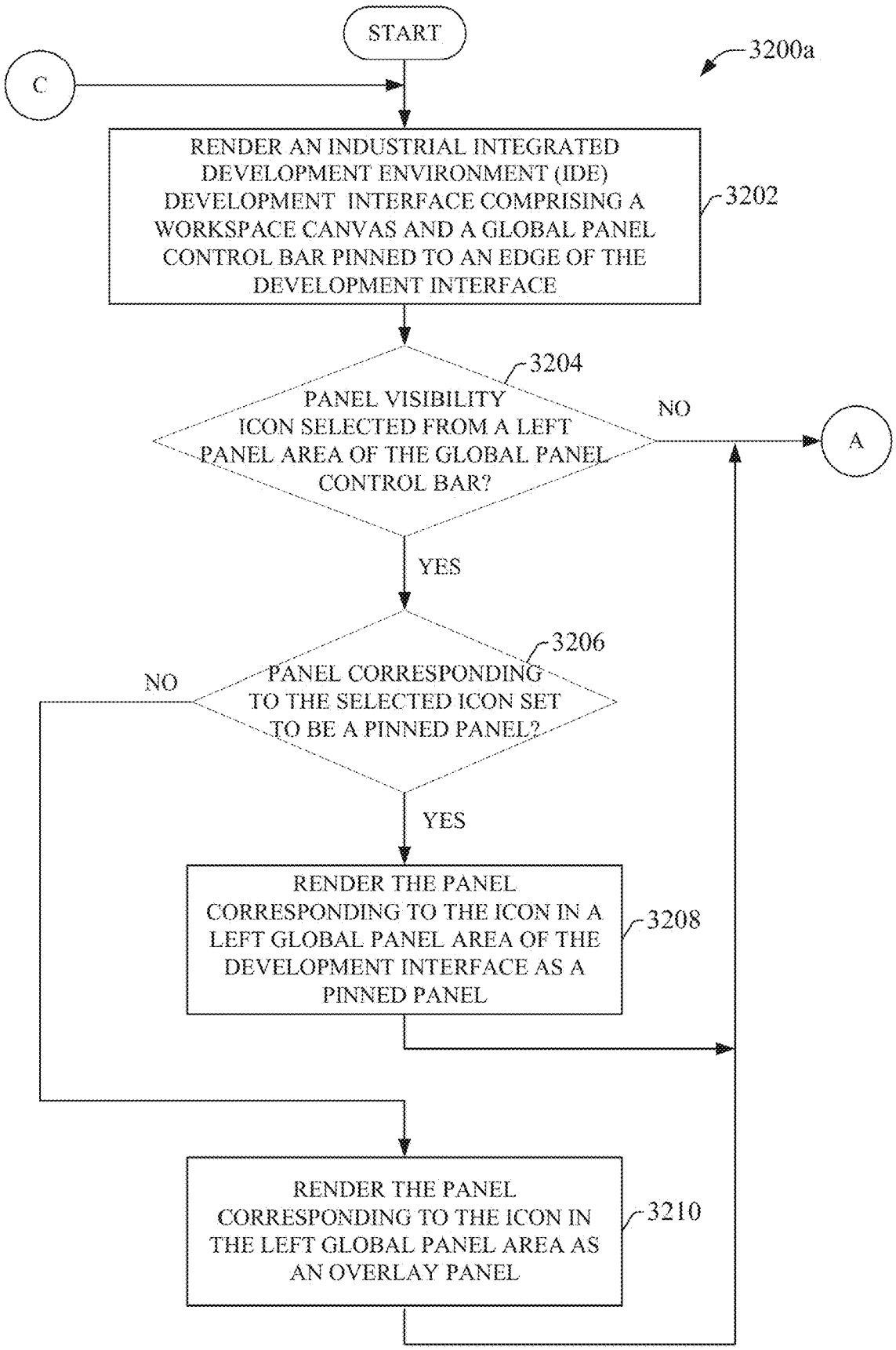
FIG. 32a is a flowchart of a first part of an example methodology for customizing panel visibility and layout on a development interface of an industrial IDE system.

FIG. 32*a* illustrates a first part of an example methodology 3200*a* for customizing panel visibility and layout on a development interface of an industrial IDE system. Initially, at 3202, an industrial IDE interface is rendered comprising a workspace canvas and a global panel control bar pinned to an edge of the IDE development interface. The global panel control bar can comprise a set of visibility icons that control visibility of respective global panels supported by the industrial IDE system. In some embodiments, the development interface can comprise segregated global panel display areas—e.g., a left, right, and bottom global panel area—and the visibility icons can be organized on the global panel control bar according to the panel display area to which the respective panels have been designated.

At 3204, a determination is made as to whether a panel visibility icon has been selected from a left panel area of the global panel control bar. The left panel area is a section of the global panel control bar on which is rendered visibility icons corresponding to a subset of the global panels that have been designated to the left global panel area of the development interface. If a visibility icon has been selected from the left panel area of the global panel control bar (YES at step 3204), the methodology proceeds to step 3206, where a determination is made as to whether the panel corresponding to the visibility icon selected at step 3204 has been set to be a pinned panel. For example, the panel may have been previously set to be pinned by a user via an appropriate interaction with a properties menu associated with the panel. If the panel has been set to be pinned (YES at step 3206), methodology proceeds to step 3208, where the panel corresponding to the visibility icon is rendered in the left global panel area of the development interface as a pinned panel. Alternatively, if the panel has not been set to be pinned (NO at step 3206), the methodology proceeds to step 3210, where the panel is rendered in the left global panel area as an overlay panel.

Figure 32B:
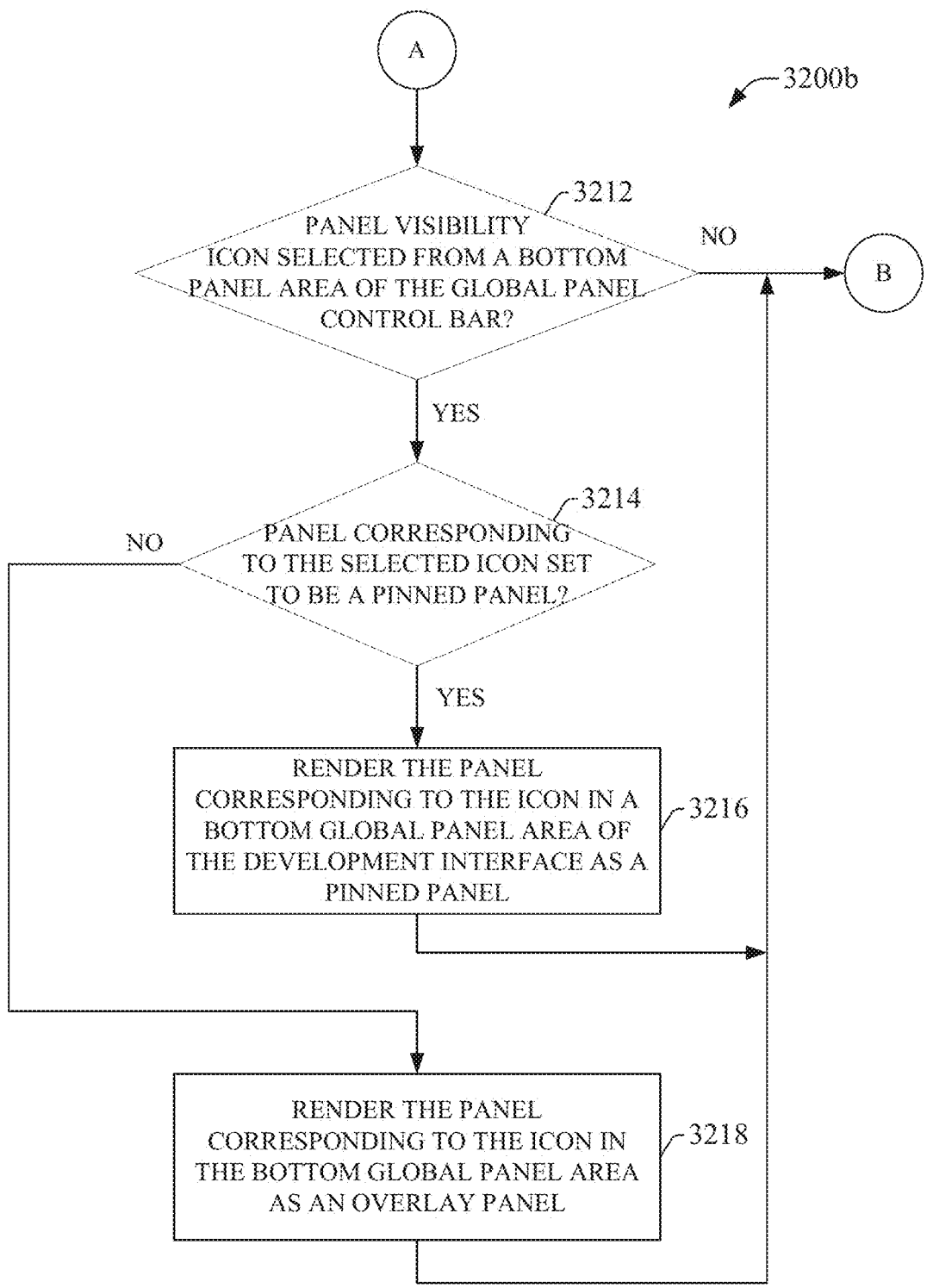
FIG. 32b is a flowchart of a second part of the example methodology for customizing panel visibility and layout on the development interface of the industrial IDE system.

Once the panel has been rendered, or if no panel visibility icon has been selected from the left panel area of the global panel control bar (NO at step 3204), the methodology proceeds to the second part 3200*b* illustrated in FIG. 32*b*. At 3212, a determination is made as to whether a panel visibility icon has been selected from a bottom panel area of the global panel control bar. The bottom panel area is a section of the global panel control bar on which is rendered visibility icons corresponding to a subset of the global panels that have been designated to the bottom global panel area of the development interface. If a visibility icon has been selected from the bottom panel area (YES at step 3212), the methodology proceeds to step 3214, where a determination is made as to whether a panel corresponding to the visibility icon selected at step 3212 has been set to be a pinned panel. If the panel has been set to be pinned (YES at step 3214), the methodology proceeds to step 3216, where the panel corresponding to the selected visibility icon is rendered in the bottom global panel area of the development interface as a pinned panel. Alternatively, if the panel has not been set to be pinned (NO at step 3214), the methodology proceeds to step 3218, where the panel is rendered in the bottom global panel area as an overlay panel.

Figure 32C:
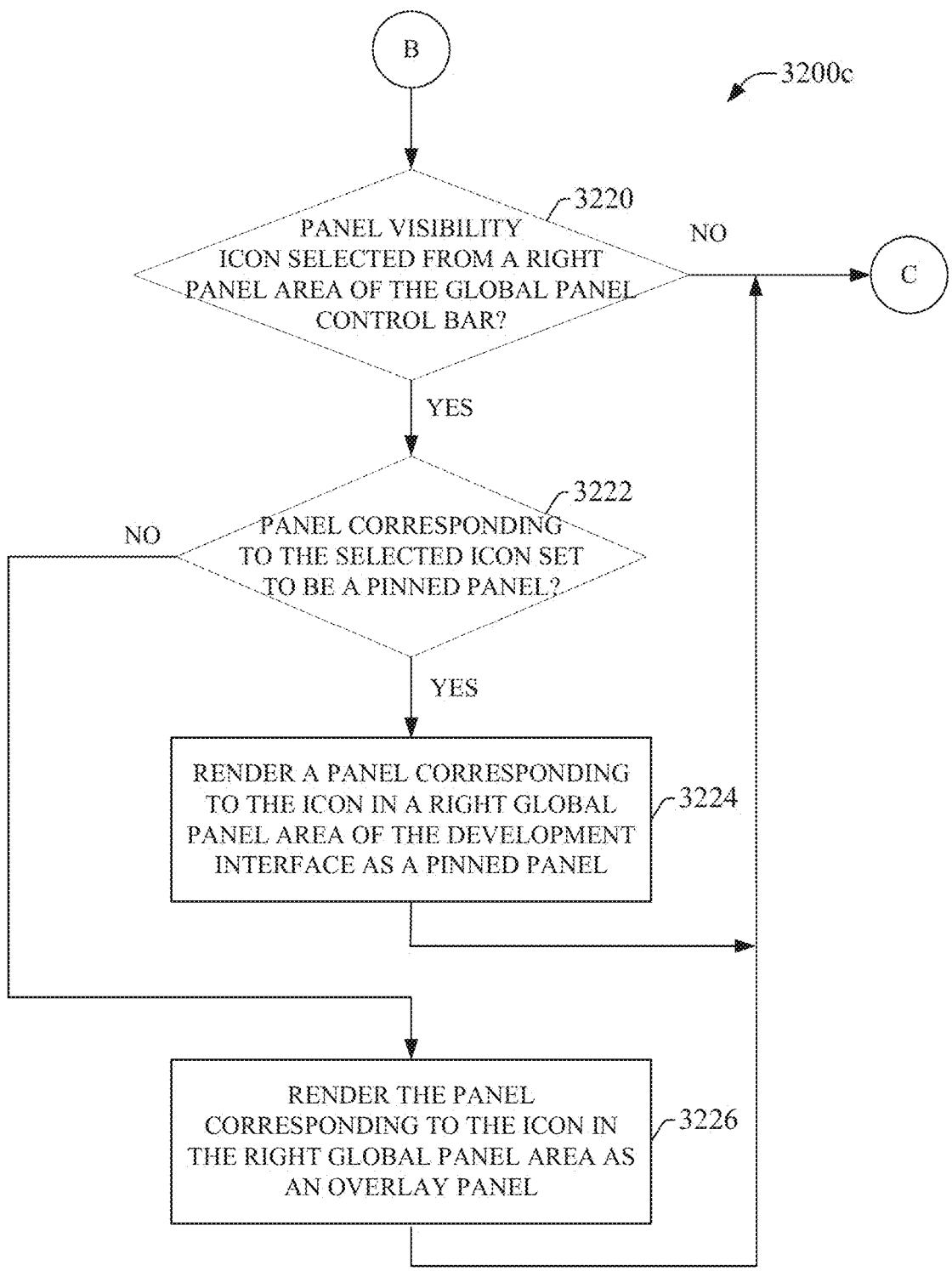
FIG. 32c is a flowchart of a third part of the example methodology for customizing panel visibility and layout on the development interface of the industrial IDE system.

Once the panel has been rendered, or if no panel visibility icon has been selected from the bottom panel area of the global panel control bar (NO at step 3212), the methodology proceeds to the third part 3200*c* illustrated in FIG. 32*c*. At 3220, a determination is made as to whether a panel visibility icon has been selected from a right panel area of the global panel control bar. The right panel area is a section of the global panel control bar on which is rendered visibility icons corresponding to a subset of the global panels that have been designated to the right global panel area of the development interface. If a visibility icon has been selected from the right panel area (YES at step 3220), the methodology proceeds to step 3222, where a determination is made as to whether a panel corresponding to the visibility icon selected at step 3220 has been set to be a pinned panel. If the panel has been set to be pinned (YES at step 3222), the methodology proceeds to step 3224, where the panel corresponding to the selected visibility icon is rendered in the right global panel area of the development interface as a pinned panel. Alternatively, if the panel has not been set to be pinned (NO at step 3222), the methodology proceeds to step 3226, where the panel is rendered in the right global panel area as an overlay panel.

Once the panel has been rendered, or if no panel visibility icon has been selected from the right panel area of the global panel control bar (NO at step 3222), the methodology returns to step 3202 and the methodology repeats.

Figure 33A:
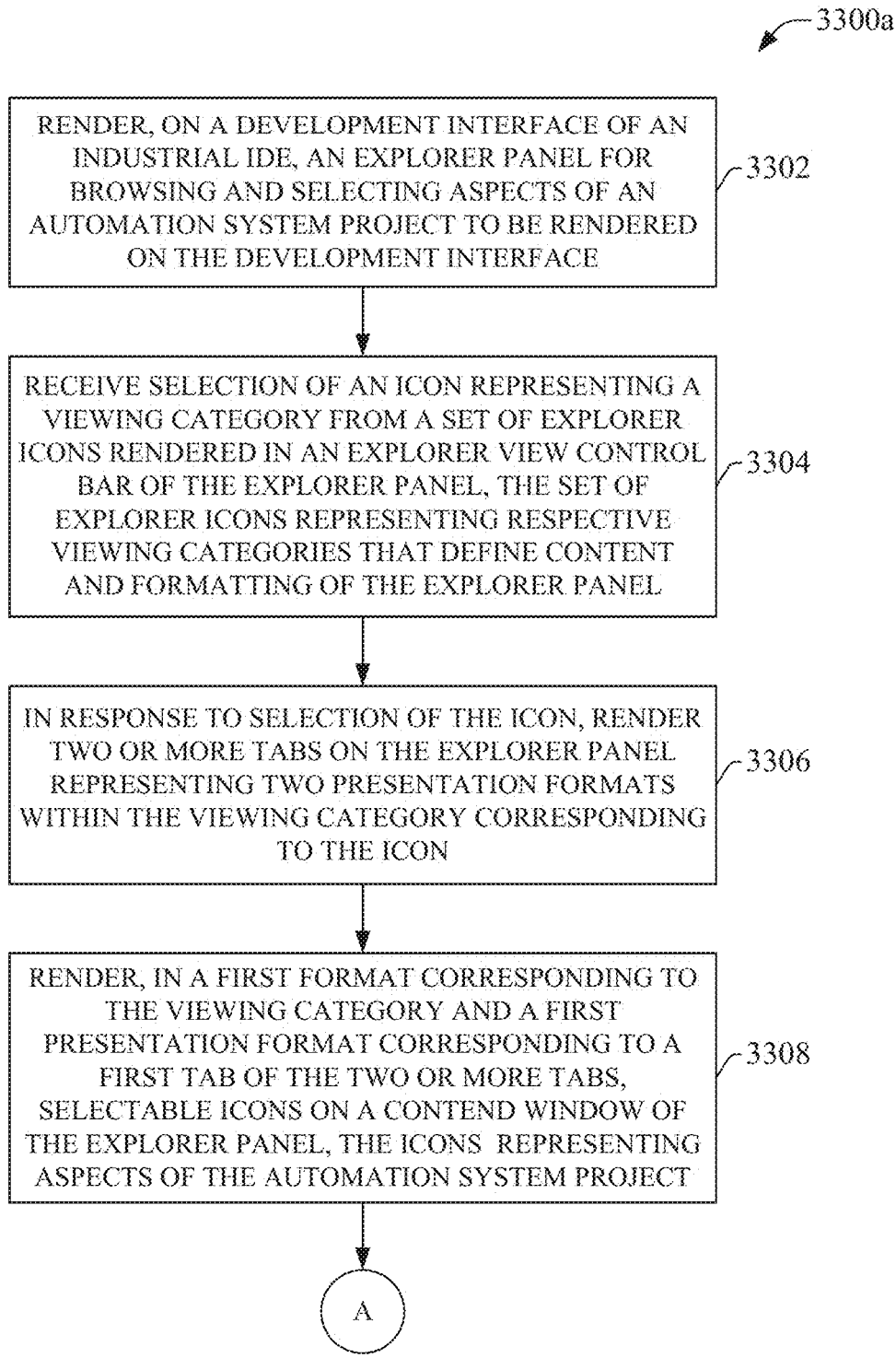
FIG. 33a is a flowchart of a first part of an example methodology for browsing and rendering aspects of an industrial automation project via interaction with an industrial IDE development interface.

FIG. 33*a* illustrates a first part of an example methodology 3300*a* for browsing and rendering aspects of an industrial automation project via interaction with an industrial IDE development interface. Initially, at 3302, an explorer panel is rendered on the development interface, where the explorer panel is configured to facilitate browsing and selecting of aspects of an industrial automation project (e.g., control programming or routines, HMI development screens, controller tag databases, industrial device parameter configurations, alarm configurations, etc.) to be rendered on the development interface. The explorer panel can comprise a set of selectable icons representing respective viewing categories supported by the explorer panel, where each viewing category defines content and formatting of selections to be presented in the explorer panel. In some embodiments, the explorer panel can be selectively rendered or hidden using the methodology described above in connection with FIGS. 32*a*-32*c*.

At 3304, selection of an icon representing one of the viewing categories from the set of supported viewing categories is received. Example viewing categories that can be selected in this manner can include, but are not limited to, a System view that lists components of the automation system project (e.g., control routines, tags, visualization applications or screens, alarms, etc.), an Application view that lists applications that make up the automation system project (e.g., control programming applications, HMI applications, etc.), a Devices view that lists devices that make up the automation system project, a Library view that lists software objects that make up the automation system project (e.g., automation objects, add-on instructions, user-defined data types, device configurations, etc.), and an Extensions view that lists software add-ons or extensions that have been installed on the industrial IDE system. Some or all of the content associated with these views can be rendered in a hierarchical format to allow users to more quickly and easily browse and locate a desired selection.

At 3306, in response to selection of the icon at step 3304, two or more tabs are rendered on the explorer panel, the two or more tabs representing respective two or more presentation formats for content within the viewing category corresponding to the selected icon. For example, selection of an Application view icon may cause the explorer panel to render two or more tabs representing respective different types of applications that can be explored (e.g., controller applications, HMI applications, etc.). In another example, selection of a Library view can cause the explorer panel to render two or more tabs representing respective sources of software objects that can be explored.

At 3308, selectable icons are rendered on a content window of the explorer panel, where the icons correspond to the viewing category and a first presentation format corresponding to a first tab of the two or more tabs rendered at step 3306. The selectable icons—which may be graphical, text-based, or a combination of both—represent aspects of the automation system project that can be browsed and selected for presentation in the development interfaces may workspace or canvas.

Figure 33B:
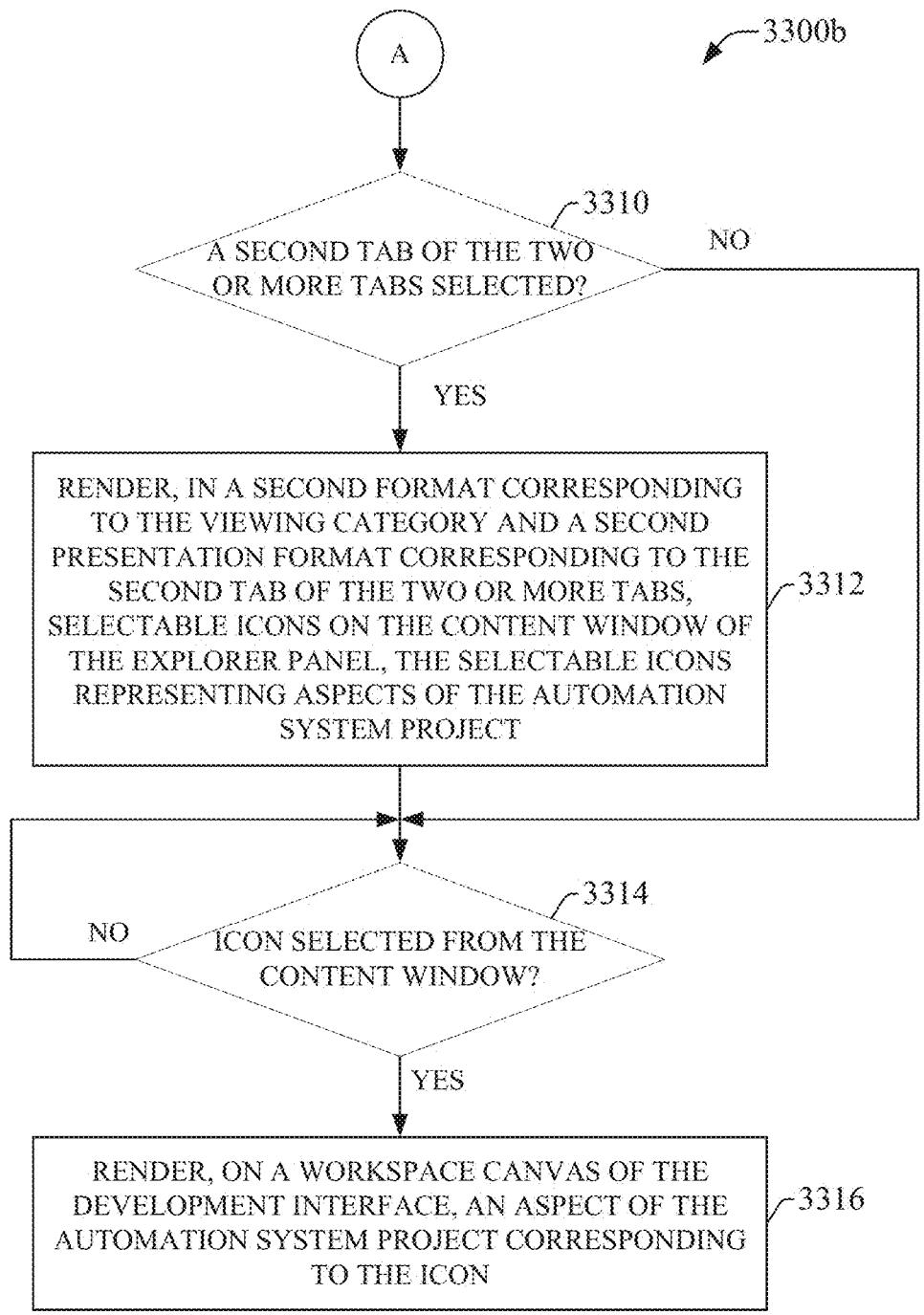
FIG. 33b is a flowchart of a second part of the example methodology for browsing and rendering aspects of the industrial automation project via interaction with the industrial IDE development interface.

The methodology continues with the second part 3300*b* illustrated in FIG. 33*b*. At 3310, a determination is made as to whether a second tab of the two or more tabs rendered at step 3306 has been selected. If the second tab has been selected (YES at step 3310), the methodology proceeds to step 3312, where selectable icons—which may include some or all of the selectable icons represented at step 3308 or a different set of icons—are rendered in the content window of the explorer panel in a second presentation format corresponding to the second tab.

If the second tab is not selected (NO at step 3310) or after the icons have been rendered in the second format at step 3312, the methodology proceeds to step 3314, where a determination is made as to whether an icon is selected from the content window of the explorer panel. If an icon has been selected (YES at step 3314), the methodology proceeds to step 3316, where an aspect of the automation system project corresponding to the icon is rendered. The aspect may be, for example, a ladder logic routine, a structure text program, a function block diagram, an HMI development screen, an alarm configuration screen, a device parameter configuration screen, an engineering drawing or schematic, or another such aspect.

Figure 34A:
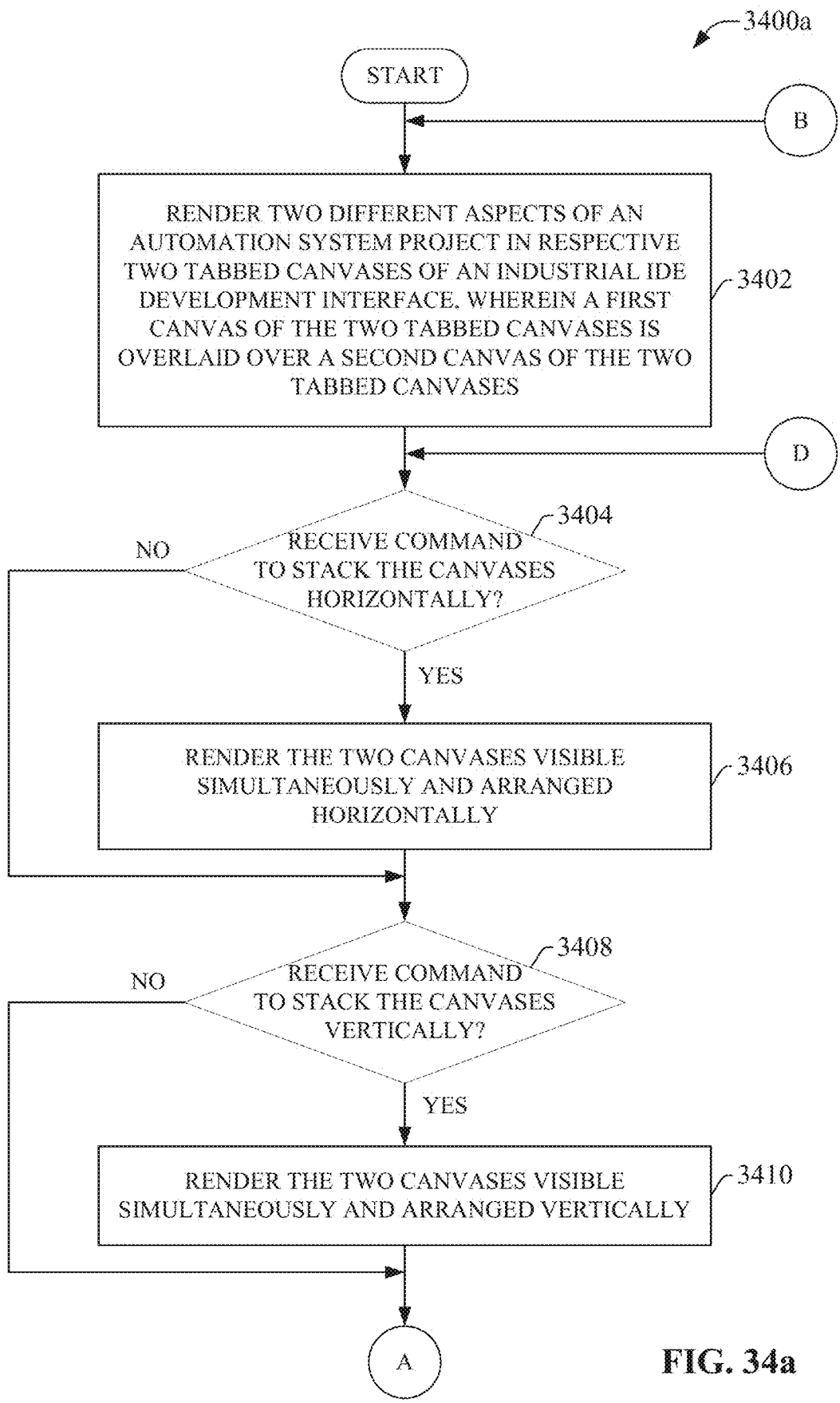
FIG. 34a is a flowchart of a first part of an example methodology for manipulating workspace canvases within an industrial IDE development interface.

FIG. 34*a* illustrates a first part of an example methodology 3400*a* for manipulating workspace canvases within an industrial IDE development interface. Initially, at 3402, two different aspects of an automation system project are rendered in respective two tabbed canvases of an industrial IDE development interface. The two tabbed canvases are initially rendered such that a first of the two canvases is overlaid over a second of the two canvases such that content of only one canvas is visible at a given time, and the visible content can be selected by selecting the appropriate tab. Project aspects that can be rendered in these tabbed canvases can include, but are not limited to, control programming, tag databases, device configurations, HMI development screens, alarm configurations, or other such content.

At 3404, a determination is made as to whether a command to stack the canvases horizontally has been received. If such a command is received (YES at step 3404), the methodology proceeds to step 3406, where the two canvases are rendered such that content of the two canvases is displayed simultaneously and the canvases are arranged horizontally. Alternatively, if the command to stack the canvases horizontally is not received (NO at step 3404), the methodology proceeds to step 3408, where a determination is made as to whether a command to stack the canvases vertically has been received. If such a command is received (YES at step 3408) the methodology proceeds to step 3410, where the two canvases are rendered that content of the two canvases is displayed simultaneously and the canvases are arranged horizontally.

Figure 34B:
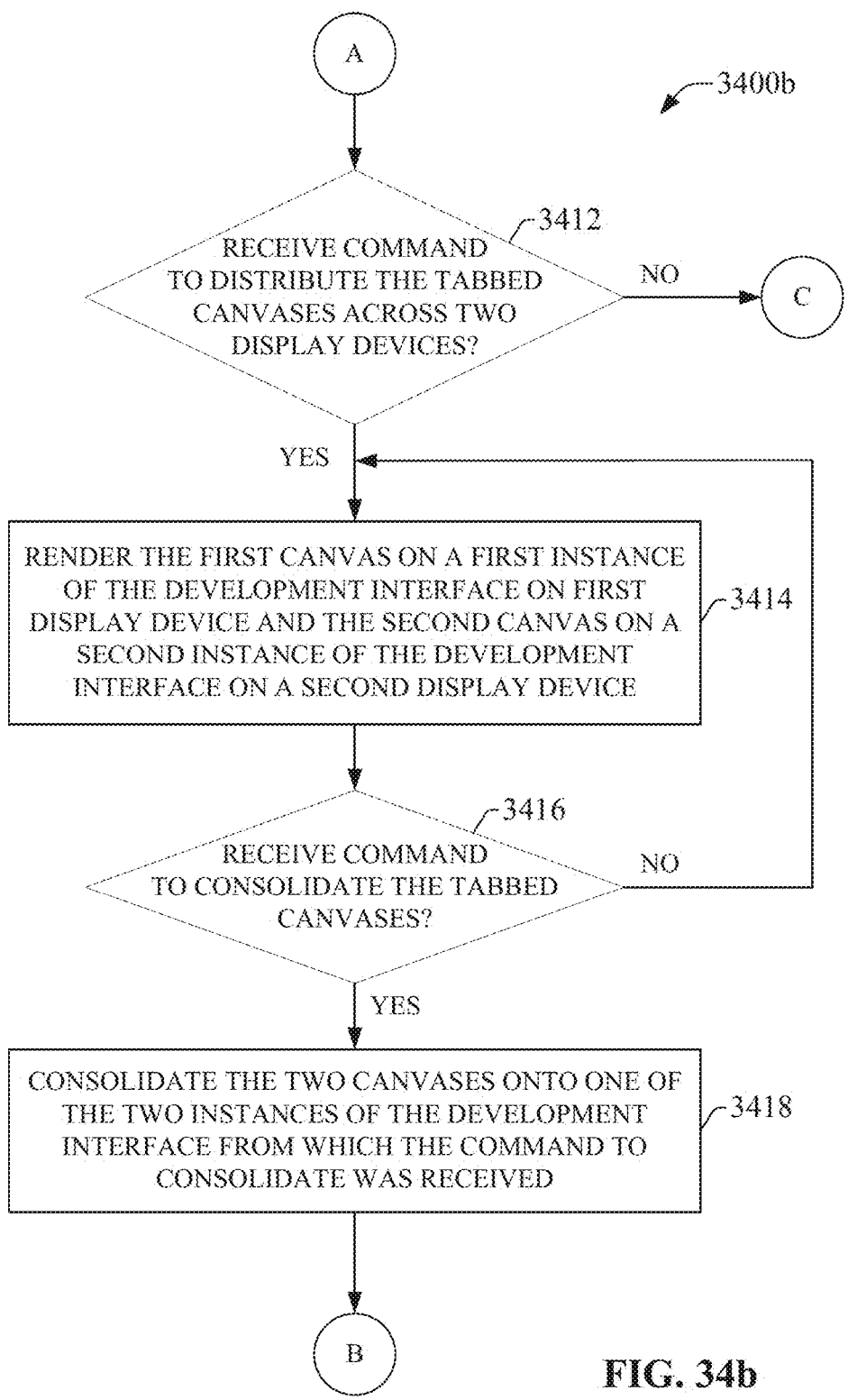
FIG. 34b is a flowchart of a second part of the example methodology for manipulating workspace canvases within the industrial IDE development interface.

The methodology than continues with the second part 3400*b* illustrated in FIG. 34*b*. At 3412, a determination is made as to whether a command to distribute the tabbed canvases across two display devices has been received. This command may be received in implementations in which the interface display is extended across two display devices to expand the usable workspace. If the command to distribute the tabbed canvases is received (YES at step 3412), the methodology proceeds step 3414, where the first canvas is rendered on a first instance of the development interface on a first display device and the second canvas is rendered on a second instance of the development interface on a second display device. While the canvases are distributed in this manner, a determination is made at step 3416 as to whether a command to consolidate the tabbed canvases is received. If such a command is received (YES at step 3416), the methodology proceeds to step 3418, where the two canvases are consolidated onto one of the two instances of the development interface from which the command to consolidate was received. The methodology then returns to step 3402.

Figure 34C:
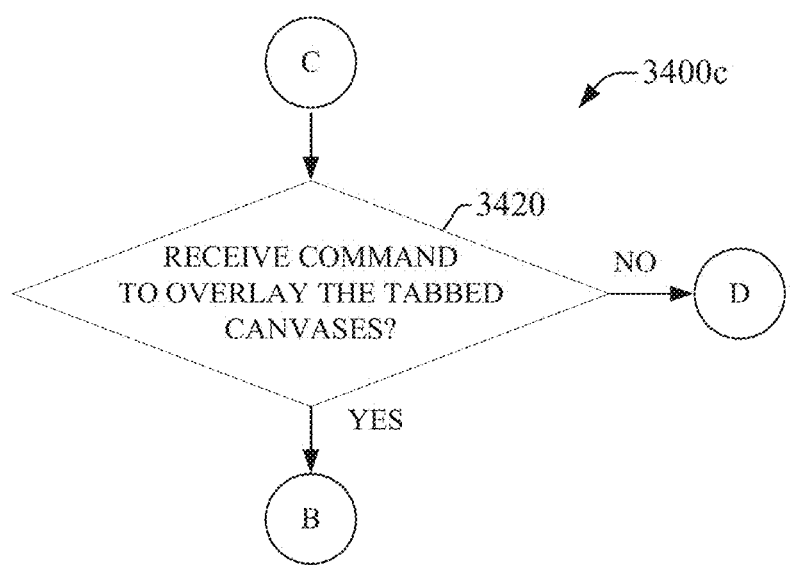
FIG. 34c is a flowchart of a third part of the example methodology for manipulating workspace canvases within the industrial IDE development interface.

If the command to distribute the tabbed canvases is not received at step 3412 (NO at step 3412)—that is, the canvases are still consolidated on a single instance of the interface display and are stacked horizontally or vertically—the methodology proceeds to the third part 3400*c* illustrated in FIG. 34*c*. At 3420, a determination is made as to whether a command to overlay the tabbed canvases is received. If no such command is received (NO at step 3420), the methodology returns to step 3404. Alternatively, if the command to overlay the canvases is received (YES at step 3420), the methodology returns to step 3402, where the canvases are again rendered as overlays.

In some embodiments, the canvas manipulation methodology of FIGS. 34*a*-34*c* can be combined with one or both of the methodologies described above in connection with FIGS. 32*a*-32*c* and 33*a*-33*b*.

Figure 35A:
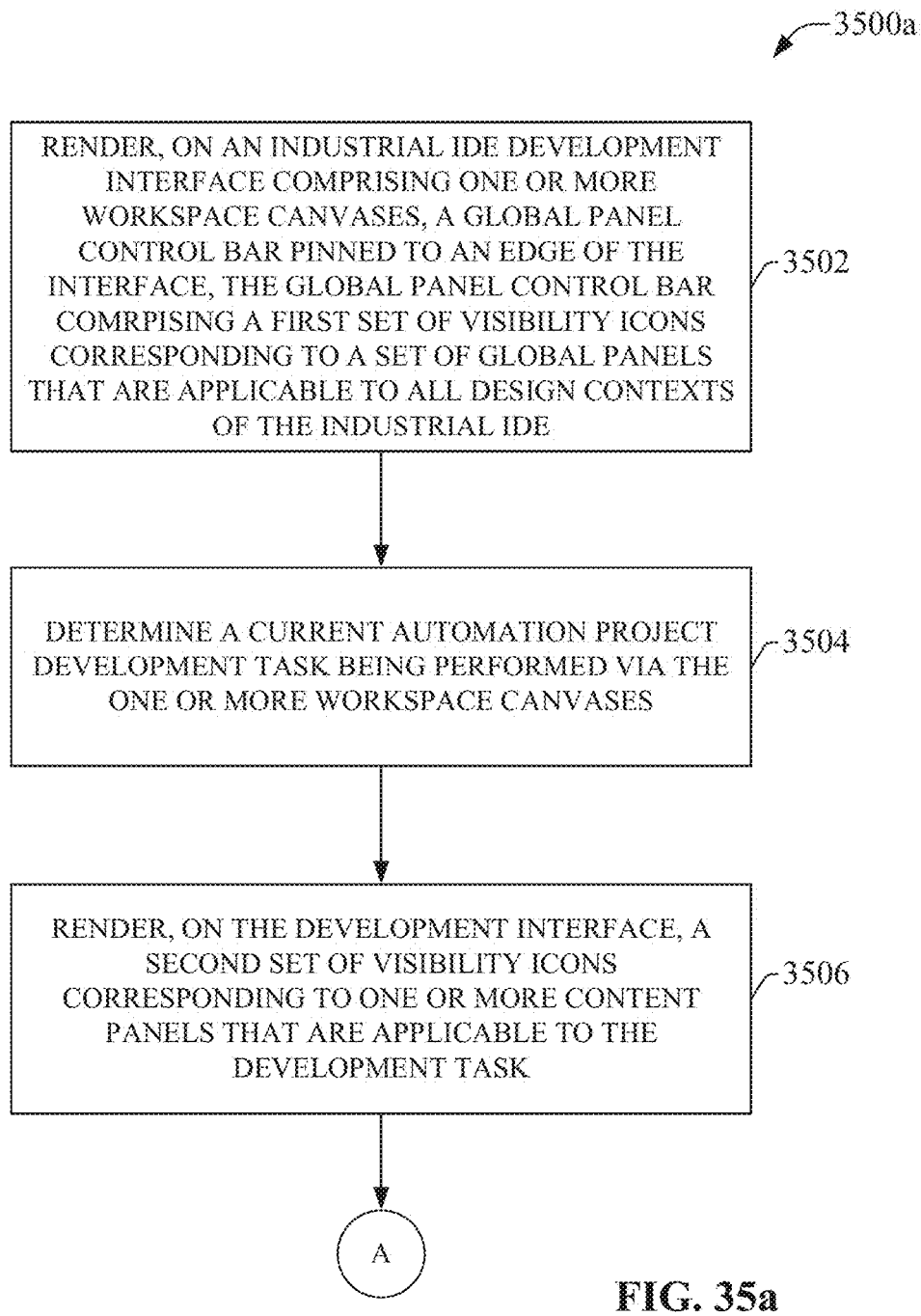
FIG. 35a is a flowchart of a first part of an example methodology for automatically curating a set of available project editing tools by an industrial IDE development interface based on a current development task being performed by a user.

FIG. 35*a* illustrates a first part of an example methodology 3500*a* for automatically curating a set of available project editing tools by an industrial IDE development interface based on a current development task being performed by a user. Initially, at 3502, a global panel control bar is rendered on an industrial IDE development interface comprising one or more workspace canvases. The global panel control bar can be pinned to an edge of the development interface, and can comprise a first set of visibility icons that correspond to a first set of global panels supported by the industrial IDE that are applicable to all design contexts of the industrial IDE.

At 3504, a current automation project development task being performed via the one or more workspace canvases is determined. The task can be determined, for example, based on content of the workspace canvas that currently has focus within the development interface. The task may be, for example, ladder logic control programming, structured text control programming, function block diagram control programming, HMI screen development, device configuration, controller tag editing, alarm configuration, or other such tasks.

At 3506, a second set of visibility icons is rendered on the development interface. The second set of visibility icons correspond to one or more content panels supported by the industrial IDE that are not globally applicable but are applicable to the current development task determined at step 3504.

Figure 35B:
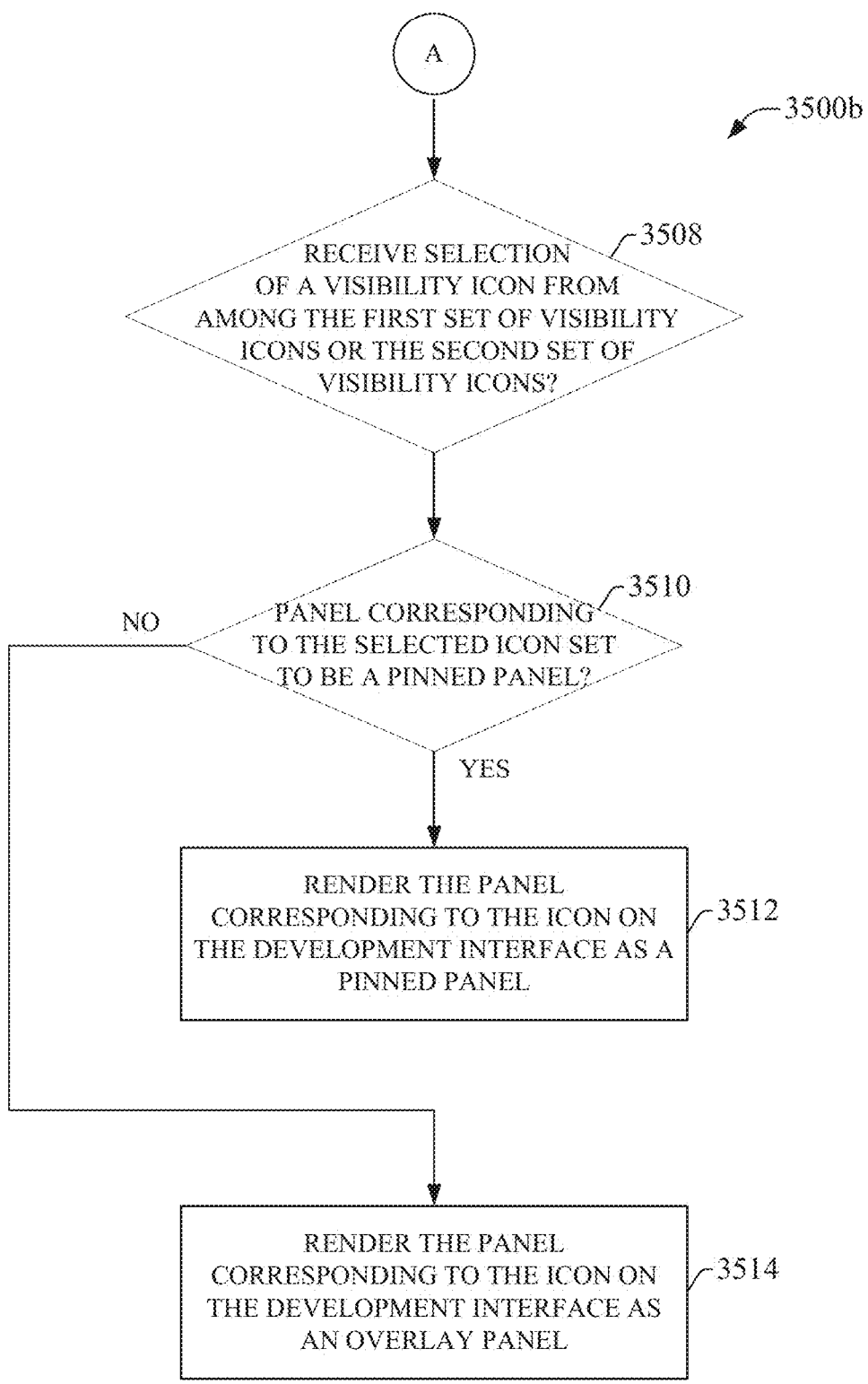
FIG. 35b is a flowchart of a second part of the example methodology for automatically curating the set of available project editing tools by the industrial IDE development interface based on the current development task being performed by the user.

The methodology continues with the second part 3500*b* illustrated in FIG. 35*b*. At 3508, selection of a visibility icon from among the first or second set of visibility icons is received. At 3510, a determination as to whether a panel corresponding to the icon selected at step 3508 is set to be a pinned panel. If the selected panel is set to be pinned (YES at step 3510), the methodology proceeds to step 3512, where the panel corresponding to the selected icon is rendered on the development interface as a pinned panel. Alternatively, if the selected panel is not set to be pinned (NO at step 3510), the methodology proceeds to step 3514, where the panel corresponding to the selected icon is rendered on the development interface as an overlay panel.

In some embodiments, the methodology described in connection with FIGS. 35*a*-35*b* can be combined with one or more of the other methodologies described herein.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 36:
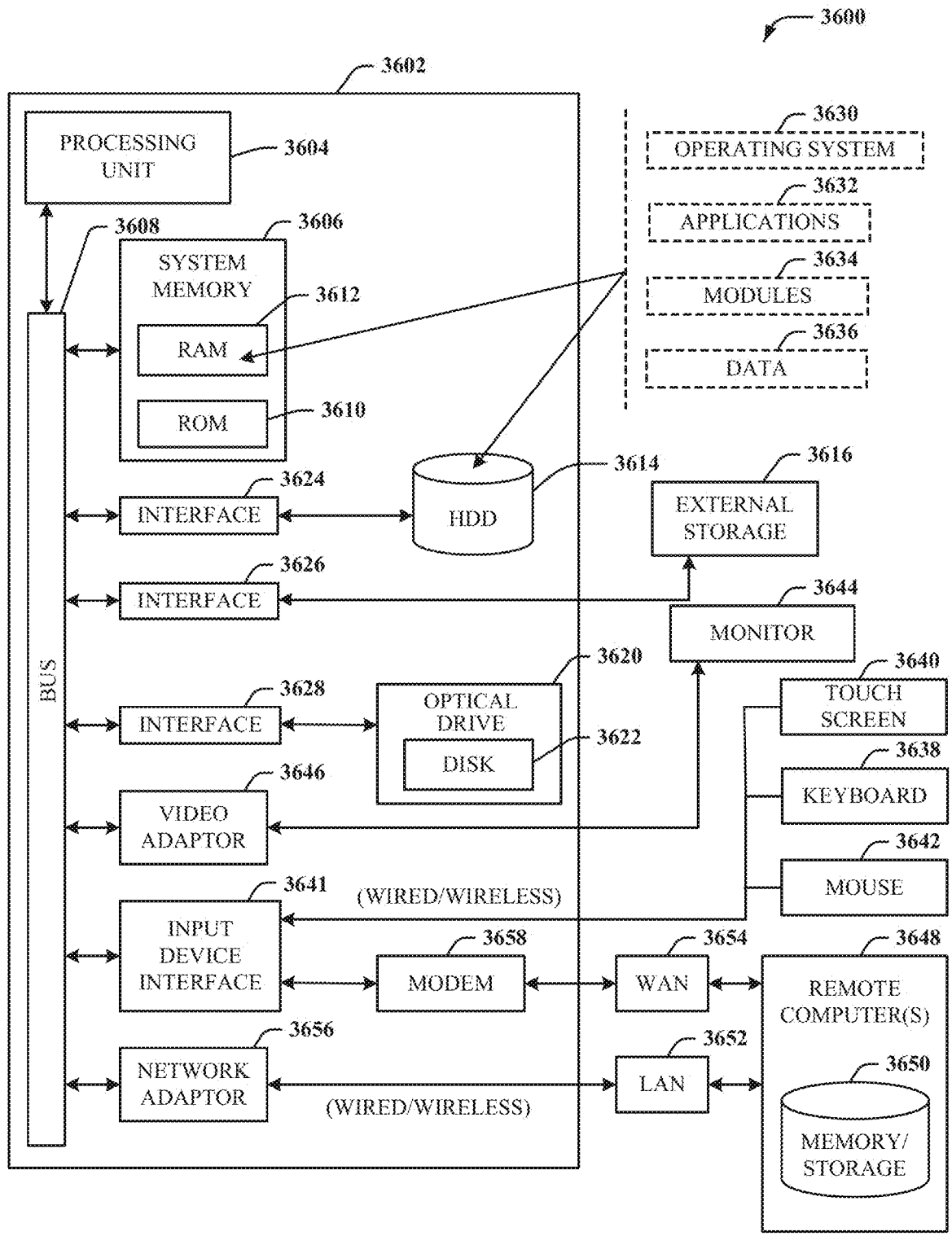
FIG. 36 is an example computing environment.
Figure 37:
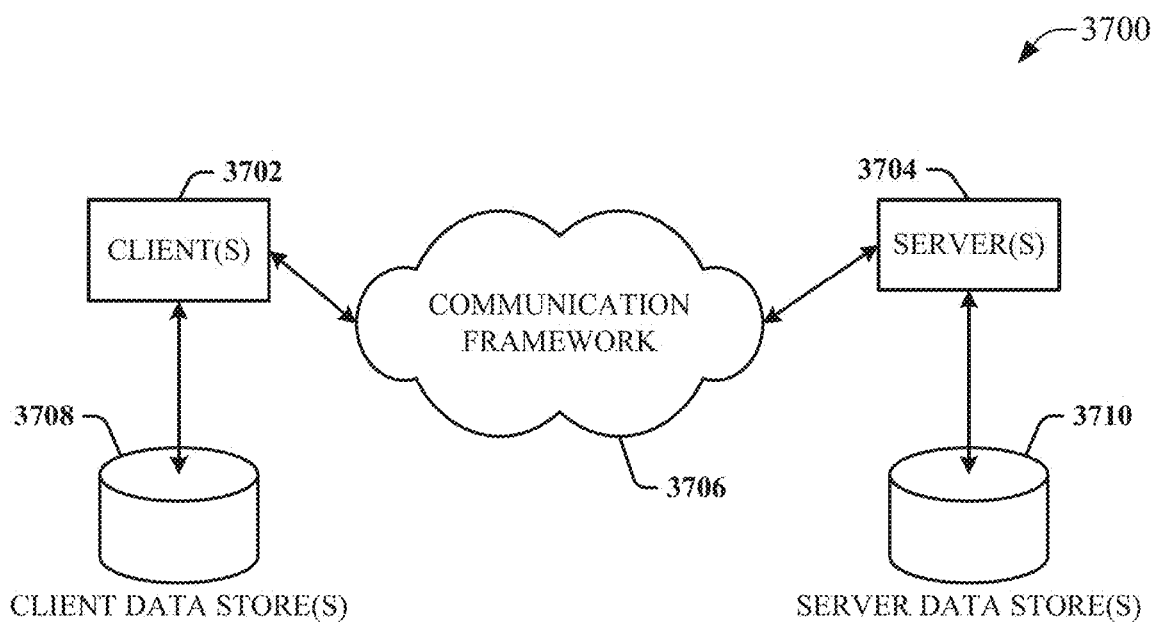
FIG. 37 is an example networking environment.

In order to provide a context for the various aspects of the disclosed subject matter, FIGS. 36 and 37 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 36, the example environment 3600 for implementing various embodiments of the aspects described herein includes a computer 3602, the computer 3602 including a processing unit 3604, a system memory 3606 and a system bus 3608. The system bus 3608 couples system components including, but not limited to, the system memory 3606 to the processing unit 3604. The processing unit 3604 can be any of various commercially available processors. Dual microprocessors and other multi-processor architectures can also be employed as the processing unit 3604.

The system bus 3608 can be any of several types of bus structure that can further interconnect to a memory bus (with or without a memory controller), a peripheral bus, and a local bus using any of a variety of commercially available bus architectures. The system memory 3606 includes ROM 3610 and RAM 3612. A basic input/output system (BIOS) can be stored in a non-volatile memory such as ROM, erasable programmable read only memory (EPROM), EEPROM, which BIOS contains the basic routines that help to transfer information between elements within the computer 3602, such as during startup. The RAM 3612 can also include a high-speed RAM such as static RAM for caching data.

The computer 3602 further includes an internal hard disk drive (HDD) 3614 (e.g., EIDE, SATA), one or more external storage devices 3616 (e.g., a magnetic floppy disk drive (FDD) 3616, a memory stick or flash drive reader, a memory card reader, etc.) and an optical disk drive 3620 (e.g., which can read or write from a CD-ROM disc, a DVD, a BD, etc.). While the internal HDD 3614 is illustrated as located within the computer 3602, the internal HDD 3614 can also be configured for external use in a suitable chassis (not shown). Additionally, while not shown in environment 3600, a solid state drive (SSD) could be used in addition to, or in place of, an HDD 3614. The HDD 3614, external storage device(s) 3616 and optical disk drive 3620 can be connected to the system bus 3608 by an HDD interface 3624, an external storage interface 3626 and an optical drive interface 3628, respectively. The external storage interface 3626 can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 3612, including an operating system 3630, one or more application programs 3632, other program modules 3634 and program data 3636. All or portions of the operating system, applications, modules, and/or data can also be cached in the RAM 3612. The systems and methods described herein can be implemented utilizing various commercially available operating systems or combinations of operating systems.

Computer 3602 can optionally comprise emulation technologies. For example, a hypervisor (not shown) or other intermediary can emulate a hardware environment for operating system 3630, and the emulated hardware can optionally be different from the hardware illustrated in FIG. 36. In such an embodiment, operating system 3630 can comprise one virtual machine (VM) of multiple VMs hosted at computer 3602. Furthermore, operating system 3630 can provide runtime environments, such as the Java runtime environment or the .NET framework, for application programs 3632. Runtime environments are consistent execution environments that allow application programs 3632 to run on any operating system that includes the runtime environment. Similarly, operating system 3630 can support containers, and application programs 3632 can be in the form of containers, which are lightweight, standalone, executable packages of software that include, e.g., code, runtime, system tools, system libraries and settings for an application.

Further, computer 3602 can be enable with a security module, such as a trusted processing module (TPM). For instance with a TPM, boot components hash next in time boot components, and wait for a match of results to secured values, before loading a next boot component. This process can take place at any layer in the code execution stack of computer 3602, e.g., applied at the application execution level or at the operating system (OS) kernel level, thereby enabling security at any level of code execution.

A user can enter commands and information into the computer 3602 through one or more wired/wireless input devices, e.g., a keyboard 3638, a touch screen 3640, and a pointing device, such as a mouse 3642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 3604 through an input device interface 3641 that can be coupled to the system bus 3608, but can be connected by other interfaces, such as a parallel port, an IEEE 1394 serial port, a game port, a USB port, an IR interface, a BLUETOOTH® interface, etc.

A monitor 3644 or other type of display device can be also connected to the system bus 3608 via an interface, such as a video adapter 3646. In addition to the monitor 3644, a computer typically includes other peripheral output devices (not shown), such as speakers, printers, etc.

The computer 3602 can operate in a networked environment using logical connections via wired and/or wireless communications to one or more remote computers, such as a remote computer(s) 3648. The remote computer(s) 3648 can be a workstation, a server computer, a router, a personal computer, portable computer, microprocessor-based entertainment appliance, a peer device or other common network node, and typically includes many or all of the elements described relative to the computer 3602, although, for purposes of brevity, only a memory/storage device 3650 is illustrated. The logical connections depicted include wired/wireless connectivity to a local area network (LAN) 3652 and/or larger networks, e.g., a wide area network (WAN) 3654. Such LAN and WAN networking environments are commonplace in offices and companies, and facilitate enterprise-wide computer networks, such as intranets, all of which can connect to a global communications network, e.g., the Internet.

When used in a LAN networking environment, the computer 3602 can be connected to the local network 3652 through a wired and/or wireless communication network interface or adapter 3656. The adapter 3656 can facilitate wired or wireless communication to the LAN 3652, which can also include a wireless access point (AP) disposed thereon for communicating with the adapter 3656 in a wireless mode.

When used in a WAN networking environment, the computer 3602 can include a modem 3658 or can be connected to a communications server on the WAN 3654 via other means for establishing communications over the WAN 3654, such as by way of the Internet. The modem 3658, which can be internal or external and a wired or wireless device, can be connected to the system bus 3608 via the input device interface 3641. In a networked environment, program modules depicted relative to the computer 3602 or portions thereof, can be stored in the remote memory/storage device 3650. It will be appreciated that the network connections shown are example and other means of establishing a communications link between the computers can be used.

When used in either a LAN or WAN networking environment, the computer 3602 can access cloud storage systems or other network-based storage systems in addition to, or in place of, external storage devices 3616 as described above. Generally, a connection between the computer 3602 and a cloud storage system can be established over a LAN 3652 or WAN 3654 e.g., by the adapter 3656 or modem 3658, respectively. Upon connecting the computer 3602 to an associated cloud storage system, the external storage interface 3626 can, with the aid of the adapter 3656 and/or modem 3658, manage storage provided by the cloud storage system as it would other types of external storage. For instance, the external storage interface 3626 can be configured to provide access to cloud storage sources as if those sources were physically connected to the computer 3602.

The computer 3602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 37 is a schematic block diagram of a sample computing environment 3700 with which the disclosed subject matter can interact. The sample computing environment 3700 includes one or more client(s) 3702. The client(s) 3702 can be hardware and/or software (e.g., threads, processes, computing devices). The sample computing environment 3700 also includes one or more server(s) 3704. The server(s) 3704 can also be hardware and/or software (e.g., threads, processes, computing devices). The servers 3704 can house threads to perform transformations by employing one or more embodiments as described herein, for example. One possible communication between a client 3702 and servers 3704 can be in the form of a data packet adapted to be transmitted between two or more computer processes. The sample computing environment 3700 includes a communication framework 3706 that can be employed to facilitate communications between the client(s) 3702 and the server(s) 3704. The client(s) 3702 are operably connected to one or more client data store(s) 3708 that can be employed to store information local to the client(s) 3702. Similarly, the server(s) 3704 are operably connected to one or more server data store(s) 3710 that can be employed to store information local to the servers 3704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for developing industrial applications, comprising:
  a memory that stores executable components; and
  a processor, operatively coupled to the memory, that executes the executable components, the executable components comprising:
    a user interface component configured to render an industrial integrated development environment (IDE) development interface and to receive, via interaction with the development interface, industrial design input that defines aspects of an industrial automation project, wherein the development interface comprises an explorer panel that facilitates browsing of elements of the industrial automation project;
    wherein the explorer panel comprises a controller navigation tree, the controller navigation tree presenting controller application nodes comprising a fault handler node and a power-up handler node, wherein selecting a given controller application node renders a function block diagram, code, and property information for the given controller application node.

2. The system of claim 1, wherein the development interface further comprises one or more workspace canvases configured to facilitate development of a selected aspect of the industrial automation project.

3. The system of claim 1, wherein:
  the development interface further comprises a properties panel; and
  the explorer panel further comprises a human-machine interface (HMI) tab presenting HMI application nodes, wherein selecting a given HMI application node renders properties of the given HMI application node in the properties panel.

4. The system of claim 1, wherein:
  the explorer panel further comprises explorer icons rendered on an explorer view control bar, the explorer icons representing respective different viewing categories supported by the explorer panel; and
  selection of an explorer icon, of the explorer icons, causes browsable project content associated with a viewing category of the explorer icon to be rendered in the explorer panel.

5. The system of claim 4, wherein the viewing categories comprise at least one of:
  a system view that renders a system navigation tree comprising nodes representing the elements of the industrial automation project organized according to logical paths or execution paths;
  an application view that lists applications associated with the industrial automation project;
  a devices view that lists devices of the industrial automation project;
  a library view that lists software objects associated with the industrial automation project or that are available for inclusion in the industrial automation project; or
  an extensions view that lists software extensions currently installed on the system.

6. The system of claim 4, wherein:
  the browsable project content comprises nodes representing the elements of the industrial automation project, and
  the user interface component is configured to, in response to selection of one of the nodes representing the elements of the industrial automation project, render information regarding a corresponding element of the industrial automation project on one or more workspace canvases or on a panel within the development interface.

7. The system of claim 4, wherein the user interface component is configured to, in response to a determination that the viewing category of the explorer icon is associated with multiple optional rendering formats for the browsable project content, render multiple tabs on the explorer panel corresponding to the multiple optional rendering formats.

8. The system of claim 7, wherein the user interface component is configured to, in response to selection of a tab of the multiple tabs, render the browsable project content on the explorer panel in one of the multiple optional rendering formats associated with the tab.

9. The system of claim 1, the executable components further comprising a project generation component configured to generate system project data based on the industrial design input comprising automation objects, the automation objects corresponding to an industrial asset and comprising customized control code, HMI screens, and help files for the industrial asset.

10. The system of claim 1, wherein:
the development interface comprises a global panel control bar comprising a cross reference icon that toggles a cross reference panel that renders cross reference information comprising all usages of a selected element within at least one workspace canvas;
the explorer panel comprise an explorer view control bar pinned to an edge of the explorer panel, and
the explorer panel is adjacent to a toolbox panel rendering global editing tools.

11. The system of claim 1, wherein the user interface component is configured to selectively render or hide the explorer panel in response to selection of a visibility icon associated with the explorer panel.

12. The system of claim 1, wherein the explorer panel comprises a control that sets the explorer panel to be rendered as either a pinned panel that is pinned to a background of the development interface or as an overlay panel.

13. A method for developing industrial applications, comprising:
displaying by an industrial integrated development environment (IDE) system comprising a processor, a development interface on a client device;
receiving, via interaction with the development interface, industrial design input that defines aspects of an industrial automation project,
displaying, via the development interface, an explorer panel that facilitates browsing of elements of the industrial automation project, wherein the explorer panel comprises a controller navigation tree, the controller navigation tree presenting controller application nodes comprising a fault handler node and a power-up handler node;
receiving, via interaction with the development interface, a selection of a given controller application node presented in the controller navigation tree; and
in response to receiving the selection of the given controller application node, rendering a function block diagram, code, and property information for the given controller application node.

14. The method of claim 13, further comprising displaying, via the development interface further, one or more workspace canvases configured to facilitate development of a selected aspect of the industrial automation project.

15. The method of claim 13, wherein:
displaying the development interface comprises displaying a properties panel;
displaying the explorer panel comprises displaying a human-machine interface (HMI) tab presenting HMI application nodes; and
the method further comprises rendering properties of a given HMI application node in the properties panel in response to selection of the given HMI application node.

16. The method of claim 13, wherein:
displaying the explorer panel comprises rendering explorer icons on an explorer view control bar, the explorer icons representing respective different viewing categories supported by the explorer panel; and
rendering, in the explorer panel, browsable project content associated with a viewing category of an explorer icon of the explorer icons in response to selection of the explorer icon.

17. The method of claim 16, wherein the viewing categories comprise at least one of:
a system view that renders a system navigation tree comprising nodes representing the elements of the industrial automation project organized according to logical paths or execution paths;
an application view that lists applications associated with the industrial automation project;
a devices view that lists devices of the industrial automation project;
a library view that lists software objects associated with the industrial automation project or that are available for inclusion in the industrial automation project; or
an extensions view that lists software extensions currently installed on the industrial IDE system.

18. The method of claim 16, wherein:
the browsable project content comprises nodes representing the elements of the industrial automation project, and
the method further comprises rendering information regarding a corresponding element of the industrial automation project on one or more workspace canvases or on a panel within the development interface in response to selection of one of the nodes representing the elements of the industrial automation project.

19. A non-transitory computer-readable medium having stored thereon instructions that, in response to execution, cause an industrial integrated development environment (IDE) system comprising a processor to perform operations, the operations comprising:
displaying a development interface on a client device;
receiving, via interaction with the development interface, industrial design input that defines aspects of an industrial automation project,
displaying, via the development interface, an explorer panel that facilitates browsing of elements of the industrial automation project, wherein the explorer panel comprises a controller navigation tree, the controller navigation tree presenting controller application nodes comprising a fault handler node and a power-up handler node;
receiving, via interaction with the development interface, a selection of a given controller application node presented in the controller navigation tree; and
in response to receiving the selection of the given controller application node, rendering a function block diagram, code, and property information for the given controller application node.

20. The non-transitory computer-readable medium of claim 19, wherein:
- displaying the development interface comprises displaying a properties panel;
- displaying the explorer panel comprises displaying a human-machine interface (HMI) tab presenting HMI application nodes; and
- the operations further comprise rendering properties of a given HMI application node in the properties panel in response to selection of the given HMI application node.

* * * * *